(12) United States Patent
Hart et al.

(10) Patent No.: US 7,028,450 B2
(45) Date of Patent: Apr. 18, 2006

(54) SYSTEM AND METHOD OF PROCESSING AND PACKING DISK-LIKE OBJECTS

(75) Inventors: Colin R. Hart, Clive, IA (US); Kenneth M. Welborn, Charlottesville, VA (US)

(73) Assignee: F.R. Drake Company, Waynesboro, VA (US)

( * ) Notice: Subject to any disclaimer, the term of this patent is extended or adjusted under 35 U.S.C. 154(b) by 0 days.

(21) Appl. No.: 10/143,861

(22) Filed: May 14, 2002

(65) Prior Publication Data

US 2002/0189205 A1 Dec. 19, 2002

Related U.S. Application Data

(60) Provisional application No. 60/290,342, filed on May 14, 2001.

(51) Int. Cl.
*B65B 35/30* (2006.01)

(52) U.S. Cl. ............ 53/532; 53/235; 53/447; 53/475; 414/788.5; 414/790.2; 414/790.8

(58) Field of Classification Search ............ 414/790.8, 414/788.5, 789.9, 790.9, 790.2; 53/532, 53/484, 531, 447, 467, 468, 473, 475, 476, 53/235, 244, 247, 267, 443
See application file for complete search history.

(56) References Cited

U.S. PATENT DOCUMENTS

| | | | |
|---|---|---|---|
| 2,571,283 A | 10/1951 | Nicholson | |
| 3,593,624 A | 7/1971 | Dufour | |
| 3,641,735 A | 2/1972 | Daily et al. | |
| 3,662,901 A | 5/1972 | Brintley, Sr. | |
| 3,672,118 A | 6/1972 | De Jong et al. | |
| 3,722,741 A | 3/1973 | Mojden | |
| 3,866,741 A | 2/1975 | Carbon et al. | |
| 3,988,875 A | 11/1976 | Fay | |
| 3,998,339 A | 12/1976 | Booth | |
| 4,000,709 A | 1/1977 | Mojden | |
| 4,137,604 A | 2/1979 | Sandberg et al. | |
| 4,162,733 A | 7/1979 | Wiseman | |
| 4,180,154 A | 12/1979 | Andersson | |
| 4,236,855 A | 12/1980 | Wagner et al. | |
| 4,481,752 A * | 11/1984 | Sabel | 53/448 |
| 4,537,550 A * | 8/1985 | Mojden et al. | 414/790.3 |
| 4,558,779 A | 12/1985 | Schmitt et al. | |
| 4,662,152 A * | 5/1987 | Simelunas et al. | 53/246 |

(Continued)

OTHER PUBLICATIONS

U.S. Appl. No. 10/143,843, filed May 14, 2002, Hart.

(Continued)

*Primary Examiner*—John Sipos
*Assistant Examiner*—Christopher Hamon
(74) *Attorney, Agent, or Firm*—Berenato, White & Stavish, LLC

(57) ABSTRACT

A system for automatically forming several parallel rows of disk-like objects on a conveyor into stacks and packing those stacks into boxes is disclosed along with a method of operating the system. The system includes a stacker receiving the disk-like objects as they fall off the conveyor, a buffer receiving stacks from the stacker in groups of a first number, a transfer device for removing the stacks from the buffer in groups of a second number, and a packer for packing the stacks into boxes. The second number can be less than, greater than, or equal to the first number.

47 Claims, 48 Drawing Sheets

U.S. PATENT DOCUMENTS

| | | |
|---|---|---|
| 4,676,708 A | 6/1987 | Mojden |
| 4,768,642 A | 9/1988 | Hunter |
| 4,807,741 A | 2/1989 | Simelunas et al. |
| 4,843,799 A * | 7/1989 | Simelunas et al. ............ 53/448 |
| 4,921,398 A | 5/1990 | Fluck |
| 4,969,790 A | 11/1990 | Petz et al. |
| 5,018,338 A | 5/1991 | Jurchuk et al. |
| 5,069,019 A | 12/1991 | Lodewegen |
| 5,127,209 A | 7/1992 | Hunter |
| 5,131,803 A | 7/1992 | Banek |
| 5,141,219 A | 8/1992 | Watts et al. |
| 5,263,568 A * | 11/1993 | Francioni ................. 198/419.2 |
| 5,346,050 A | 9/1994 | Mojden et al. |
| 5,354,170 A | 10/1994 | Schweingruber |
| 5,480,278 A | 1/1996 | Morgan |
| 5,622,025 A * | 4/1997 | Kitagawa et al. .............. 53/53 |
| 5,669,754 A | 9/1997 | Croteau |
| 5,737,898 A * | 4/1998 | Grimm et al. ............... 53/48.1 |
| 5,765,337 A | 6/1998 | Lodewegen et al. |
| 5,809,745 A | 9/1998 | Reinert |
| 5,820,335 A | 10/1998 | Croteau |
| 5,865,106 A | 2/1999 | van der Ent |
| 5,884,749 A | 3/1999 | Goodman |
| 5,894,711 A | 4/1999 | Davidson |
| 6,019,213 A | 2/2000 | Schubert |
| 6,052,969 A | 4/2000 | Hart et al. |
| 6,202,392 B1 * | 3/2001 | Greenwell et al. ............ 53/566 |
| 6,205,748 B1 | 3/2001 | Daniele |
| 6,322,316 B1 | 11/2001 | Hart et al. |
| 6,412,253 B1 * | 7/2002 | Meyer et al. ................. 53/399 |
| 6,438,925 B1 * | 8/2002 | Straub ........................ 53/244 |
| 6,592,116 B1 * | 7/2003 | Focke et al. ............... 271/9.08 |

OTHER PUBLICATIONS

U.S. Appl. No. 10/143,845, filed May 14, 2002, Hart et al.
U.S. Appl. No. 10/143,860, filed May 14, 2002, Hart et al.
U.S. Appl. No. 10/143,861, filed May 14, 2002, Hart et al.

* cited by examiner

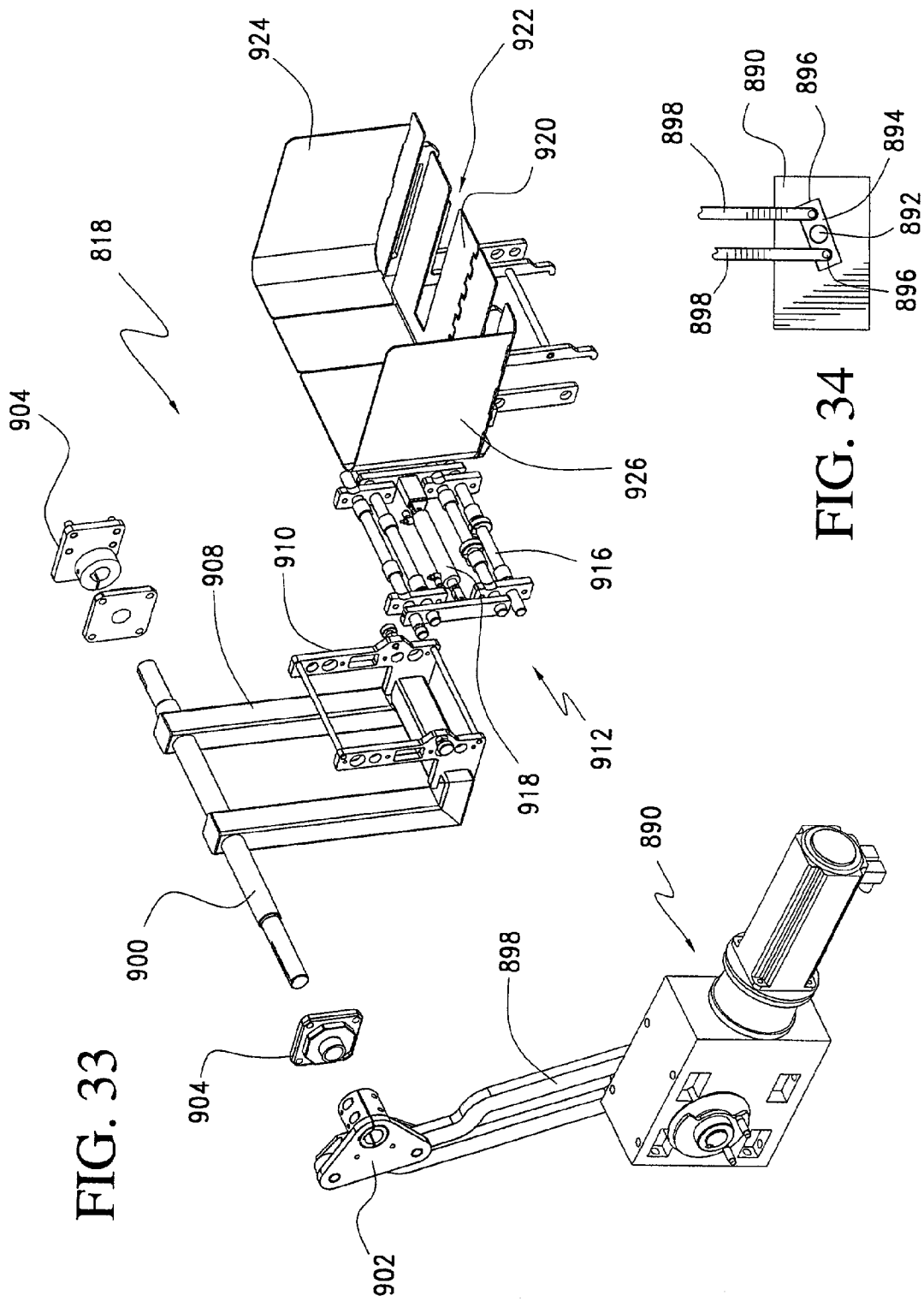

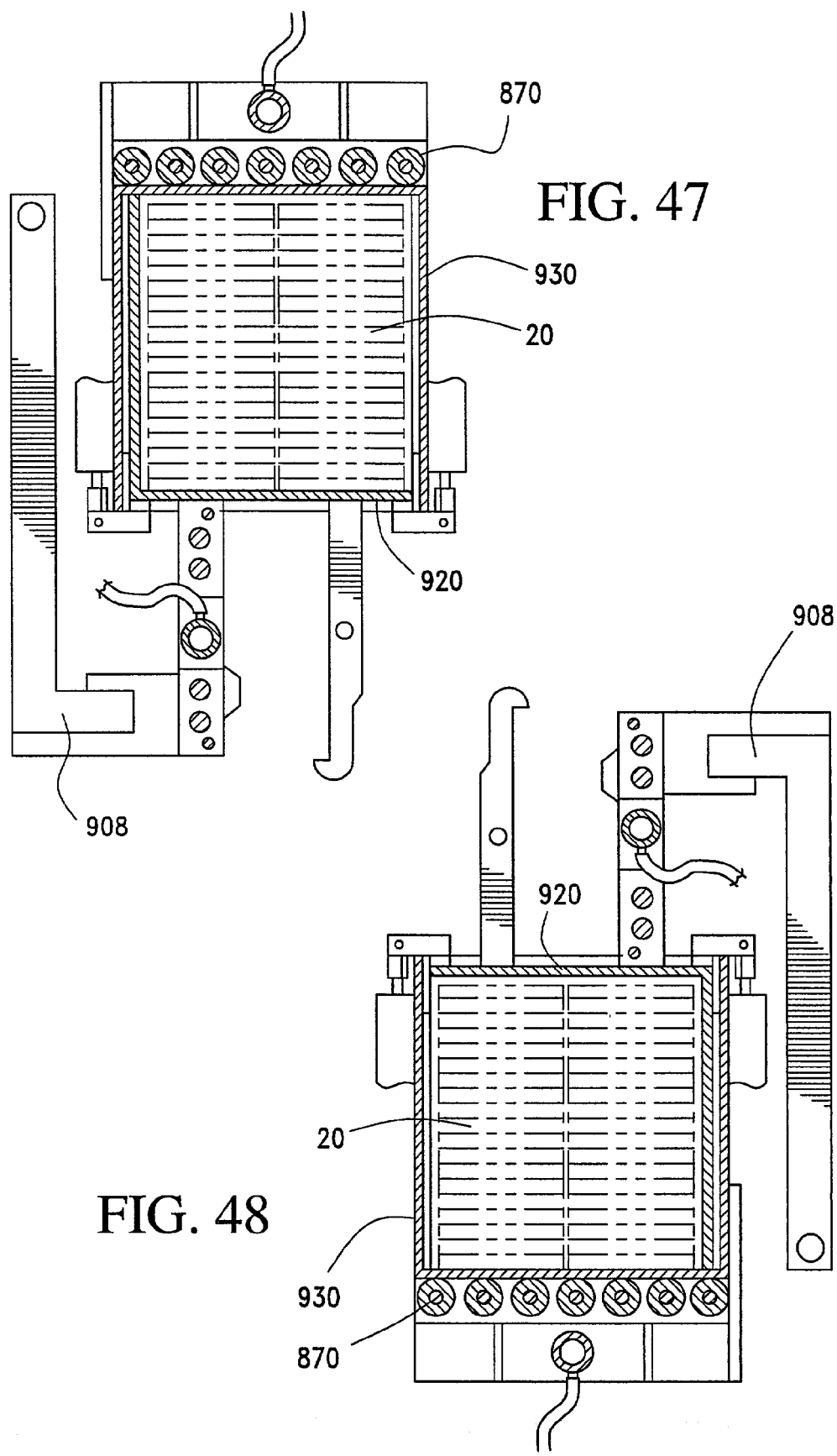

SYSTEM AND METHOD OF PROCESSING AND PACKING DISK-LIKE OBJECTS

CROSS-REFERENCE TO RELATED APPLICATIONS AND CLAIM TO PRIORITY

The present application claims the benefit of U.S. provisional patent application Ser. No. 60/290,342, filed May 14, 2001, the disclosure of which is incorporated by reference.

The present application is related to the following four applications, which are being filed concurrently herewith, are assigned to the assignee of the subject application and are incorporated herein by reference: "Method And Apparatus For Stacking Discrete Planar Objects," "Method And Apparatus For Buffering A Flow Of Objects," "Stack Transfer Device," and "Method And Apparatus For Packing."

FIELD OF THE INVENTION

This application is directed to a system and method for processing and packing disk-like objects, and, more specifically, toward a system and method for forming multiple stacks of disk-like objects, arranging the stacks in a matrix of rows and columns, and packing the stacks thus arranged in a container.

BACKGROUND OF THE INVENTION

Machines for processing hamburger patties, chicken patties, sausage patties, and similar disk-like objects are known and often include a conveyor belt or similar mechanism for moving the patties into and out of a freezer, moving the patties beyond a metal detector to check for contamination, and otherwise supporting the patties while they are processed. However, in order to package the patties, they generally must be removed from the conveyor and stacked, and the stacks must then be placed into the boxes, cartons, or other containers. Heretofore, various machines have been proposed for performing some or all of the packing functions. For example, stacking machines such as the one shown in U.S. Pat. No. 6,052,969, assigned to the assignee of the present application, form hamburger patties into stacks as they exit a conveyor.

One reason that manual labor has heretofore been required is that the number of rows of patties on a conveyor belt is not always the same as the number of rows that will be placed in a container. For example, the number of rows of hamburger patties on a conveyor is generally related to the width of the conveyor. Processing multiple rows simultaneously increases efficiency. However, this number is sometimes greater than the number of rows that will fit into a case or box, so the rows must somehow be consolidated before they are boxed. In the past, this has been done by having laborers take individual stacks as they were formed and manually placing the stacks in a box.

Moreover, even when individual machines exist that either stack or pack objects such as hamburger patties, they are not always easily integratable and do not function as a system. For example, if one element of the system works more slowly than other elements, a bottleneck will develop and reduce system throughput. There is therefore a need for a system that can receive substantially any number of rows of disk-like objects from a conveyor, form the objects into stacks, and place appropriate numbers of these stacks into rows and columns in a box.

SUMMARY OF THE INVENTION

These and other difficulties are addressed by the present invention which comprises an integrated system for receiving moving multiple rows of frozen hamburger patties along a conveyor belt, forming the patties into stacks, and packing the stacks into boxes at a rate at least as great as the rate at which the patties are presented by the conveyor. The subject invention finds particular utility in connection with the packaging of frozen hamburger patties; however, it could just as easily be used to package other food products or flat, non-food objects. The invention is described herein in connection with the processing of frozen hamburger patties, but is in no manner limited to use with such products.

A first portion of the subject system includes a conveyor that moves frozen patties toward a stacking device which receives the patties as they fall from the end of a conveyor belt and forms the patties into stacks. In a preferred embodiment, the stacker includes a first holder, sometimes referred to as an upper holder or upper shelf, onto which the rows of patties fall as they reach the end of the conveyor. The upper holder preferably comprises a plurality of pairs of parallel pins that extend from a support toward the end edge of the conveyor so that individual patties in a given row drop one at a time off the end of the conveyor onto a pair of pins. Hereafter, the processing of a single stack of patties will sometimes be discussed, it being understood that second and additional stacks are being formed substantially simultaneously on adjacent pairs of pins. The upper holder is lowered as each new patty falls, to keep the top of the stack about the same distance beneath the end edge of the conveyor. The height of the top of the stack varies somewhat during processing, but it is preferably maintained within a fairly narrow range of heights to ensure that the patties drop consistently onto the stacks. In the preferred embodiment, a counter adjacent the conveyor counts patties in a row just before they fall onto the upper support, and a cam lowers the upper support at a known rate.

A second holder comprising a plurality of fingers is positioned beneath the upper support, with each finger aligned with the opening between a pair of upper support pins. As the upper support drops, the pins eventually pass to each side of one of the fingers, and as the upper support drops further, the bottom of the stack contacts a finger on the second holder and is supported thereby. When the stack is completely supported by the fingers, the upper support pivots away from the stream of falling patties and returns to its starting position while the second holder continues to drop, keeping the top of the stack at a generally constant height. A transfer device is mounted beneath the second support, which device includes a plurality of openings aligned with each of the fingers on the second support. When a stack contains the correct number of patties, or is otherwise determined to be complete, the second holder drops so that the fingers pass through the openings in the transfer device, leaving the stacks supported by the transfer device. Preferably, as soon as the second shelf begins to drop, the first shelf rises and pivots back to its starting position to catch the falling patties, while the end of the conveyor is moved to lengthen the conveyor and create a gap in the flow of patties; this delays the release of the next group of patties and allows the upper shelf to move into position to catch additional patties. The upper support thus supports a next group of falling patties, while the following processing steps are carried out on the first stack.

Once the stacks are supported on the transfer device and the fingers of the second holder are located beneath the transfer device, the transfer device grips the stacks and moves sideways to transfer the stacks to a buffer. As the transfer device is moving the stacks to the buffer, the second holder is free to return to its starting position beneath the top shelf. Once the transfer of patties to the buffer is complete, the transfer device returns to its starting location beneath the second holder, and the process is repeated.

A second portion of the system is a buffer which receives a first number of stacks from the stacker. In a preferred embodiment, the buffer comprises a carousel to which a plurality of carriers are attached, each carrier holding a tray that receives a single stack of frozen hamburger patties. Each carrier is attached by a clamp to a belt that runs continuously around the carousel, the clamp engaging the belt on opposites sides thereof. The clamp is attached tightly enough to cause the carrier to move with the belt when its path is unobstructed, but loosely enough that the belt will slide through the clamp when the path of the carrier is blocked. In this manner, the position of the carriers can be controlled independently of the positions of the other carriers, without a need to provide separate controllers for the clamps on each carrier.

The movement of the carriers is controlled so that a first number of trays is always available when needed to receive a first number of incoming stacks, and, when full, the carriers are released to a second location where they are stopped so that stacks of patties can be removed therefrom by a transfer device in groups of a second number. When the second number is less than the first number, the stacks must be removed at a rate greater than the rate at which the stacks of patties arrive at the carousel, and full carriers are buffered at a location between the first and second locations. When the second number is greater than the first number, full carriers are accumulated at the second location until a second number of carriers is present. When the first and second numbers are the same, the carriers move around the carousel in equal size groups.

In the preferred embodiment, the number of carriers is related to the maximum number of incoming rows of patties, to minimize the number of carriers needed, and thus reduce the amount of space occupied by the machine. Applicants have found, for example, that a stacking machine that produces four rows of patties used with and a packaging machine that requires three rows at a time as input, a buffer having a total of eleven carriers is needed. In this manner, the width of the buffer can be minimized and the resulting buffer need not be much greater than the width of the stacking machine.

A third portion of the system comprises a transfer device for removing the stacks of patties from the trays of the buffer device and placing them on a platform from which they can be further processed. In the preferred embodiment, the transfer device comprises a generally rectangular frame having parallel top and bottom members, a plurality of stack supports mounted on the bottom member and a plurality of actuators supporting plates depending from the top member. The actuators cause the plates to move toward and away from the bottom member, and the bottom member is movable relative to the top member via additional actuators. The frame is shiftable between the buffer, where it engages several stacks of patties, and a platform, where the stacks are deposited for further processing. In the preferred embodiment, the stacks at the first location are located in individual trays of the buffer, and are oriented at a small angle to the vertical so that the stacks are supported by both a bottom wall and a side wall of a holder, while the second location comprises a shelf-like member on which the stacks are supported by the lower-most patty in the stack. The frame is pivotable about an axis parallel to the bottom frame member so that it can shift the stacks from a first orientation with respect to vertical to a second generally vertical orientation.

In operation, the frame moves and pivots until it substantially surrounds a plurality of stacks of patties, and so that the support members on the lower frame member are positioned beneath slots in the bottoms of the trays and with the plates located over the tops of each of the stacks. Actuators then move the bottom frame member up against the bottoms of the stacks and move the plates against the tops of the stacks to grip each stack between one bottom frame stack support member and a plate. The frozen patties have relatively rough surfaces, and therefore only a small amount of pressure needs to be applied to hold the stacks securely together while they are being moved. If the objects in the stacks were formed of a low-friction material, a greater force would be required to compress the stacks and keep them together. The frame next pivots about an axis below and parallel to the bottom frame member and moves away from the trays to a second location where the patties are to be deposited.

The second location comprises a matrix former, which receives several stacks of patties and arranges the stacks for placement into a case or other container. The matrix former includes a generally horizontal lower support surface with slots wider than the bottom frame member stack supports but narrower than the width of the stacks, and three upstanding sidewalls extending away from the lower support surface, which side walls are movable relative to the bottom support surface to square the stacks on the lower support surface. The distance between the frame side members is greater than the distance between the matrix former side walls, so the frame surrounds the matrix former as the stacks are deposited thereon. When the bottoms of the stacks are located over the lower support surface of the matrix former, the frame bottom moves away from the stack bottoms through the slots to deposit the stacks on the lower support surface and the plates are also moved away from the top of the stacks. The transfer mechanism then returns to the first location, where another set of stacks has been moved into position for transfer and repeats the above process, but leaves the second group of stacks at a third location between the first location and the second location one patty diameter closer to the first location than the second location.

A fourth portion of the system comprises a packer comprising the matrix former having a first platform on which a plurality of stacks of patties are placed, and a second platform for supporting a box into which the stacks are to be packed. The second platform is movable vertically, and pivots about an axis parallel to its box-contacting surface. The second platform includes at least one gripper for holding the bottom of the box securely against the box-contacting surface, and preferably also includes a plurality of grippers for engaging the top edges of the box to control the movement of the box and to hold down flaps extending from the top edge of the box. The box-contacting surface of the second platform also preferably includes a plurality of rollers that allow an empty box to roll on and off the platform when the platform is inclined.

In operation, the second platform is aligned with a conveyor that feeds empty boxes one at a time to the second platform, where an individual box is gripped by at least one gripper on the second platform to hold it in place with its bottom on the rollers and its open top facing away from the rollers. The second platform is then pivoted about 158 degrees to an inverted position with the open box top positioned over and facing the first platform over the stacks of patties on the first platform. The second platform is next lowered over the stacked patties and over the first platform so that the products and platform are disposed completely within the box. The orientation of the patties is maintained by the walls of the box and the platform, and the first and second platforms are pivoted together until the top opening of the box is again facing up and the patties are supported on the closed bottom of the box. The second platform and box are moved away from the first support, and the first support is returned to its original orientation. The second support is moved to a discharge location to slide the fully loaded box onto a conveyor for further processing and then tilts and moves to its original position to receive another empty box to start the process again.

Thus in operation, multiple rows of hamburger patties drop over the edge of a moving conveyor belt and form a plurality of stacks on a stacker as they fall. When the stacks achieve a predetermined size, they are transferred automatically to a buffer carousel while a second set of stacks is formed on another portion of the stacker. Transfer of stacks from the stacker to the buffer is accomplished without slowing the conveyor or interfering with the upstream processing of the patties. A first number of stacks of patties, four for example, are loaded into four trays of the buffer and moved from a first location to a second location. At the second location, a second number of stacks of patties, three for example, are removed from the trays and moved to the support surface of the matrix former. Additional patties are received four stacks at a time at the first location, and moved to the second location where they are removed three stacks at a time. The stacks on the matrix former are boxed and removed each time a desired number of stacks has been received on the matrix former. Because the stacks may be removed from the buffer at a rate greater than the rate they are placed on the buffer, a constant throughput is achieved, and the flow of patties on the conveyor is substantially matched to the output flow of patties from the boxer. Because the stacks are flipped twice during processing, once between the stacker and the buffer and again when the filled carton is inverted, the stacks end up in a carton in the same orientation as they are in when they are formed on the stacker.

It is therefore a primary object of the present invention to provide an automated system for processing and packing a plurality of disk-like objects such as frozen food patties.

It is another object of the present invention to provide a system for receiving a plurality of rows of disk-like objects from a conveyor, forming the objects into stacks and packaging the stacks thus formed.

It is a further object of the present invention to provide a method for stacking a first number of rows of objects and packing a second number of rows of stacks into a box.

It is yet another object of the present invention to provide an automated system for processing and packing a plurality of disk-like objects, including a stacker for forming a first number of stacks, a packing subsystem that packs stacks into a box in rows of a second number of stacks, and a buffer for converting said first number of stacks into groups of said second number of stacks.

In furtherance of these objects, an apparatus is provided for forming stacks of disk-like objects and packing the stacks in a box that includes a stacker for forming a plurality of stacks of the disk-like objects, a buffer, and a first transfer mechanism for transferring the plurality of stacks from the stacker to the buffer. A second transfer mechanism is also provided for transferring at least some of the stacks on the buffer to a platform, and a boxer is included for boxing the stacks of objects on the platform.

A further aspect of the invention comprises a method for processing a flow of disk-like objects that involves conveying at least two rows of disk-like objects toward and over an edge and providing at least two catchers adjacent the lip. The disk-like objects of each row are caught by the catchers as they fall over the edge thus forming a stack of objects on each of the catchers. A buffer comprises a plurality of stack carriers individually movable around a closed loop, and at least two stacks of objects from the catchers are moved to at least two of the carriers. The two carriers are moved from a first location to a second location. At the second location a number of stacks are removed and placed on a platform to form a first column. Additional stacks are removed from the second location and placed on the platform to form a second column. Finally, a box is placed over the first and second columns of stacks, and inverted together with the stacks, to transfer the stacks from the platform to the box, after which the box is moved away from the platform.

A further aspect of the invention comprises an apparatus for packing disk-like objects and includes a stacker receiving a first number of rows of objects from a conveyor and forming the rows into stacks, a buffer for receiving the stacks in groups of a first number, a packer for packing the stacks in a box, and a transfer mechanism for transferring the stacks from the buffer to the packer in groups of a second number.

Another aspect of the invention is a method of packing disk-like objects that involves moving a first number of rows of disk-like objects along a conveyor toward a conveyor end edge, and providing a first number of catchers in a row adjacent the end edge, each of the catchers being aligned with one of the first number of rows of disks. The disks in each of the rows are caught to form a stack on each of the catchers, after which they are transferred from the catchers to a buffer. From the buffer, the stacks are transferred to a packer in groups of a second number, and automatically packed into a box.

BRIEF DESCRIPTION OF THE DRAWINGS

These objects and advantages will be better understood after a reading of the following detailed description of a preferred embodiment of the invention together with the following drawings.

FIG. 33 is an assembly drawing of matrix former of FIG. 31.

FIG. 34 is a rear elevational view of the motor of the matrix former of FIG. 31.

FIG. 47 is a sectional side elevational view of the lift apparatus and the matrix former in a position similar to that shown in FIG. 39.

FIG. 48 is a sectional side elevational view of the lift apparatus and the matrix former in a position similar to that shown in FIG. 40.

DETAILED DESCRIPTION OF THE INVENTION

Figure 1:
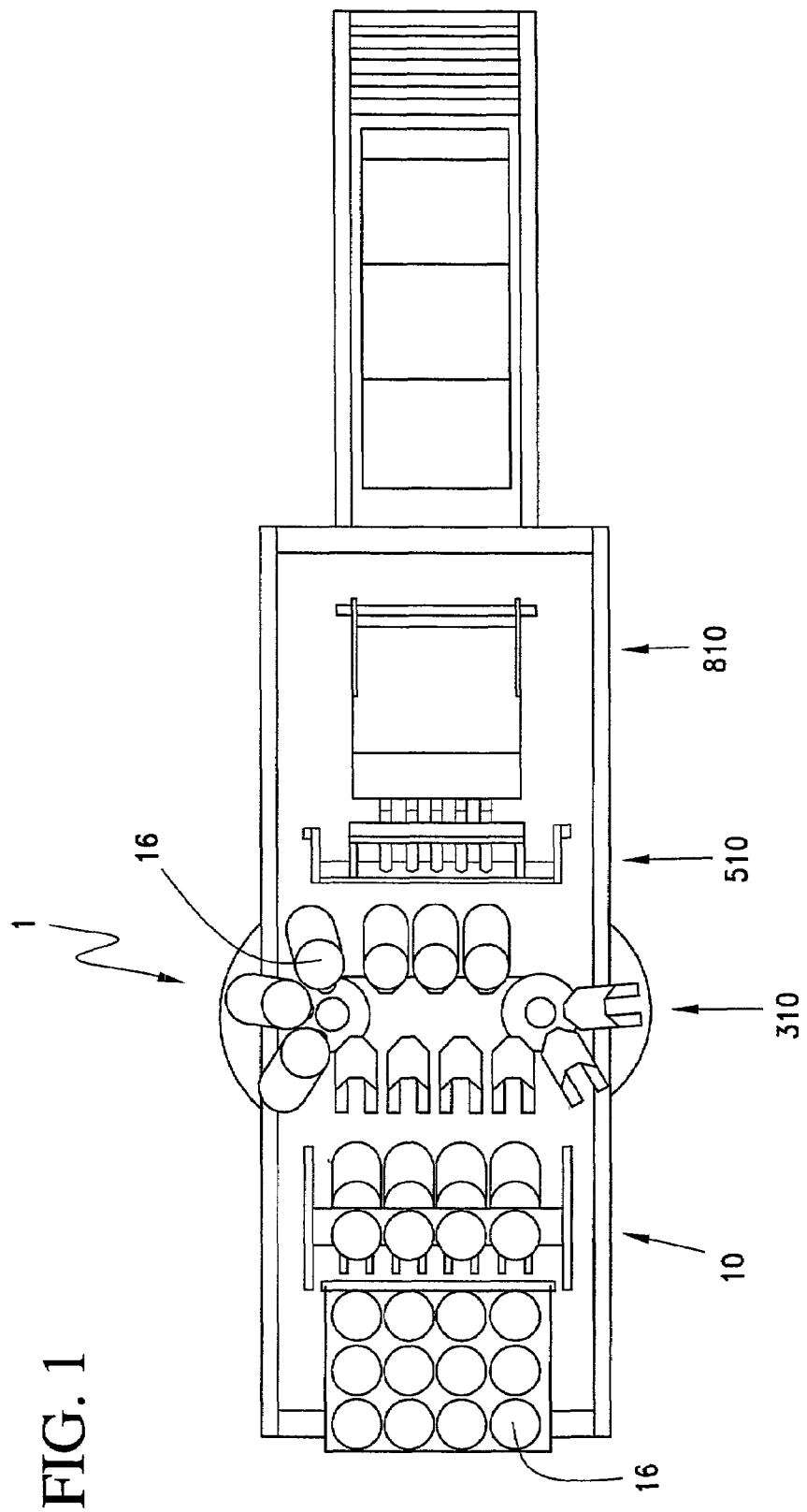
FIG. 1 is a top plan view of a system of a processing system according to the present invention which system includes a stacking device, a buffer, a transfer device, and a packer.

Referring now to the drawings, wherein the showings are for purposes of illustrating a preferred embodiment of the invention only, and not for the purpose of limiting same, FIG. 1 shows a hamburger patty processing system 1 that includes a stacker 10, a buffer 310, a stack transfer device 510 and a packing machine 810. Each of these elements is described in more detail below.

Stacker

The stacker portion of the subject system is described in an application entitled "Method And Apparatus For Stacking Discrete Planar Objects" filed concurrently herewith and assigned to the assignee of this application.

Figure 2:
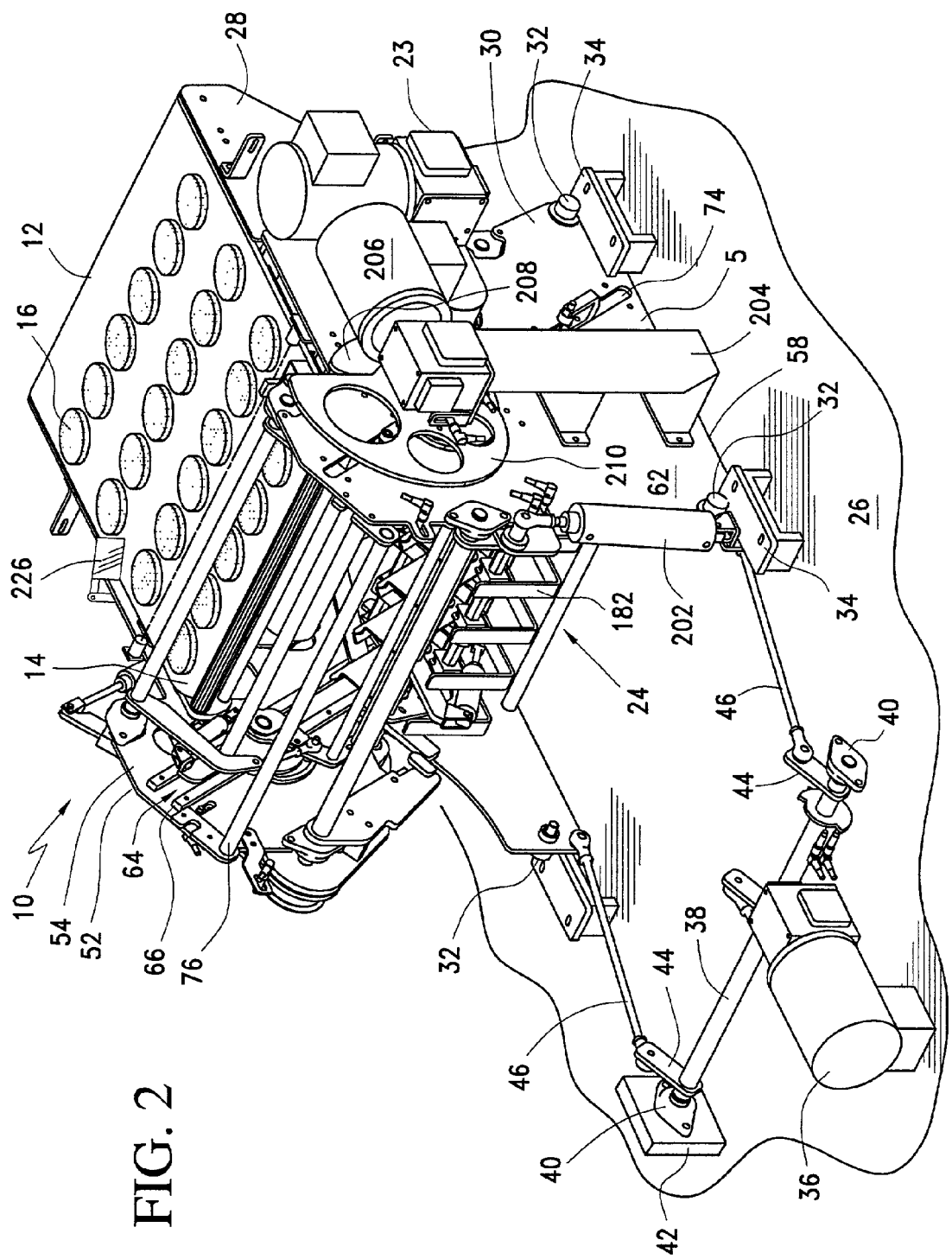
FIG. 2 is a perspective view of a stacking device according to the present invention which device includes a conveyor, an upper support, a lower support and a transfer device.
Figure 4:
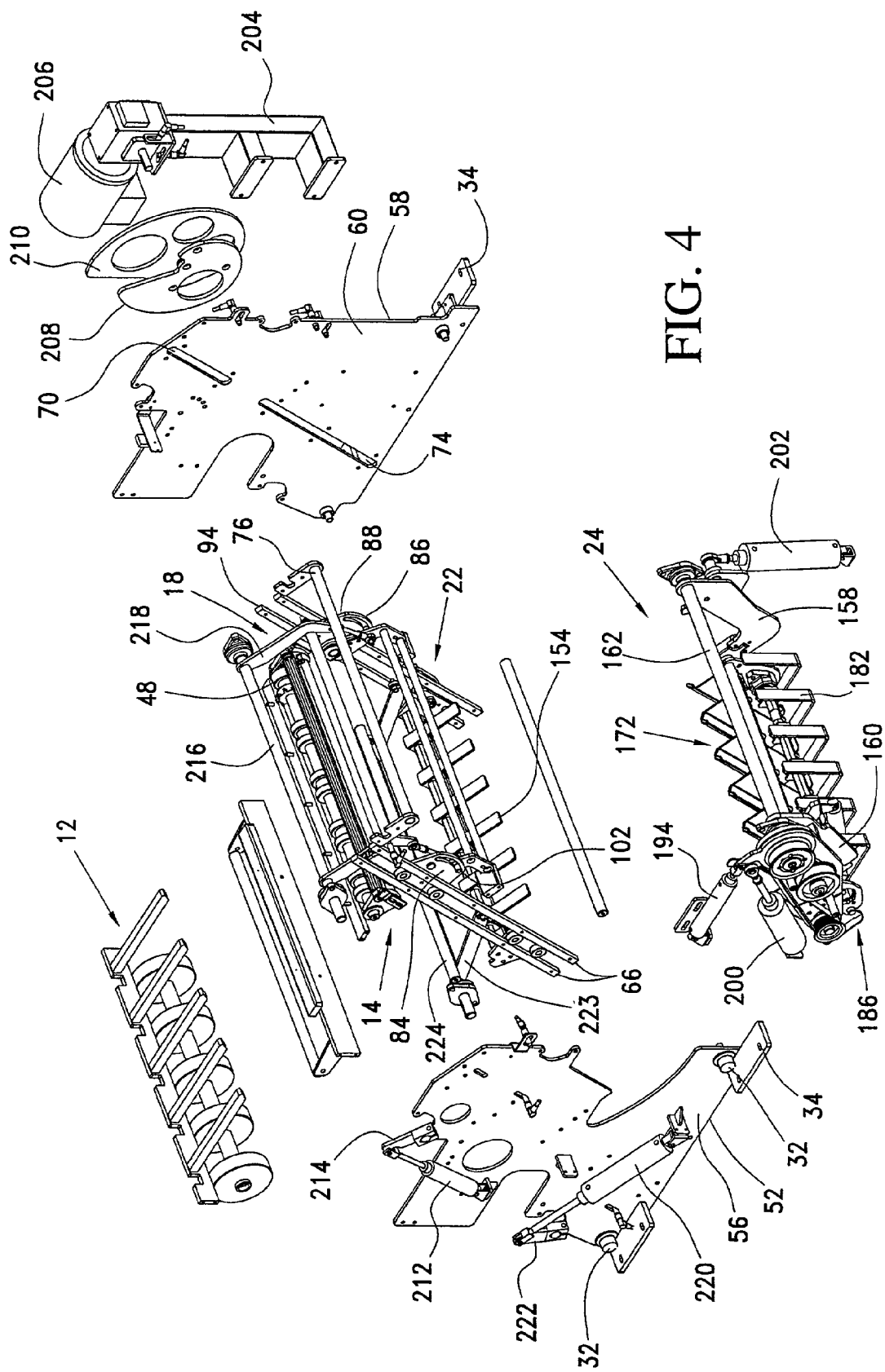
FIG. 4 is an assembly drawing of the stacking device of FIG. 2.
Figure 5:
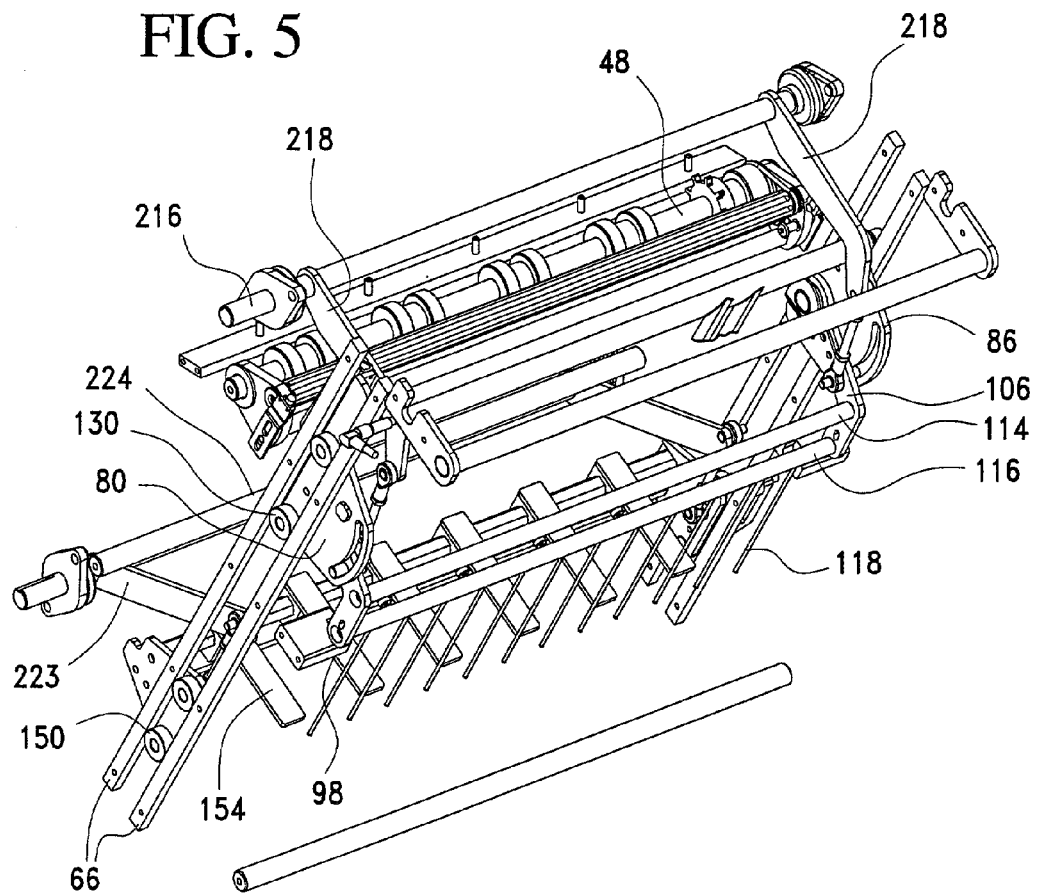
FIG. 5 is a perspective view of the upper support and lower support of FIG. 2.
Figure 6:
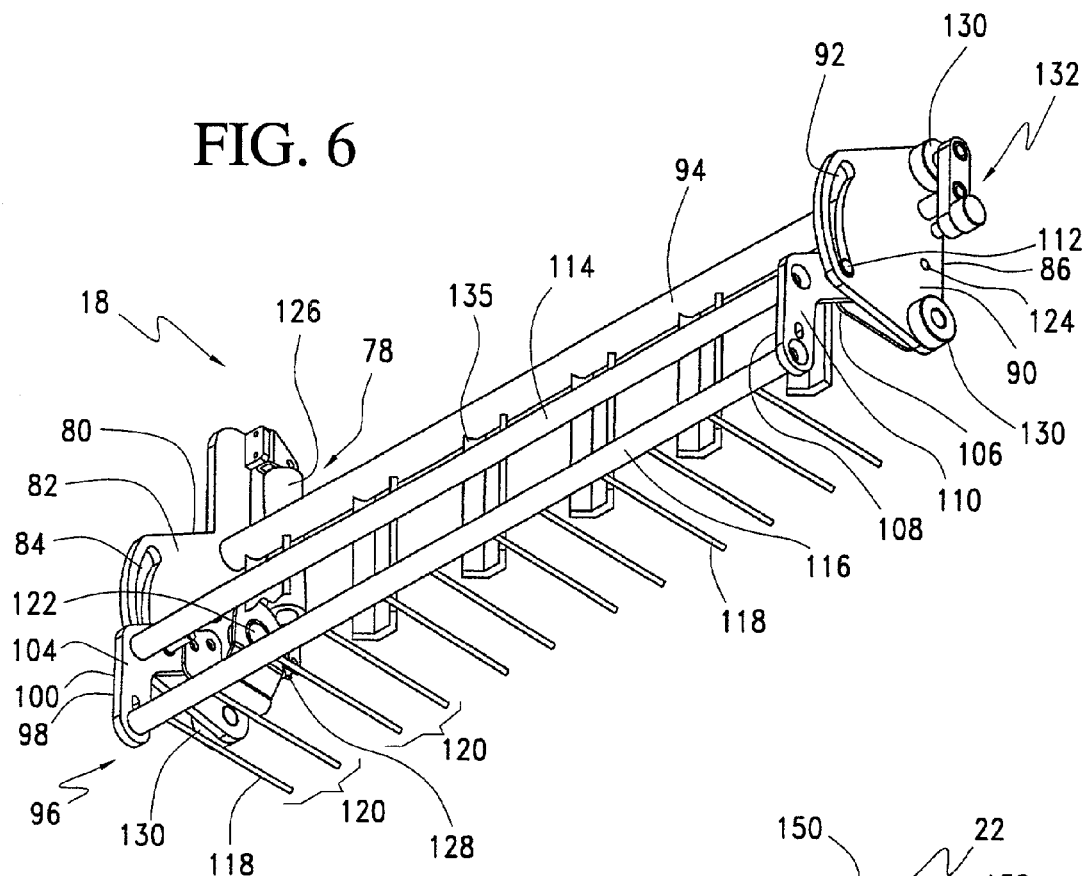
FIG. 6 is a perspective view of the upper support of FIG. 2.
Figure 12:
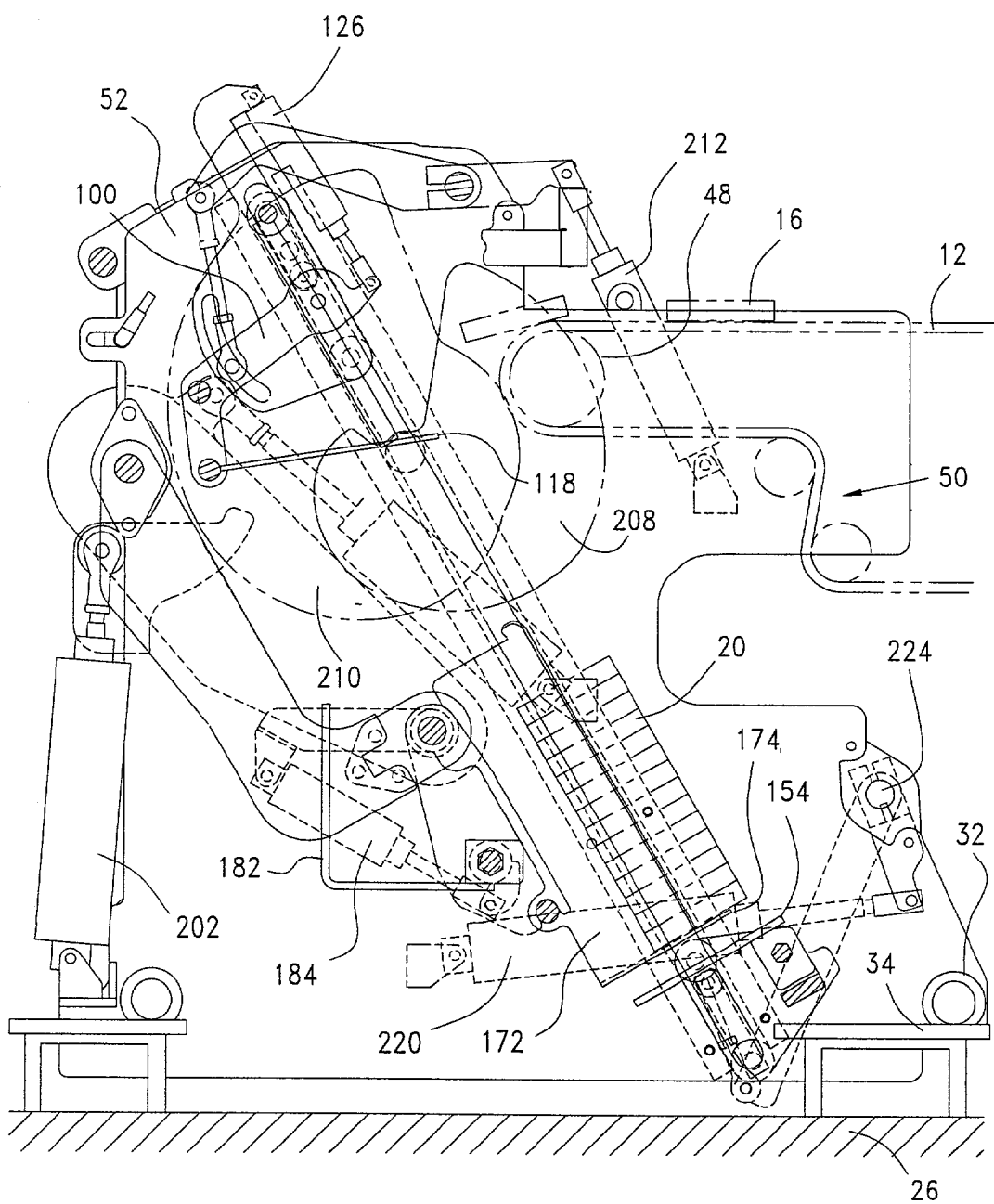
FIG. 12 is a side elevational view of the stacking device of FIG. 2 showing a stack of objects supported on the lower support moving toward the transfer device which has returned to its starting location beneath the second support.

As best shown in FIGS. 2 and 4, a stacking device 10 is positioned adjacent a conveyor 12 having an end edge 14. A plurality of disk-shaped objects 16, in this case, frozen hamburger patties, are arranged in rows on the conveyor 12 extending in the direction of movement of the conveyor 12. As conveyor 12 moves, it causes patties 16 to be advanced so as eventually to drop off end edge 14 onto an upper support 18, as best shown in FIG. 6, to form stacks 20 of patties thereon as best shown in FIG. 12. Upper support 18 is downwardly movable in order to keep the top of stacks 20 at a generally constant level with respect to end edge 14 of the conveyor 12. As upper support 18 descends, it transfers the accumulating stacks 20 to a lower support 22, as best shown in FIG. 4, and moves laterally out of the falling streams of patties so that further patties 16 from the conveyor 12 fall directly onto the stacks 20 supported by lower support 22. The lower support 22 is downwardly movable and continues to drop until a sensor 226 detects that the stacks 20 have reached their final size. At this point, lower support 22 transfers the stacks 20 to a stack transfer mechanism 24 that moves the stacks 20 laterally away from the conveyor 12 toward a discharge location. Additional falling patties 16 are caught by upper support 18 or lower support 22 as discussed above, and transfer device 24 returns to its starting position beneath the upper support 18 and the conveyor 12 before a subsequent set of stacks of patties 16 is complete. Controller 23, as best shown in FIG. 2, controls the operation of the stacking device, and is preferably a computer or PLC that controls the speed of various drives and the operation of the actuators that are described herein. The present system allows for a continuous processing of patties 16 arriving at the end edge 14 of a conveyor 12 without the need to stop the conveyor each time a stack is completed.

Stacker 10 is installed on a fixed support 26, such as a factory floor, and includes a fixed frame portion 28 fixed with respect to support 26 and a movable frame portion 30 that moves with respect to the fixed frame portion 24, which fixed frame portion 28 and movable frame portion 30 together form a frame for the stacker. Movable frame portion 30 includes four support wheels 32 resting on four platforms 34, which in turn rest on the fixed support 26. A motor 36 is operably connected to a shaft 38, which is rotatably supported by two bearings 40 that are supported by bearing supports 42, one of which is shown in FIG. 2, mounted on floor 26. Two arms 44 are fixed to shaft 38 and extend radially therefrom so that the ends of arms 44 describe an arc of a circle as the shaft 38 rotates. Tie rods 46 connect arms 44 to movable frame 30 so that, as motor 36 turns shaft 42 in a first direction, the movable frame portion 30 is pulled along platforms 34 toward motor 36, and as motor 36 turns in a second direction, the movable frame portion 30 is pushed along platforms 34 away from motor 36. The roller 48 supporting the end edge 14 of the conveyor 12 (FIG. 4) is supported on the movable frame portion 30 while other portions of conveyor 12 are supported by the fixed frame portion 28. Therefore, the conveyor 12 includes a slack take-up mechanism 50, shown in FIGS. 10–13, which allows the effective length of the conveyor 12 to increase and decrease as the movable frame portion 30 moves away from and back towards the fixed frame portion 28. When the effective length of the conveyor 12 is increased in this manner, the spacing is increased between rows of patties 16 arriving at end edge 14, and this extra spacing allows the upper support 18 to pivot back into the flow of falling patties to start a new stack.

Movable frame portion 30 comprises a first vertical plate member 52 having an inner wall 54 and an outer wall 56, and a second vertical plate member 58 having an inner wall 60 and an outer wall 62. A guide 64 is formed on inner wall 54 of the first vertical plate member 52 by a pair of spaced rails 66, while an upper guide is formed in the second vertical plate 58 by an upper slot 70, and a lower guide is formed in second vertical plate 58 by a lower slot 74. Rods 76 and 77 extend between the inner walls of the first and second vertical plates to maintain their spacing.

With reference to FIGS. 4 and 6, upper support 18 comprises a carrier 78 including a first side plate 80 having an inner side 82 and an arcuate slot 84, and a second side plate 86 having an inner side 88, an outer side 90 and an arcuate slot 92 aligned with arcuate slot 84 in the first side plate 80. The second side plate 86 is parallel to the first side plate 80 and spaced therefrom by connecting rod 94. Carrier 78 supports a pivoting member 96 comprising a first L-shaped member 98 having an outer wall 100 with a pin 102 (seen in FIG. 4) projecting therefrom and an inner wall 104, and a second L-shaped member 106 having an inner wall 108 facing inner wall 104 of the first L-shaped member 98 and an outer wall 110 from which a pin 112 projects. The outer wall 100 of first L-shaped member 98 overlies the inner side 82 of first side plate 80, with pin 102 received in arcuate slot 84, and extends beyond the first side plate 80. The outer wall 110 of the second L-shaped member 106 overlies the inner side 88 of second side plate 86 with pin 112 received in arcuate slot 92 of the second side plate 16. A first rod 114 extends between the middle portions of the inner walls 104, 108 of the first and second L-shaped members 98 and 106, respectively, and a second rod 116 extends between the portions of the first and second L-shaped members 98 and 106, respectively, that project beyond the first side plate 80 and second side plate 86. A plurality of pins 118 arranged in pairs 120 spaced apart by a given distance extend radially from second rod 116 as best shown in FIG. 6. First L-shaped member 98 is pivotally connected to the inner wall 82 of first side plate 80 at a pivot point 122, while second L-shaped member 106 is pivotally connected to the inner wall 108 of the second side plate 86 at a pivot point 124. An actuator 126, preferably a pneumatically actuated cylinder, is connected between first side plate 80 and an end 128 of first L-shaped member 98 on the opposite side of pivot point 122 from rod 114, which actuator 126 causes first L-shaped member 98, and hence carrier 78, to pivot about pivot points 122 and 124, while pins 102 and 112 in arcuate slots 84, 92 guide the movement of the pivoting member 96 with respect to the carrier 78. Guide wheels 130 are mounted on the outer walls of the first side plate 80 and second side plate 86 which wheels are received in the guides 64, 70 of the vertical plates 52 and 58 of the movable frame portion 30. A cam follower 132 also extends from the outer side 90 of the second side plate 86. Plates 133 attached to rod 94 form a backstop against which patties impact as they form stacks on the pairs 120 of pins 118.

Figure 7:
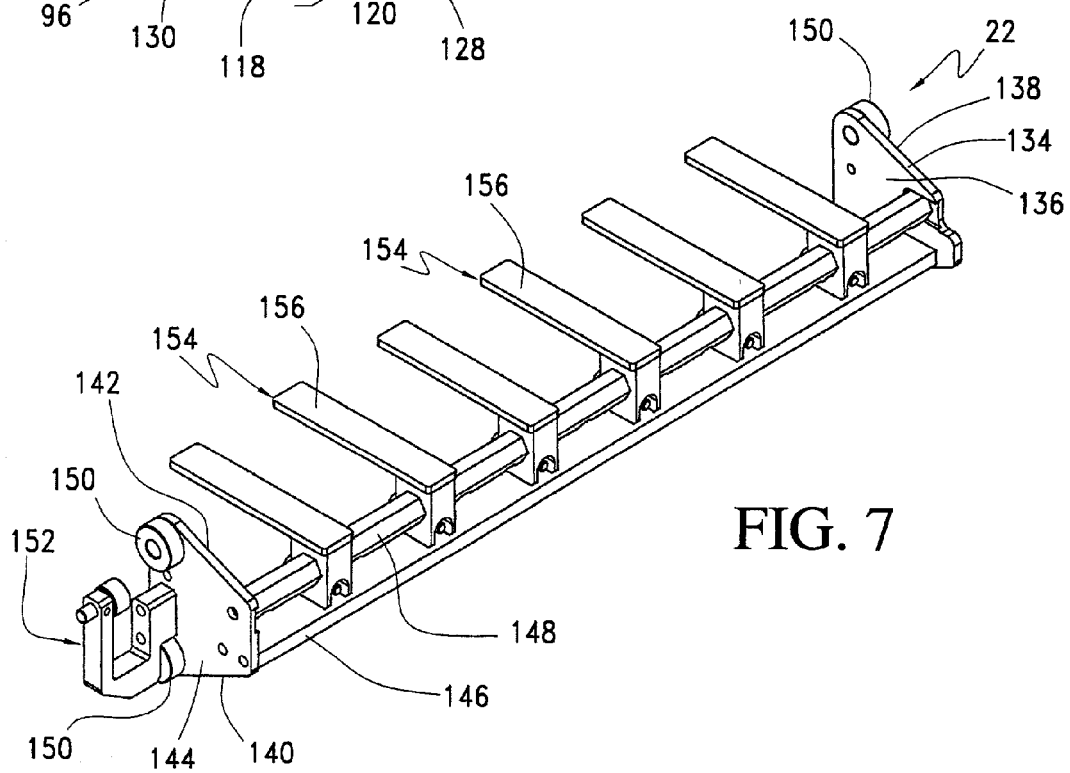
FIG. 7 is a perspective view of the lower support of FIG. 2.

FIG. 7 illustrates lower support 22, which includes a first side plate 134 having an inner side 136 and an outer side 138, and a second side plate 140 having an inner side 142 and an outer side 144. A strut 146 connects the inner sides of the first and second side plates 134 and 140, respectively, and a hexagonal rod 148 extends between the inner sides of the first and second plates parallel to strut 146. Guide wheels 150 are attached to outer sides 138 and 144 of first side plate 134 and second side plate 140, respectively, and the outer side 144 of second side plate 140 further includes a cam follower 152. A plurality of fingers 154 are attached to hexagonal rod 148, each of which includes at least one planar surface 156.

Figure 8:
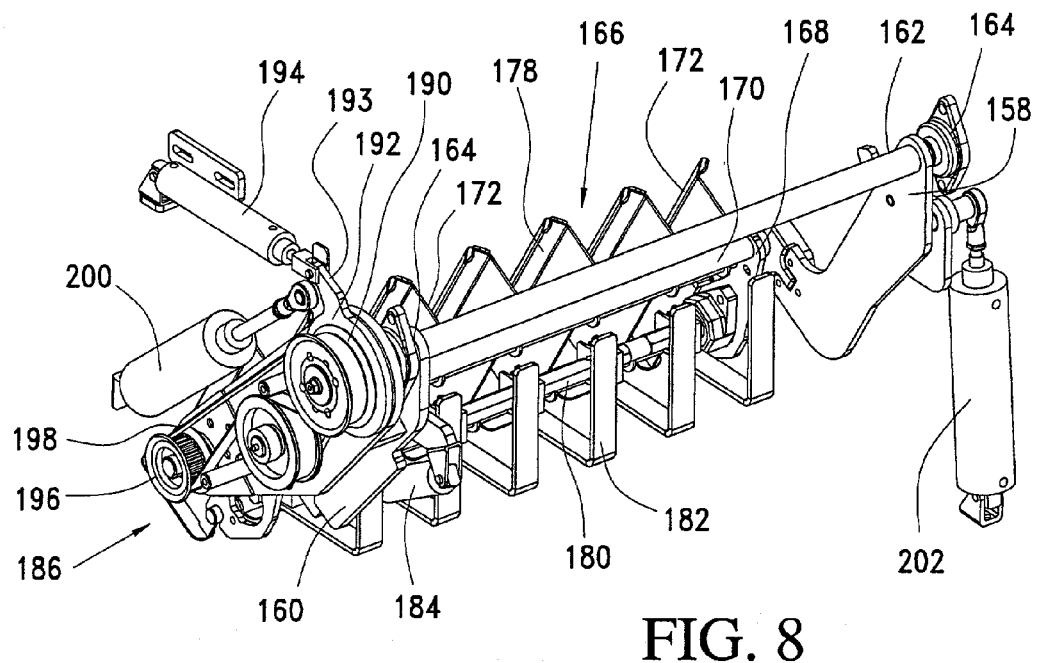
FIG. 8 is a perspective view of the transfer device of FIG. 2.
Figure 9:
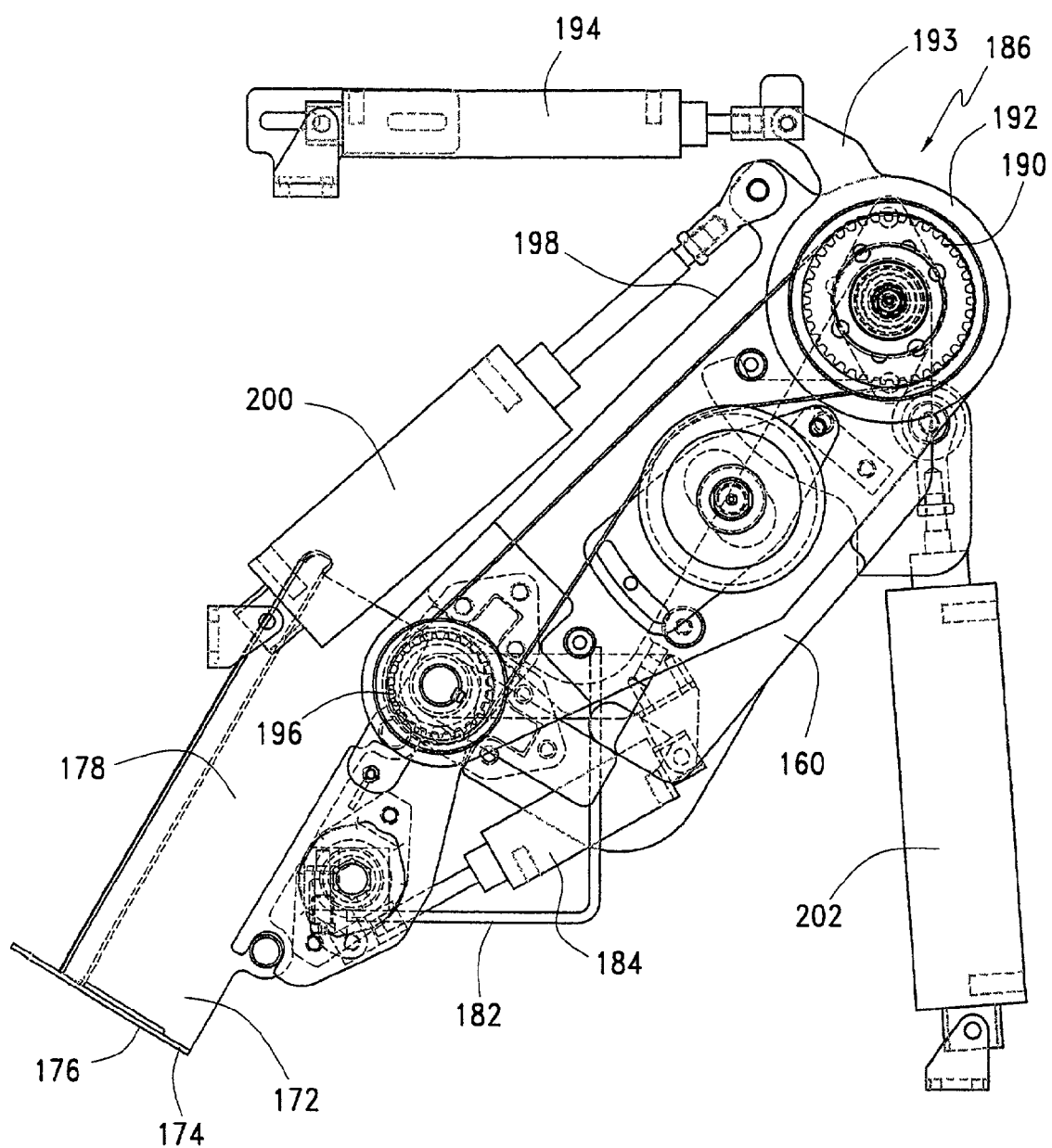
FIG. 9 is a side elevational view of the transfer device of FIG. 2.

Transfer mechanism 24, best shown in FIGS. 8 and 9, comprises a first L-shaped plate member 158 and a second plate member 160 parallel to and spaced from first plate member 158 by a rod 162 extending between end portions of plate members 158 and 160 which rod 162 is supported at either end by bearings 164. A tray assembly 166 includes two side plates 168 connected by a connecting rod 170. A plurality of trays 172, each having a bottom wall 174 having a slot 176 and side walls 178, are pivotally attached to plate members 158, 160. A hexagonal rod 180 is rotatably attached between side plates 168, and a plurality of L-shaped covering fingers 182 are attached thereto. Actuator 184, connected between the plate member 158 and hexagonal rod 180, rotates the hexagonal rod 180 to move the L-shaped fingers 182 between a first position where a portion of the L-shaped fingers 182 overlies the trays 172 and a second position, as best shown in FIG. 8, where no portion of the L-shaped fingers 182 overlies the trays 172.

Figure 3:
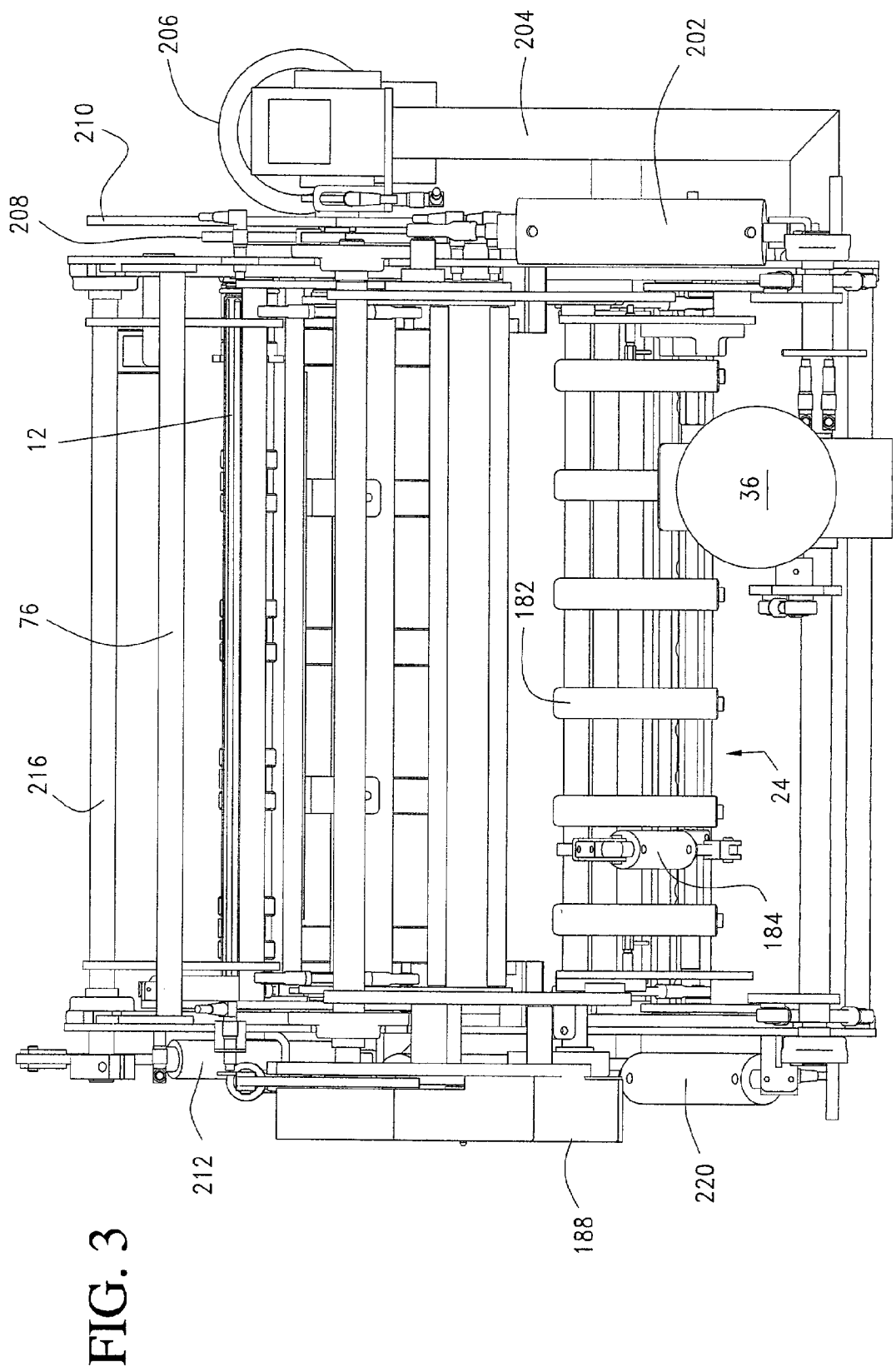
FIG. 3 is an end elevational view of the stacking device of FIG. 2.

As best shown in FIG. 8, a belt drive 186 is located in housing 188 (seen in FIG. 3) attached to plate member 160, and includes a first flanged wheel 190 mounted on the outer side of plate member 160, which flanged wheel is coupled to a member 192 having an extending lever arm 193 connected to an actuator 194. A second flanged wheel 196 is operably coupled to connecting rod 170 and rotationally coupled to first flanged wheel 190 by a belt 198. When actuator 194 presses against lever arm 164, it rotates the first flanged wheel 180 which rotation moves belt 198 and causes the second flanged wheel 196 and hence connecting rod 170 to rotate; this tilts tray assembly 166 with respect to plates 158, 160. Actuator 200 attached to second plate member 160 causes the entire tray assembly 166 to pivot about the axis of rod 162, while actuator 202 moves the tray assembly 166 away from the conveyor 12 toward a stack discharge location and return the tray assembly 166 to its starting position after the patties have been discharged.

Referring now to FIG. 2, a motor support 204 is mounted on the outer wall 62 of vertical support plate 58, and a motor 206 is mounted on the support. The motor 206 turns a shaft connected to vertical plate 58 and two cams—an inner cam 208 adjacent plate 58 and an outer cam 210 between the inner cam and the motor 206.

The mounting of upper support 18 between first vertical plate 52 and second vertical plate 58 is apparent in FIG. 4 which illustrates the guide wheels 130 of second L-shaped member 106 received between rails 66 of guide 64 and guide wheels 130 of first L-shaped member 98 extending toward upper slot 70 of second vertical plate member 58. Cam follower 132 rides along the outer surface of inner cam 208 and the downward movement of the upper support 18 is limited by the bottom end of slot 70. The mechanism for holding the upper support 18 against cam 208 is best seen in FIG. 4, and comprises an actuator 212 mounted on the outer wall 56 of first vertical plate 52 which moves a lever arm 214 attached to a rotatable shaft 216 mounted between first vertical plate 52, and second vertical plate 58 at an upper edge thereof. From shaft 216 extend first and second angled arms 218 which overlie connecting rod 94 of the upper support. By moving lever arm 214, actuator 212 raises and lowers angled arms 218 to press down upon the upper support or to move the arms 218 away from the upper support.

Lower support 22, as best seen in FIG. 4, is mounted between first vertical plate 52 and second vertical plate 58 with the guide wheels 150 of the outer sides 138 of first plate 134 received between rails 66 of guide 64 and the set of guide wheels 150 on the outer side 144 of second plate 140 extending through lower slot 74 of second vertical plate 58. Cam follower 152 is biased upwardly against outer cam 210 by a mechanism that includes an actuator 220 mounted on the outer wall of 56 of the first vertical plate 52 connected to a lever arm 222 which in turn is connected to a shaft 224 rotatably mounted between the first and second vertical plates 52, 58 on the edge of the plates beneath the conveyor 12. Two arms 223 connect shaft 224 to first side plate 134 and second side plate 140 of lower support 22 so that, when actuator 220 moves lever arm 222 and turns shaft 224 in a first direction, cam follower 152 of the lower support 22 is pressed upwardly against outer cam 210 and pulled away from outer cam 210 when shaft 224 is turned in the opposite direction.

Figure 10:
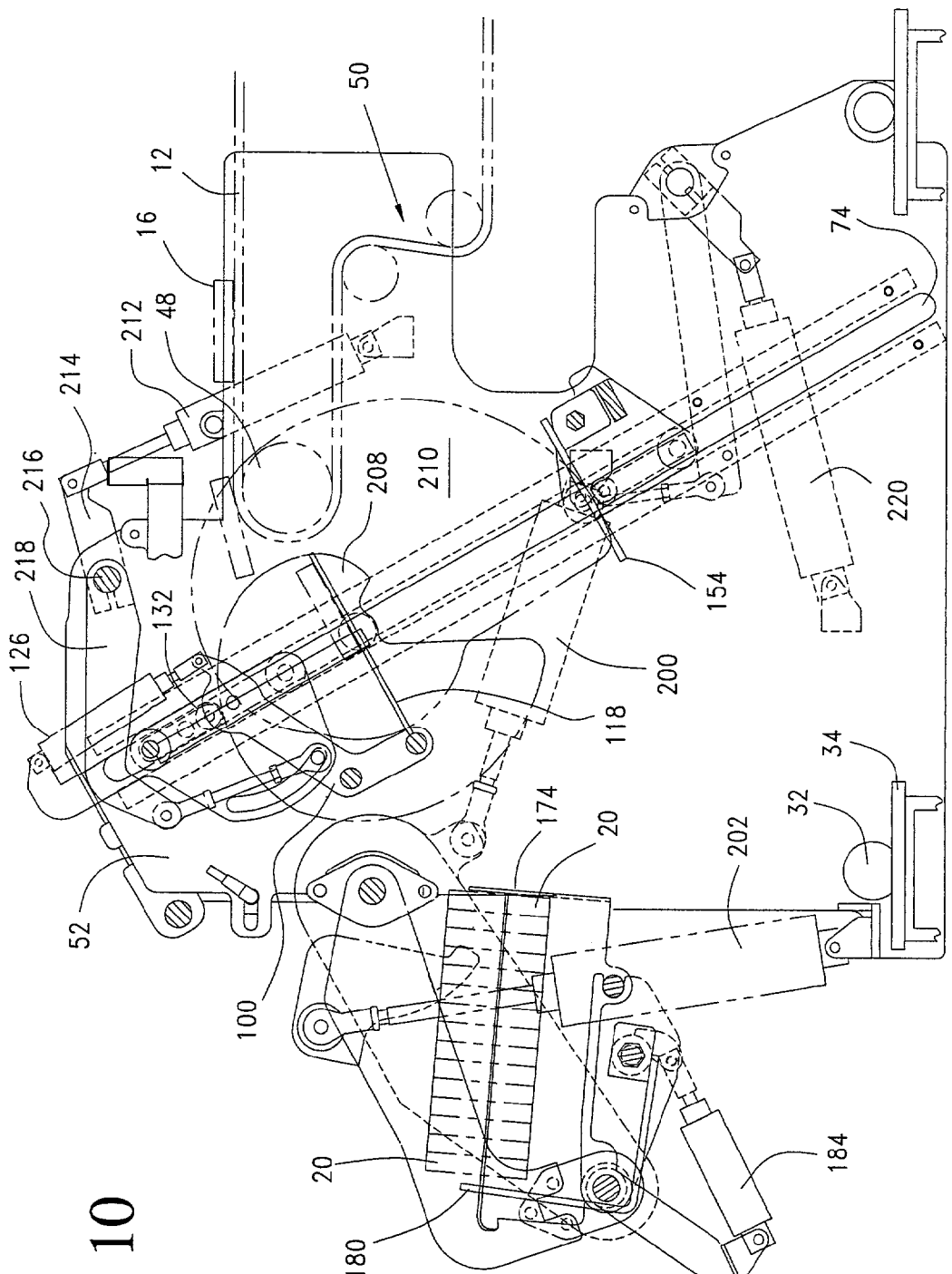
FIG. 10 is a side elevational view of the stacking device of FIG. 2 showing a stack of objects that has just been transferred from the second support to the transfer device.

The operation of the stacker will now be described with reference primarily to FIGS. 10 though 13 which illustrate the stacker in various stages of forming a plurality of hamburger patties into stacks and transferring those stacks from a stacking location toward a discharge location. Beginning with FIG. 10, patties 16 move along conveyor 12 and fall over the end edge 14 of the conveyor onto fingers 118 of upper support 18. FIG. 10 illustrates one patty 16 already supported by the fingers 118 with another about to fall onto the first patty to begin to form a stack. Beneficially, the upper support 18 and the lower support 22 are located generally beneath the end edge 14 of the conveyor 12, and thus the stacks that form on the upper and lower supports are also formed generally beneath the conveyor 12. This formation of stacks beneath the end of the conveyor advantageously contributes to the compact size of this stacking device because the stacks are formed against the direction of movement of conveyor 12. Actuator 212 rotates lever arm 214 to turn shaft 216 to press arms 218 against the upper support to hold the upper support cam follower 132 against inner cam 208, and, as the radius of cam 132 decreases while it rotates counterclockwise as viewed in FIGS. 10–13, the upper support 18 moves downwardly toward the lower support 22. The rotation of the inner cam 208 is based on the rate that the stack is forming as detected by optical detector 226, best shown in FIG. 2, so that the top of stack 20 remains approximately the same distance below conveyor end edge 14 and ensures that each patty drops a similar distance in a similar manner to form consistent stacks.

Figure 11:
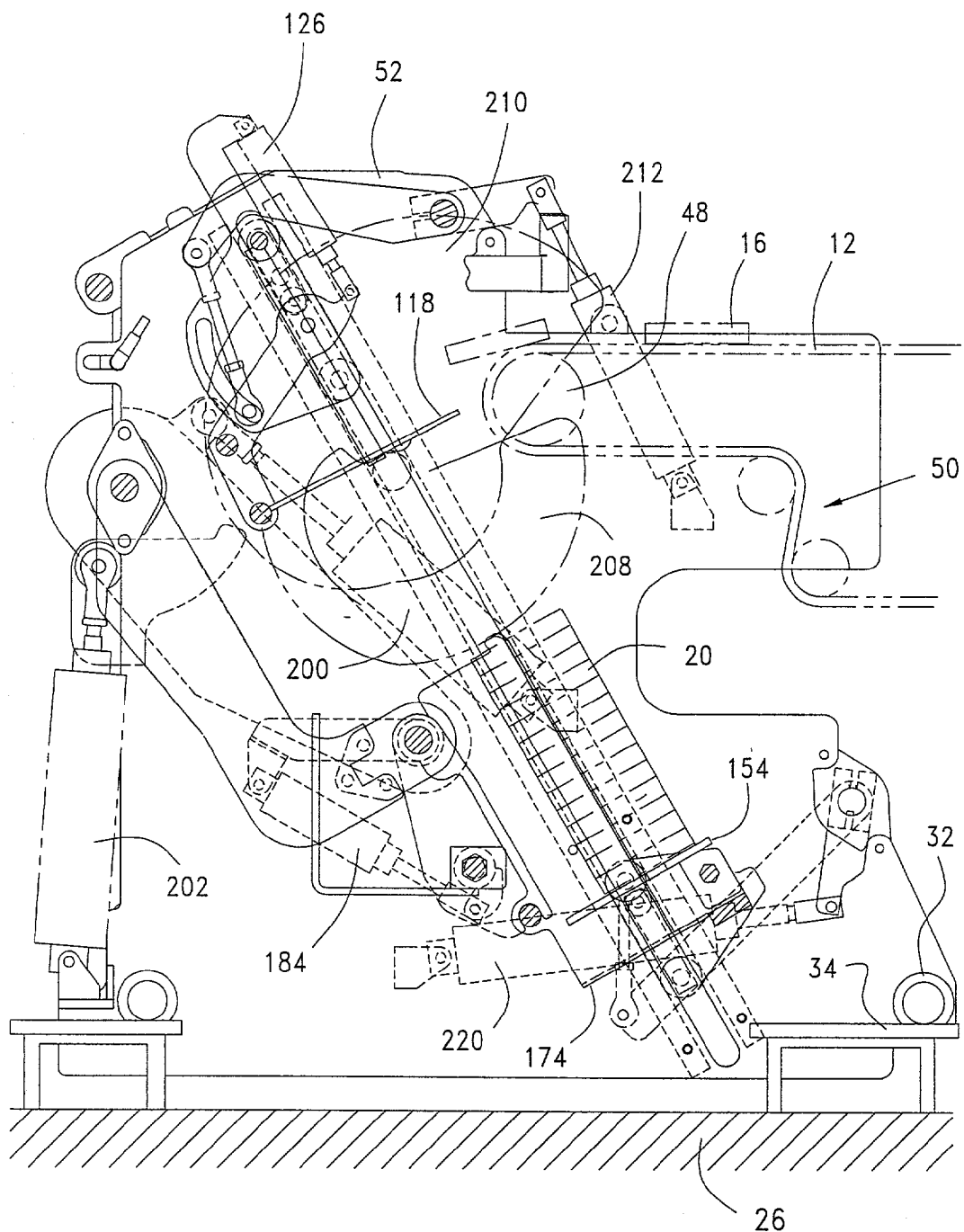
FIG. 11 is a side elevational view of the stacking device of FIG. 2 showing the transfer device in a position to release a stack at a discharge location while a second stack of objects on the upper support moves toward the lower support.

FIG. 11 illustrates stack 20 on finger elements 154 of lower support 22. As the upper support 18 continues its descent, the pair of fingers 118 of the upper support 18 supporting the stack will pass to either side of one of the fingers 154 of the lower support 22 so that, as the upper support 18 continues to drop past the lower support 22, the stack 16 will be deposited on the lower support 22. Actuator 126 pivots the upper support 18 away from the conveyor 12 so that additional patties 16 may fall onto the stack on the lower support 22.

In FIG. 12, the stack has grown to its finished size, at which point actuator 220 pivots shaft 224 to drop the lower support 22 to cause lower support finger 154 to pass through the slot 176 in bottom wall 174 of one of the trays 172 of the transfer mechanism 24, to leave the stack supported on the transfer mechanism 24. In this figure too, the pins 118 of the upper support 18 can be seen moving back toward conveyor 12 to catch the next patty falling therefrom in order to start a second stack rather than allowing it to fall on to the completed stack on the transfer mechanism 24. At this point, motor 36 rotates shaft 38 to pull movable frame 30 away from fixed frame 28 to lengthen the conveyor (effectively moving end edge 14 away from the next row of patties) and delay the passage of additional patties over end edge. This second stack will be processed in the same manner as was the first stack.

Figure 13:
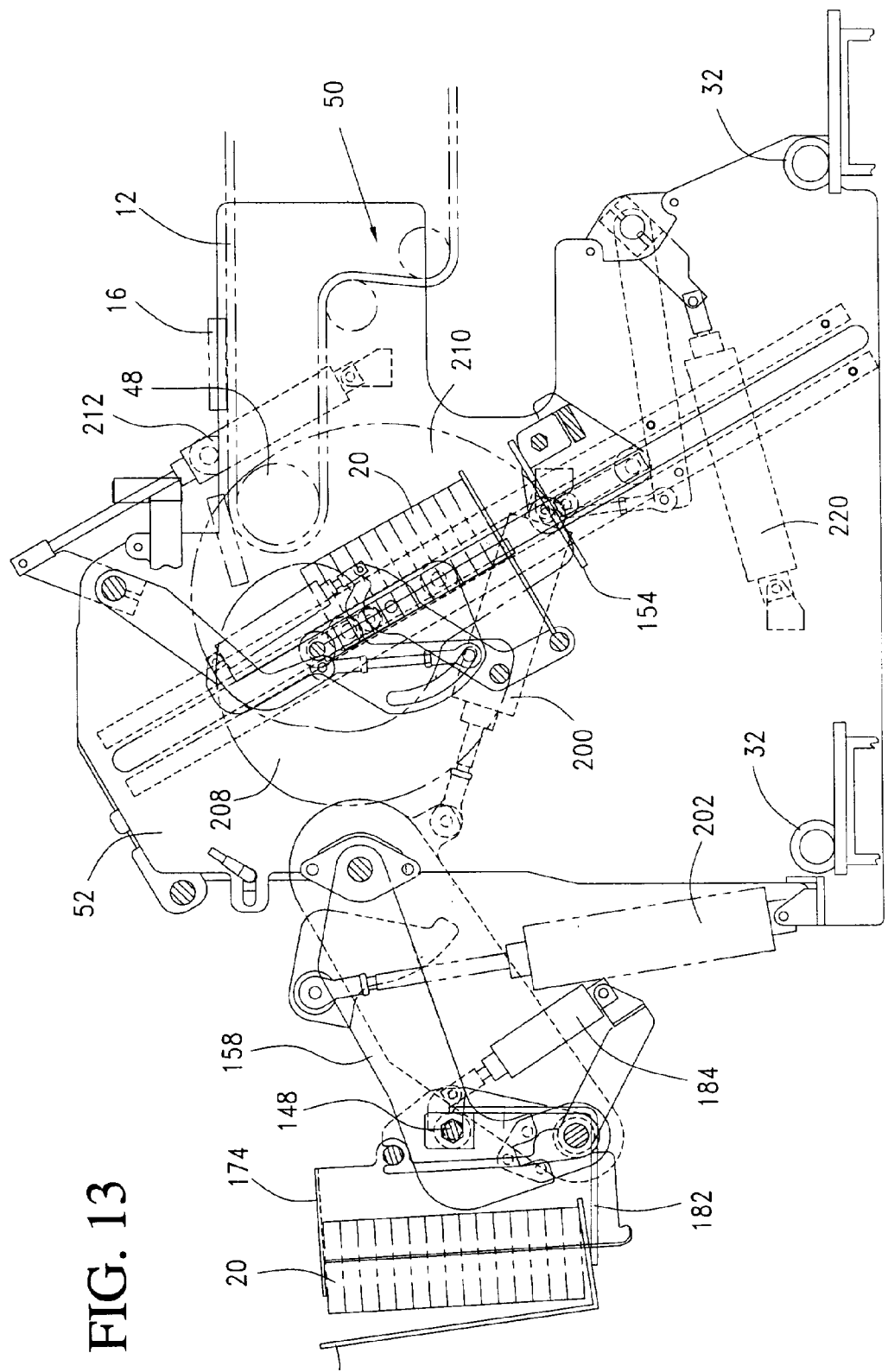
FIG. 13 is a side elevational view of the stacking device of FIG. 2 showing the transfer device rotating and translating a stack of objects toward a discharge location while the upper support catches objects dropping off the conveyor.

FIG. 13 shoes that the transfer mechanism 24 has rotated and translated away from the conveyor 12 toward a discharge location 228 on which the stacks will be deposited. To accomplish this movement, actuator 200 first pulls and then pushes against lever arm 201, as best shown in FIG. 9, to rotate lever arm 201 in a counterclockwise direction as seen in FIG. 9 which, through a gearing mechanism, rotates tray assembly 166 to the inverted orientation seen in FIG. 13. Actuator 194 presses against lever arm 193 to pivot the tray assembly 166 relative to the transfer mechanism wall 158 to fully invert the stack 20 of patties and deposit them onto holder 228, which holder has a slot in a bottom support wall to allow covering fingers 182 to pass therethrough when actuator 184 moves the covering fingers 182 away from the stack prior to returning to its starting location beneath the conveyor 12 in time to receive the next stack of patties from the lower support 22.

During the foregoing process, drive 36 rotates shaft 38 to move movable frame 30 along supports 34 on fixed frame 28 to position the movable frame portion 30 and hence the transfer mechanism 24 for optimal operation. As seen in FIG. 12, where stack 20 is transferred from the lower support 22 to the transfer mechanism 24, movable frame portion 30 is closest to fixed frame portion 30, and wheels 32 are positioned near the right edges of supports 34 as viewed in FIGS. 10–13. FIG. 10 illustrates the transfer mechanism 24 has moved to a point approximately halfway between the conveyor 12 and discharge location 228, and movable frame portion 30 has also moved in this direction as can be seen from the positions of wheels 32 on the supports. In FIG. 12, transfer mechanism 24 has reached discharge location 228, and the movable frame portion 30 has also moved closer to the discharge location as can be seen from the positions of wheels 32 on the supports 34. As discussed above, this motion provides for lengthening and shortening the conveyor as needed to vary the spacing between advancing rows of patties to give the upper support time to move into a stream of falling patties.

Buffer

Figure 14:
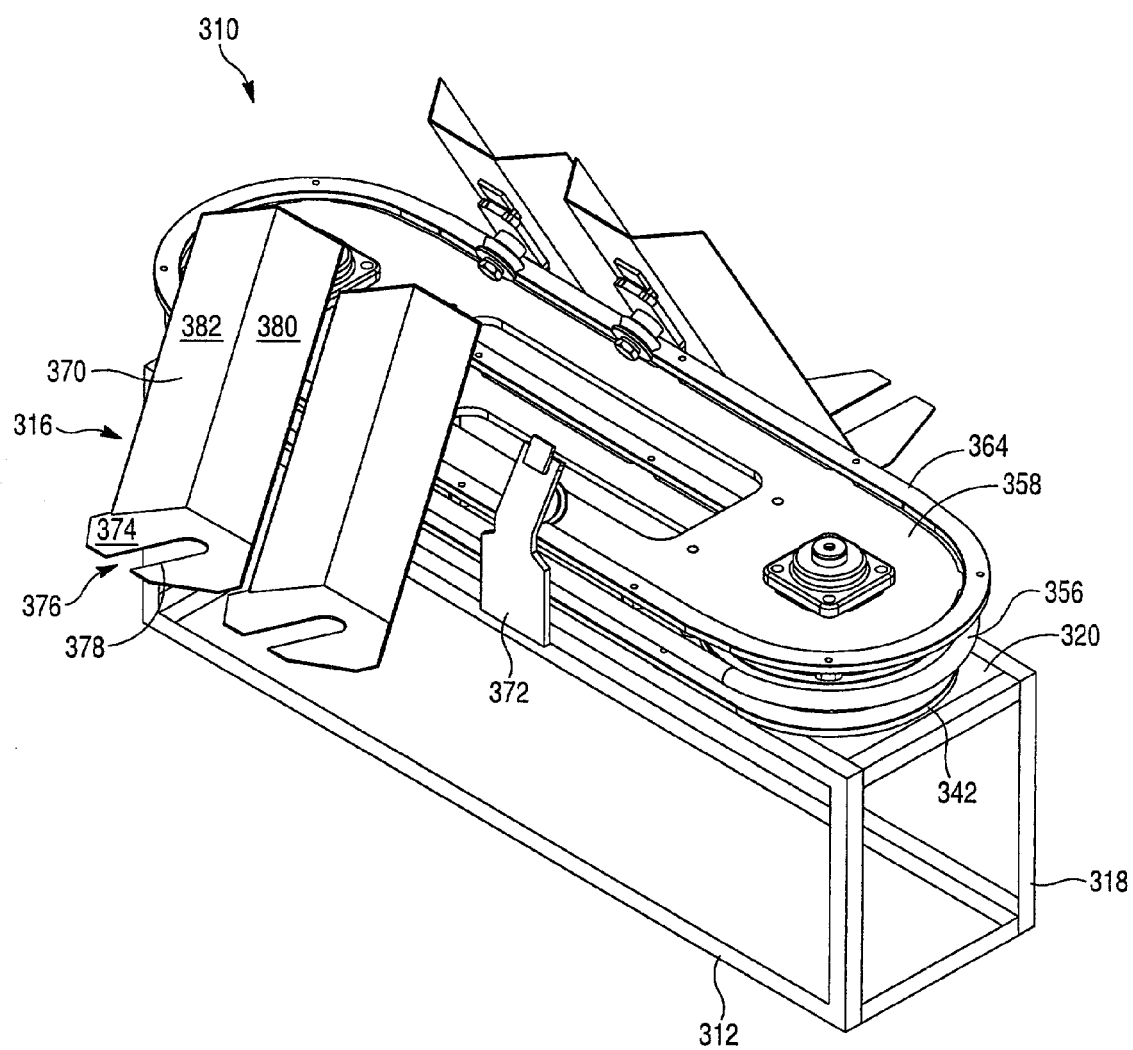
FIG. 14 is a perspective view of the buffer device having a plurality of trays supported on carriers as shown in FIG. 1.
Figure 15:
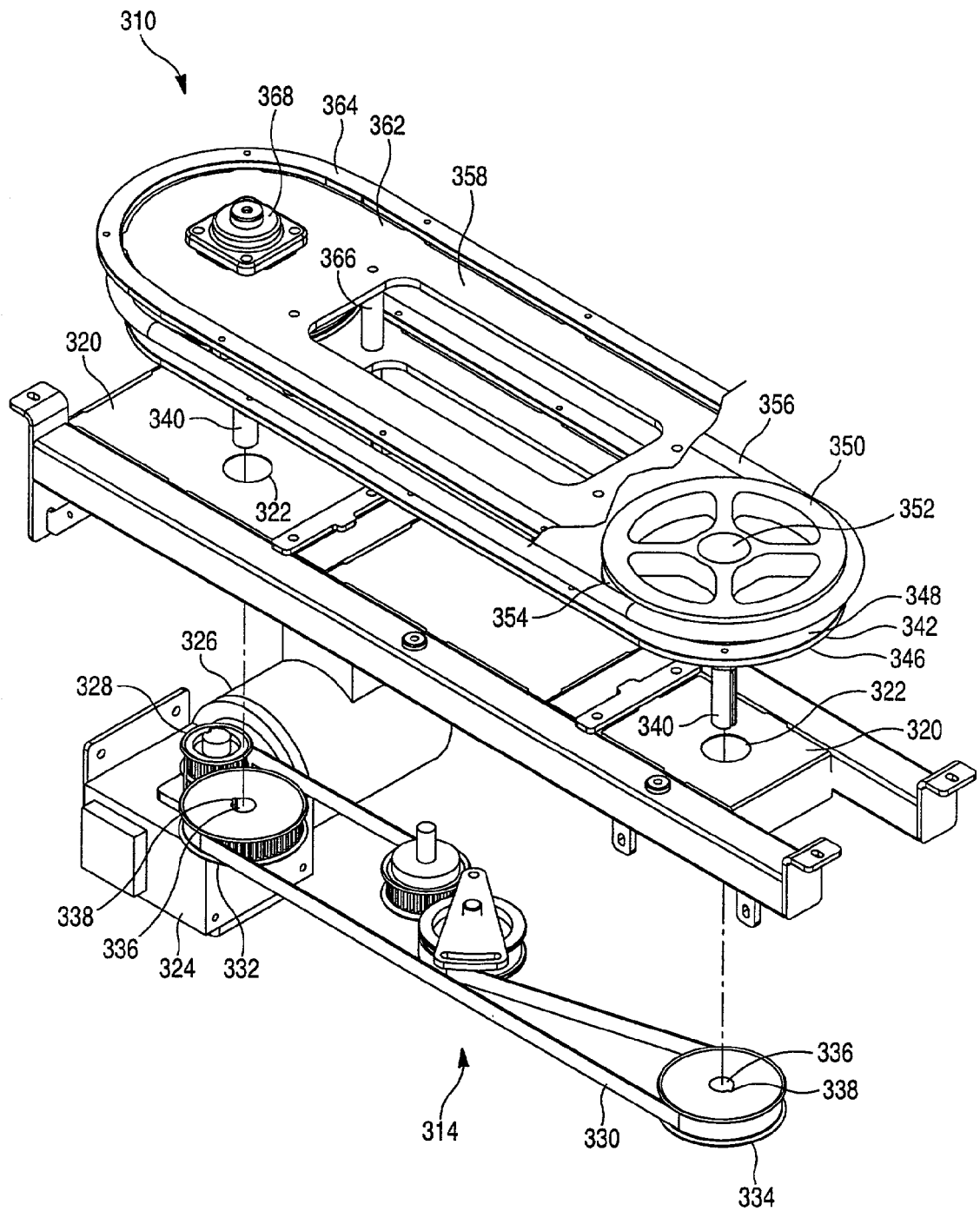
FIG. 15 is a fragmentary assembly drawing of a portion of the buffer device of FIG. 14 with the carriers and trays removed.

The buffer portion of the subject system is described in an application entitled "Method And Apparatus For Buffering A Flow Of Objects" filed concurrently herewith and assigned to the assignee of this application. FIGS. 14 and 15 illustrate buffer device 310 which includes a frame 312, a drive 314 and a plurality of carriers 316, as best shown in FIGS. 16–20, supported by the frame 312. Frame 312 includes vertical support portions 318 adapted to support the frame on a horizontal support surface, a generally planar upper support portion 320 that includes first and second openings 322, and a motor support 324 mounted beneath upper planar portion 320.

Drive 314 includes a motor 326 mounted on motor support 324 and operably connected to a drive gear 328 which turns a continuous drive belt 330 about a plurality of flanged wheels, including a first wheel 332 and a second wheel 334. First and second wheels 332 and 334 each include a center opening 336 having a notch 338 for receiving a splined shaft. Two splined shafts 340 extend from center openings 336 upwardly through first and second openings 322 in the frame upper support 320.

Figure 18:
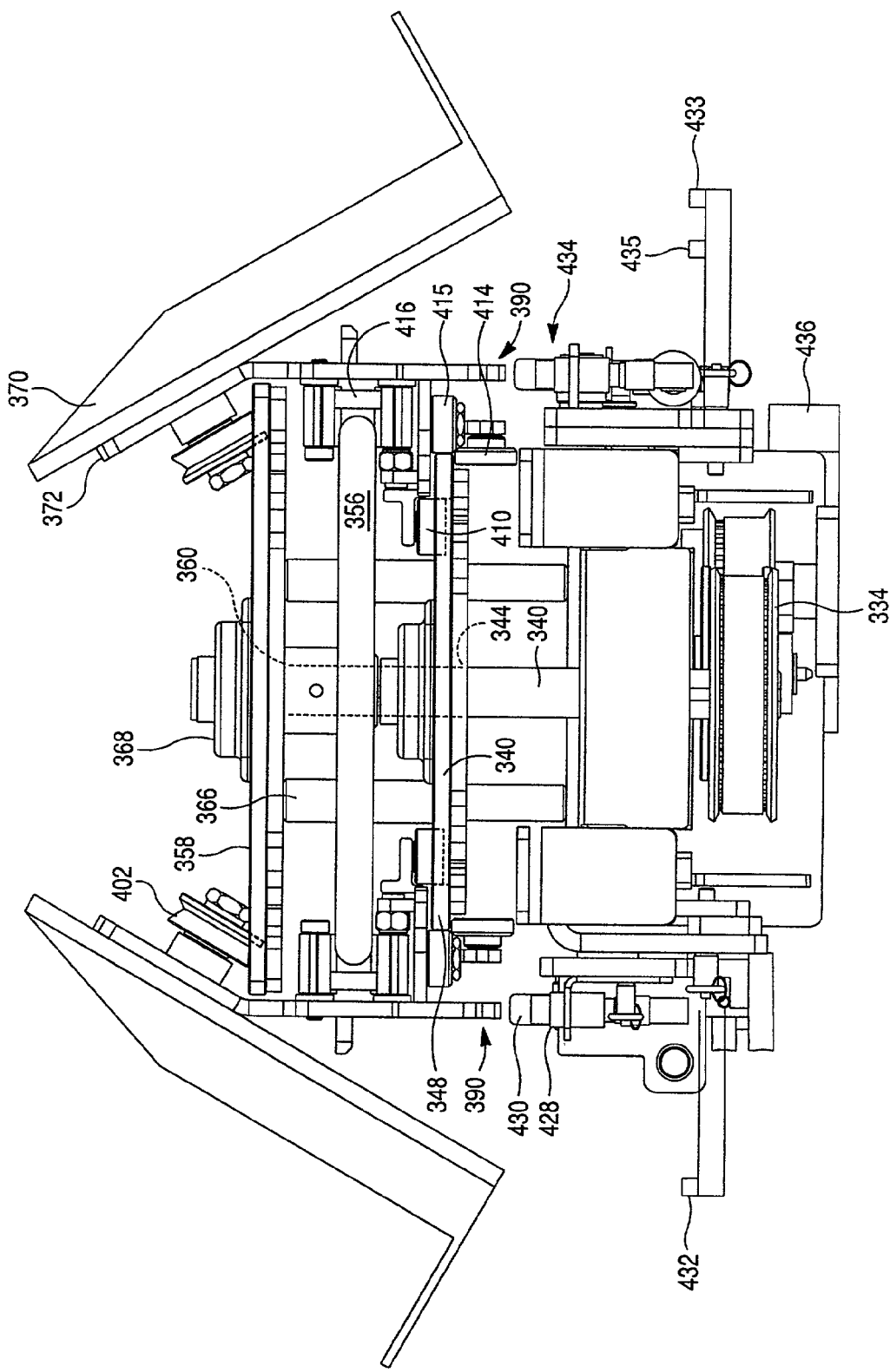
FIG. 18 is a side elevational view of the buffer of FIG. 14.

A bottom plate 342 having first and second openings 344, as best shown in FIG. 18, a peripheral edge 346 and a raised rail 348 running around the peripheral edge is mounted on frame upper support 320 with first and second openings 344 aligned with openings 322 in the frame upper support 320 so that splined shafts 340 extend though these openings. Wheels 350, as best shown in FIG. 15, are mounted on each of the splined shafts which wheels include center openings 352 shaped to receive shafts 340 and peripheral grooves 354 for receiving and holding a drive belt 356. The drive belt 356 preferably has a circular cross section and is formed from a flexible, wear-resistant material, such as urethane.

A top plate 358 having first and second openings 360, a peripheral edge 362 and a raised rail 364 running around the peripheral edge is mounted over bottom plate 342 and spaced apart therefrom by spacers 366, with openings 360 positioned to receive splined shafts 340. Bearings 368 are mounted on top plate 356 to rotatably secure the ends of shafts 340. Thus, motor 326 turns drive gear 328 and causes drive belt 330 to move about first wheel 332 and second wheel 334, which in turn causes splined shafts 340 and wheels 350 mounted thereon to rotate and drive drive belt 356 about a continuous path between bottom plate 342 and top plate 358. Drive belt 356 preferably has a diameter greater than the width of peripheral grooves 354, so that the belt only contacts the wheels about a small portion, less than 180 degrees, of the belt's circumference.

Figure 17:
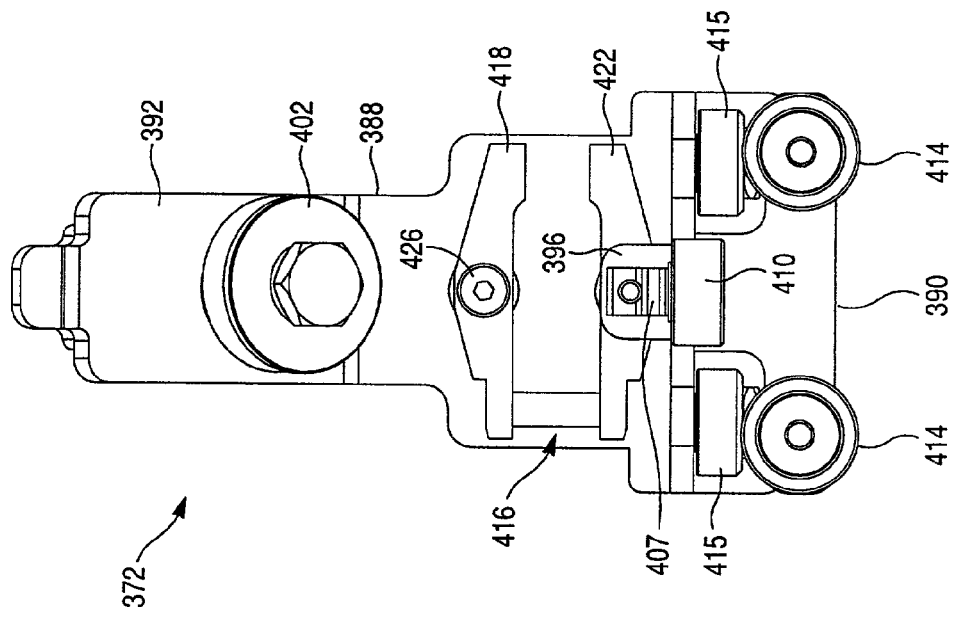
FIG. 17 is a rear elevational view of the carrier of FIG. 16.
Figure 16:
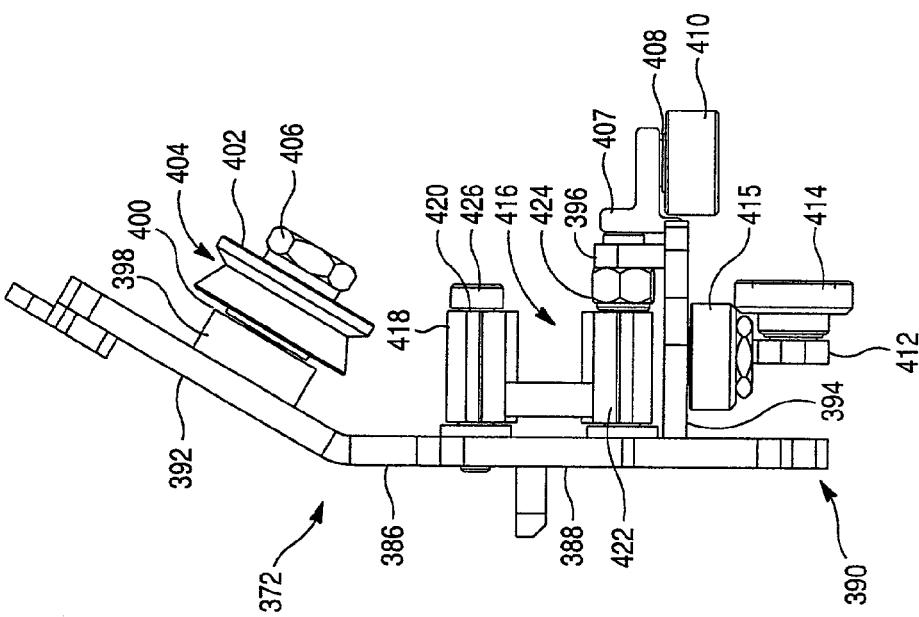
FIG. 16 is a side elevational view of one of the carriers shown in FIG. 14.

FIG. 14 illustrates a plurality of carriers 316 mounted on the top and bottom plates which carriers comprise trays 370 supported by trolleys 372 as best shown in FIGS. 15–17. Each tray 370 includes a bottom wall 374 having a centrally located slot 376 with a slot edge 378, a rear wall 380 and sidewalls 382. The trays 370 are preferably mounted on the trolleys 372 in a manner that allows for easy removal thereof, so that appropriately sized trays 370 can be used for the objects being processed. Each trolley 372, shown in more detail in FIGS. 16 and 17, includes a body portion 386 having a lower portion 388 with a lower end 390 and an upper portion 392 angled with respect to the lower portion 388. A wall 394 projects from body lower portion 388 in the same direction as the angle of the upper portion, and includes a small wall 396 projecting from its end in the direction of angled upper portion 392. A boss 398 is mounted on upper portion 392 and supports a shaft 400 on which a wheel 402 having a V-shaped peripheral notch 404 is rotatably mounted and held in place by a retainer 406. A wheel support 407 is connected to wall 394, and small wall 396 supports shaft 408 on which guide wheel 410 is mounted for rotation about an axis parallel to lower portion 388 of body portion 386. Projections 412 extending from the lower side of wall 394 support two additional guide wheels 414, which guide wheels 414 are mounted for rotation about axes normal to body lower portion 388. Guide wheels 415 are also mounted on the bottom side of wall 394, with axes parallel to body portion 388 and between guide wheels 414 and body portion 388.

A clamp 416 is mounted on body lower portion 388 between guide wheels 410 and notched wheel 402, and includes an upper clamp member 418 pivotably supported on lower body portion 388 by a shaft 420, and a lower clamp member 422 pivotably supported on a shaft 424 extending between lower body portion 388 and small wall 396. Both the upper and lower clamp members are coated with, or preferably formed from, a low-friction, wear resistant material, such as UHMW polyurethane. The angular relationship between the upper and lower clamp members, and hence the distance separating the ends of the clamp members, can be adjusted by pivoting the upper clamp member and fixing it in place with fastener 426.

The mounting of carriers 316 on the upper and lower plates is best shown in FIG. 18, wherein trays 370 are detachably connected to trolleys 372, and the trolleys are arranged such that notch 404 of wheel 402 on the angled upper portion 392 of the trolley fits over an edge of raised rail 64 on the periphery of top plate 358, guide wheels 410 engage the inner edge of raised rail 348 on bottom plate 342, guide wheels 415 engage the outer edge of raised rail 348, and guide wheels 414 engage the underside of bottom plate 342.

The upper and lower members 418 and 422, respectively, of clamp 416 are attached to drive belt 356 by placing the belt between the members and clamping the upper member in place so that a small force is exerted against the belt by the clamp members. The force must be great enough that friction between the clamp 416 and the belt 356 will keep the trolleys 372 fixed with respect to the belt when the path of the trolleys 372 is clear. The force also must be small enough that the frictional force between the belt 356 and the clamp 416 can be overcome by the drive motor to cause the belt to slip through the clamp when movement of one or more of the trolleys 372 is blocked by a stop.

Figure 19:
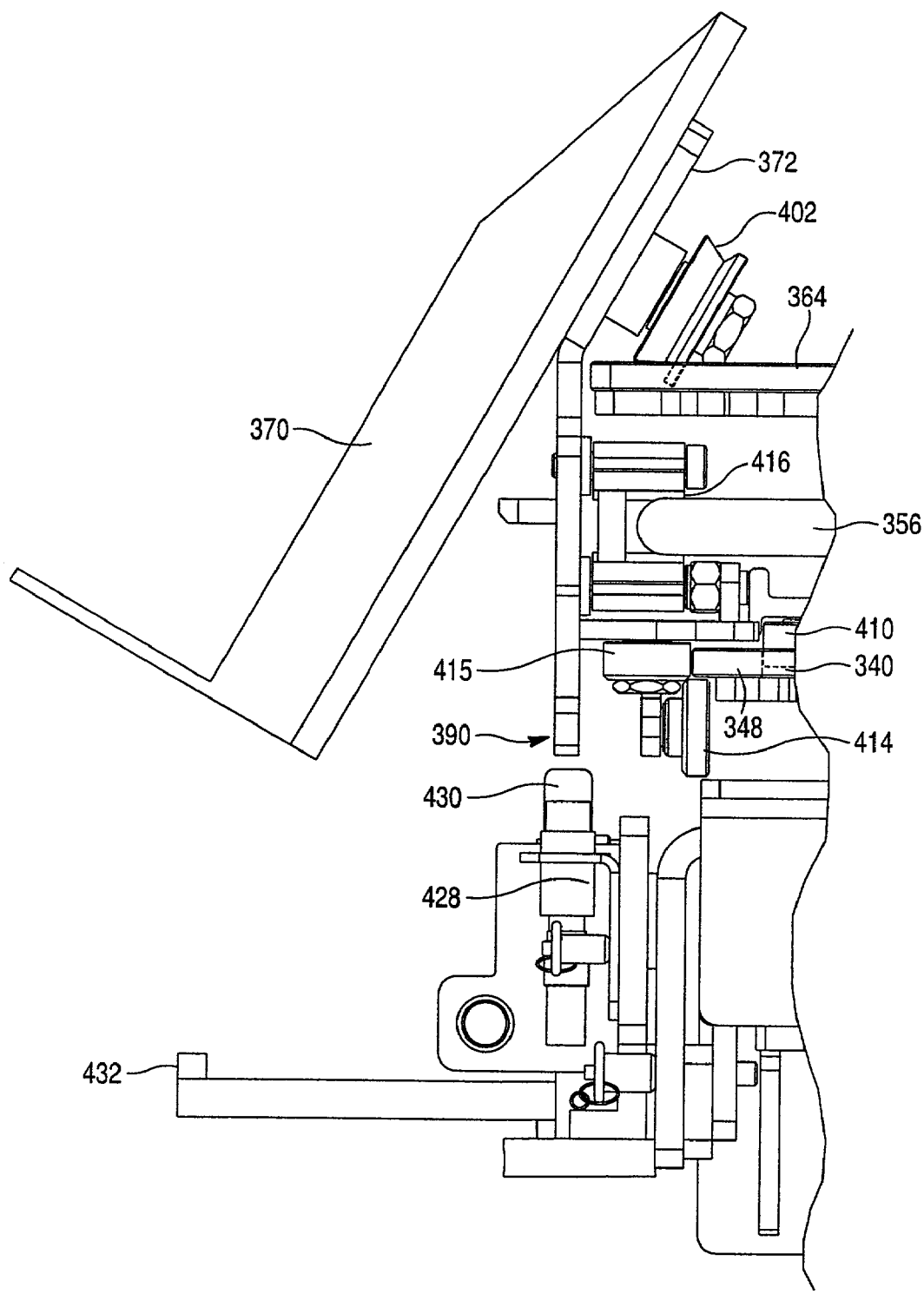
FIG. 19 is a side elevational view of the buffer of FIG. 14 showing a stop for preventing the movement of the carriers in a non-engaged position.
Figure 20:
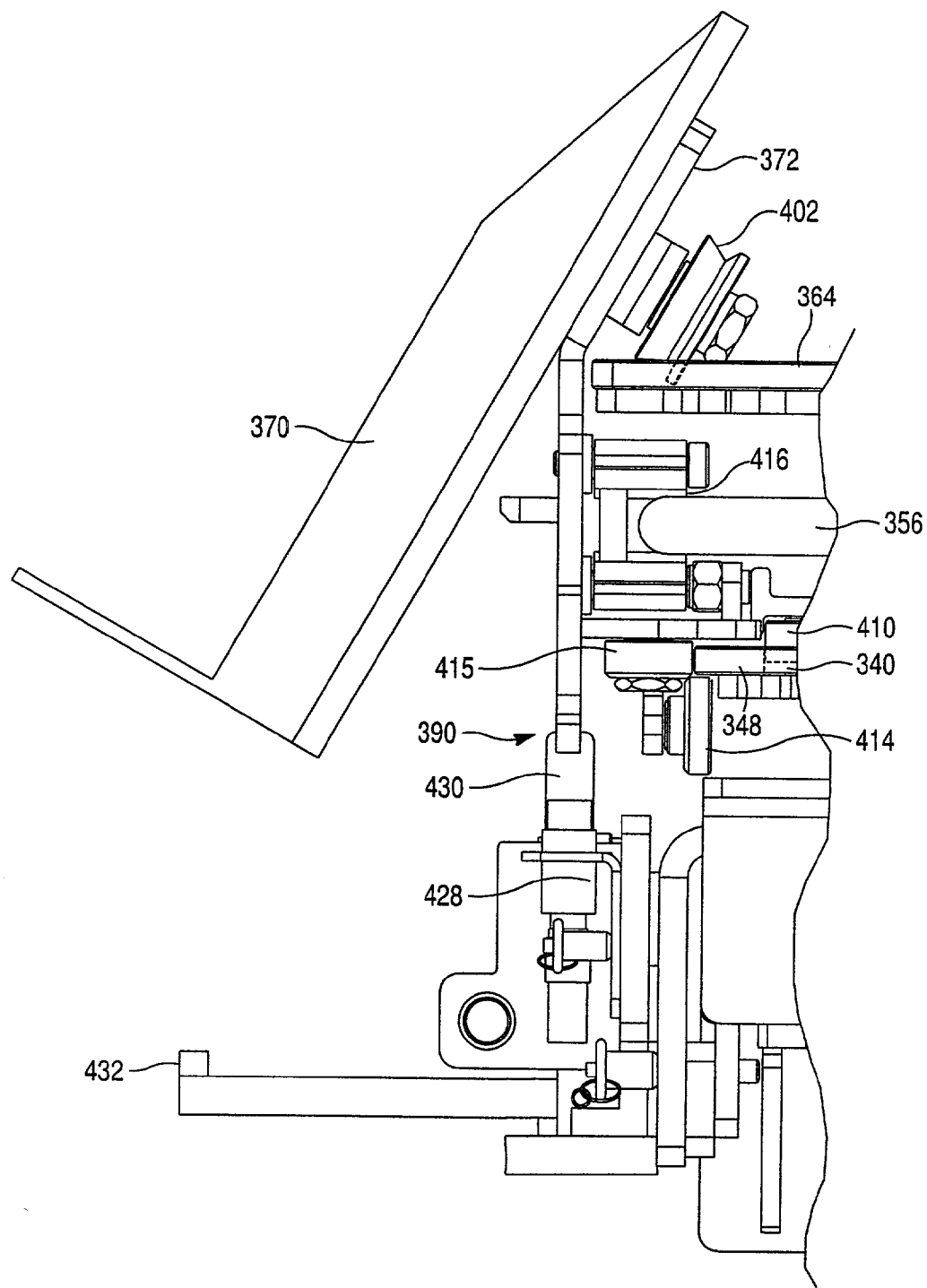
FIG. 20 is a side elevational view of the buffer and stop of FIG. 19 showing the stop in an engaged position.

As best shown in FIGS. 18–20, a first solenoid-actuated stop 428 is mounted on frame 312 with a trolley-engaging portion 430 shiftable between a first, release position, shown in FIG. 19, below the lower ends 390 of the trolley bottom portions 388 and a second, stop, position, shown in FIG. 20, where the trolley engaging portion 430 blocks a path of the trolley 372 by forming a stop against which the lower ends 390 of the trolleys impact when the stop 428 is in its stopping position. A second, separately controllable, solenoid-actuated stop 434 is provided on the other side of the buffer device.

The shifting of the stops 428 and 434 between stop and release positions is controlled by a controller 436, operably coupled to sensors 432 and 433 mounted on frame 312 below the tray bottom walls 394, as best shown in FIG. 18. These sensors are used to count the number of trays passing thereby. The controller 436 monitors the number of trays 370 passing over each of the sensors 432 or 433, and causes the first stop 428 to shift to its stop position when a predetermined number of trays has passed. For example, when the buffer receives four stacks of patties at a time from a stacker, the trays 370 will be released in groups of four. Similarly, when stacks are removed in groups of three, the controller 436 shifts the second stop 434 into the blocking position and only allows the trays 370 to pass in groups of three. The operation of the stops 428 and 434 is coordinated with the operation of the stacker 10 and stack transfer device 510 so that, in the embodiment described herein, at least four empty trays are always available to receive incoming stacks of patties and that at least three stacks of patties are present at the second stop 434 to be removed by a stack transfer device 510. An optical sensor 435 is also provided for detecting patties on the trays as they approach the side of buffer 310 facing stacker 10. Since these trays 370 should all be empty, an alarm occurs or the system shuts down when full trays are seen approaching the loading position.

Figure 50:
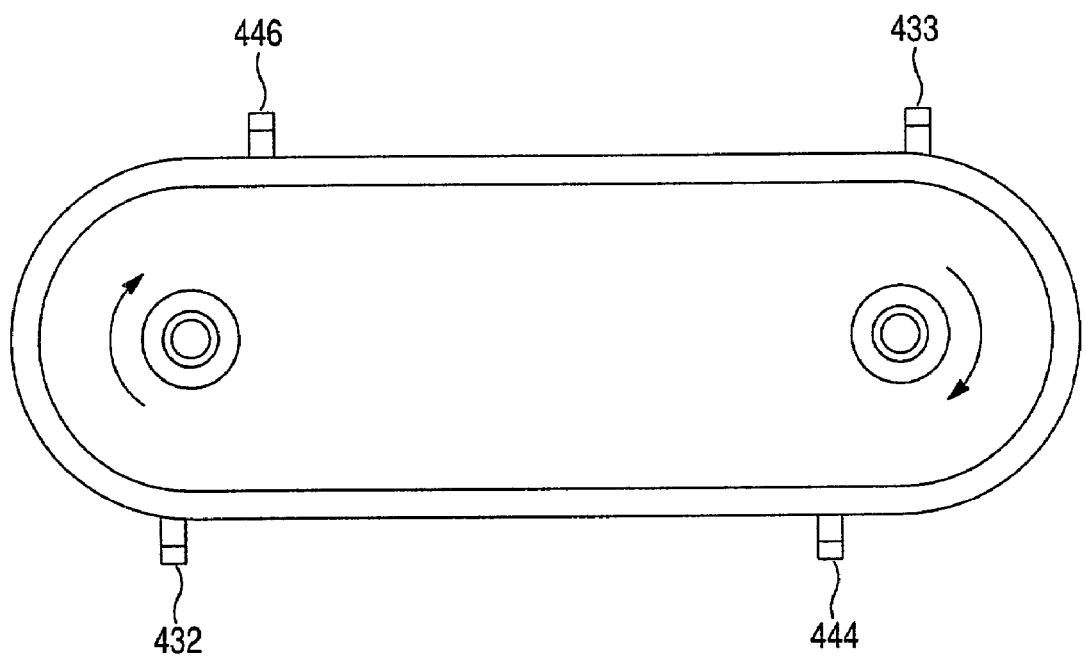
FIG. 50 is a top plan view of the buffer device with the trays removed to show the positions of several sensors.

As best shown in FIG. 50, two additional sensors 444 and 446 are also provided to help ensure that enough trays 370 are present upstream of stop 428 to receive incoming stacks of patties and that the correct number of stacks of patties are available for removal by a stack transfer device. Thus, for example, as sensor 428 is counting the passage of four trays 370, sensor 444 upstream of sensor 428 is counting the passage of empty trays toward sensor 432 and stop 428. Controller 436 is preferable coupled to the controller for a transfer device that brings stacks of patties to the buffer device 310 and configured so that stacks of patties will not be transferred to buffer device 310 until sensor 444 has detected the passage of four trays 370. Thus, in the event that a problem arises that prevents four empty trays from lining up behind stop 428, the transfer device will not attempt to transfer stacks of patties to the buffer device 310. This reduces the likelihood that patties will be dropped or otherwise mishandled during processing. In a similar manner, sensor 446 counts trays 370 approaching sensor 433, and as sensor 433 is counting the release of three empty trays 370, for example, sensor 446 is counting approaching trays to ensure that at least three full trays are present at stop 434 and that at least three stacks are available for removal. Controller 436 is preferably connected to the controller for the downstream stack transfer device and prevents stacks from being removed from the trays stopped at stop 434 until three stacks are present for removal. The number of stacks arriving at and leaving the buffer device 310 can be varied, and the position of sensors 444, 446 is adjustable so that these sensors can be placed near the location where the last of a given group of trays 370 will be found when the system is operating properly.

In a second embodiment, sensors 432 and 433 are used both to count the number of trays passing thereby and to detect, optically, for example, whether the tray adjacent the sensor is full or empty, based upon whether slot 376 is blocked. The controller 436 monitors the status of the trays 370 passing over each of the sensors, and causes the first stop to shift to its stop position whenever an empty tray is detected and to shift to its release position when a full tray is detected. Similarly, controller 436 shifts the second stop into the stop position when a full tray is detected by sensor 433 and into the release position when actuated in an opposite manner, that is, set to prevent the passage of full trays while allowing empty trays to pass.

In operation, motor 326 drives drive belt 330, turning first and second wheels 332, 334 and rotating shafts 340 and wheels 352 mounted thereon. This in turn causes drive belt 356 to move continuously about the periphery of buffer 310 between plates 342 and 358. The carrier trolleys 372 are clamped to belt 356 tightly enough that they are pulled about the peripheries of the upper and lower plates by the movement of the belt. The trolleys are guided by the engagement of trolley wheels 402 with upper plate raised rail 64 and the engagement of guide wheels 410, 412 and 414 with the peripheral portion 346 of lower plate 342. Stops 428 and 432 are selectively moved into and out of the path of travel of the trolleys and, when positioned in the stop position, prevent trolleys from moving past the stops. The motor 326 continues to operate at a continuous speed, however, sliding belt 356 through clamps 416 even when all trolleys are prevented from moving by the position of the stops. The urethane from which belt 356 is formed is sufficiently wear resistant that it provides reliable operation even after many hours of continuous use. And, as the relative positions of clamp upper member 418 and lower member 422 are adjustable, the clamps can be repositioned in the event that the diameter of belt 356 decreases slightly after a long period of use to maintain the proper pressure on the belt.

The operation of the subject system will now be described with particular reference to FIGS. 21a–21h which illustrate the operation of the system set up for use with a patty stacker that forms four stacks of patties simultaneously which patties must be packed in boxes that are three patties wide. Thus the buffer 310 will receive stacks of patties four at a time from a first direction, shown by arrows 438 in FIG.

Figure 21A:
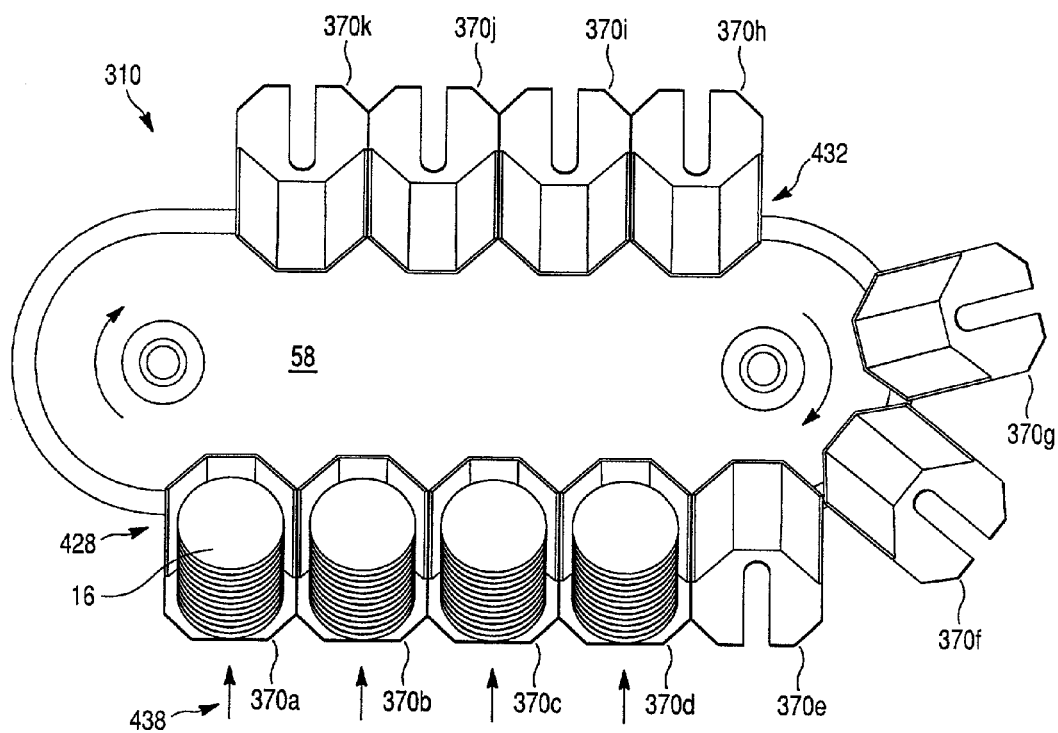
FIGS. 21a–h are top plan views of the buffer of FIG. 14 showing the locations of full and empty trays around the periphery of the buffer as the buffer is used according to the method of the present invention.
Figure 21B:
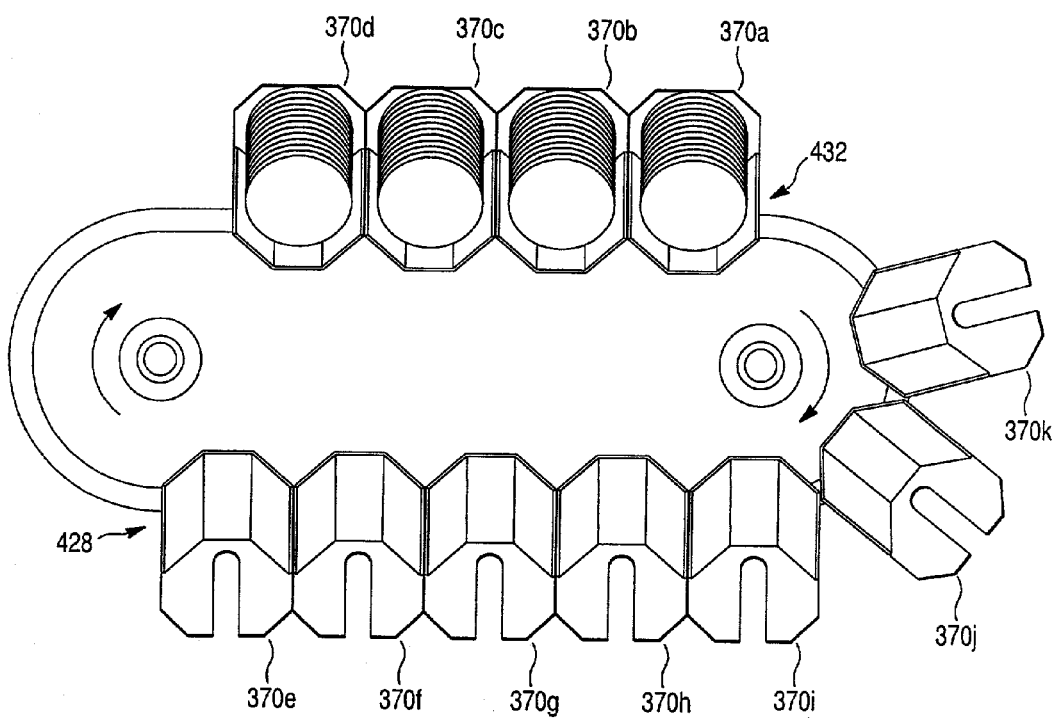
Figure 21C:
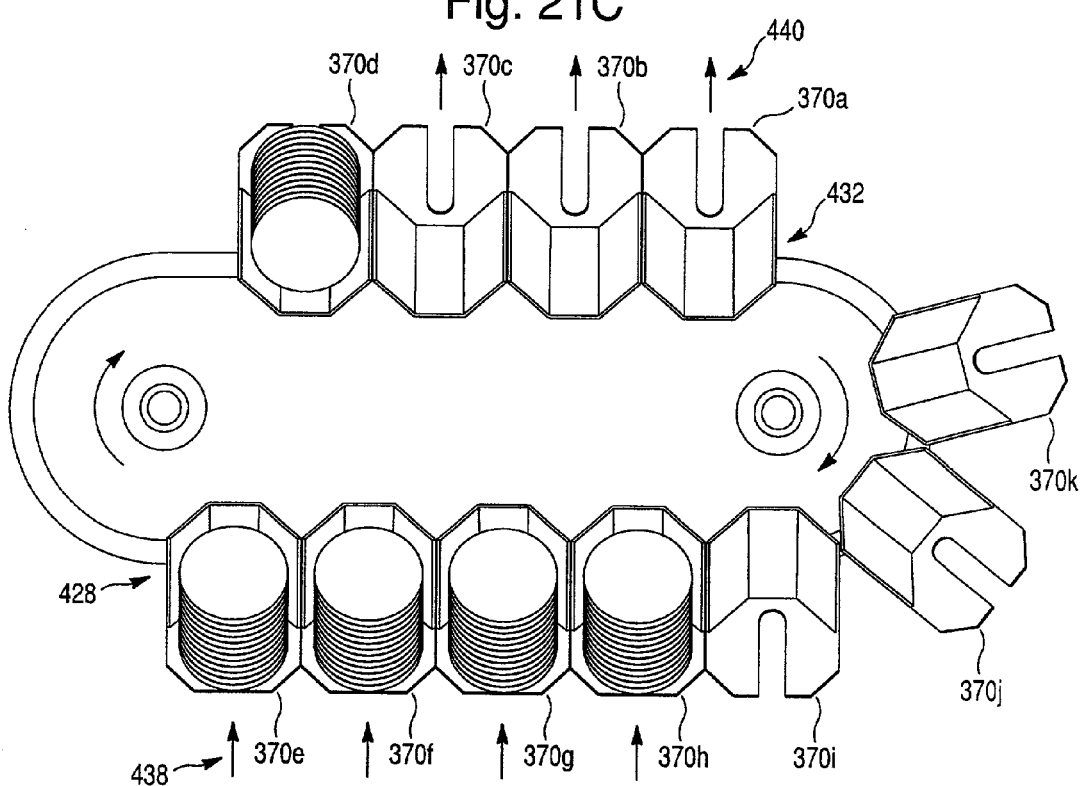
Figure 21D:
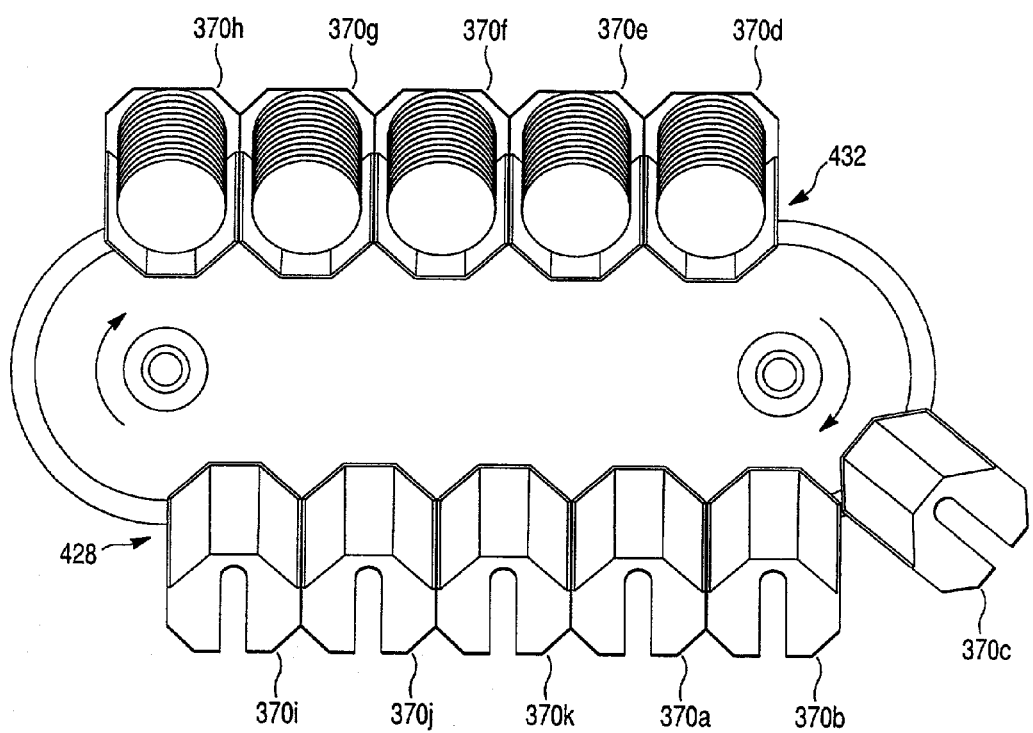

21A, on a first side of the buffer 310 and present them for removal three stacks at a time on a second side of the buffer 310 where they are removed in a the direction of arrows 440 in FIG. 21C.

FIG. 21A shows four trays 370a, 370b, 370c and 370d on a first side of buffer 310 which trays have received four stacks 442 of hamburger patties from the transfer mechanism 24. Controller 436 causes stop 428 to move between stop and release positions in order to release carriers in groups of four at predetermined intervals. After four stacks of patties are received in trays 370a–370d, stop 428 shifts to its release position and allows these carriers to pass. The fifth carrier, 470e, which is empty, and the carriers behind it, are stopped by stop 428 for a predetermined period of time, a period long enough for theses carriers to receive four more stacks of patties from the stacking machine.

As shown in FIG. 21B, additional carriers 370f and 370g impact against stopped carrier 370e and are held in this position as belt 356 slips through clamps 416 on each trolley. Carriers 370e–g remain stopped for a predetermined amount of time. Meanwhile, carriers 370a–d have been carried around buffer 310 by belt 356 toward a second stop 434 that blocks the path of the trays, and tray 370a impacts against the second stop. Trays 370b–d impact against stopped tray 370a and are also brought to a stop with drive belt 356 sliding freely through clamps 416 on each of the stopped trays.

As shown in FIG. 21C, a second transfer device 510, as later explained, removes three stacks of patties from carriers 70a, 70b and 70c in the direction of arrows 140, and the first transfer device 24 places four additional stacks of patties on carriers 70e, 70f, 70g and 70h on the first side of the buffer 310. After a predetermined time, carriers 70a–c will be empty, and therefore the controller cause these three trays to be released, while the next tray (the last full tray) is stopped. Full carriers 70e, 70f, 70g and 70h are released by first stop 132 in FIG. 21C and moved around the buffer until they impact full carrier 70d held up at second stop 134 resulting in the positioning of trays shown in FIG. 21D.

Figure 21E:
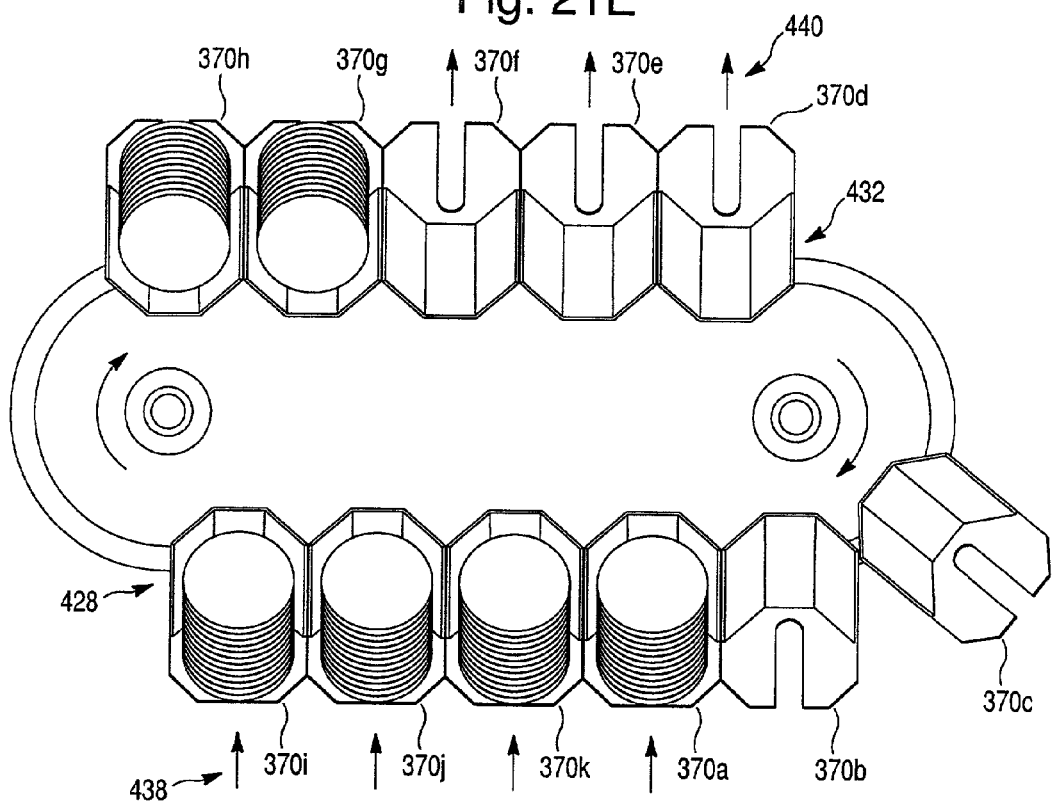
Figure 21F:
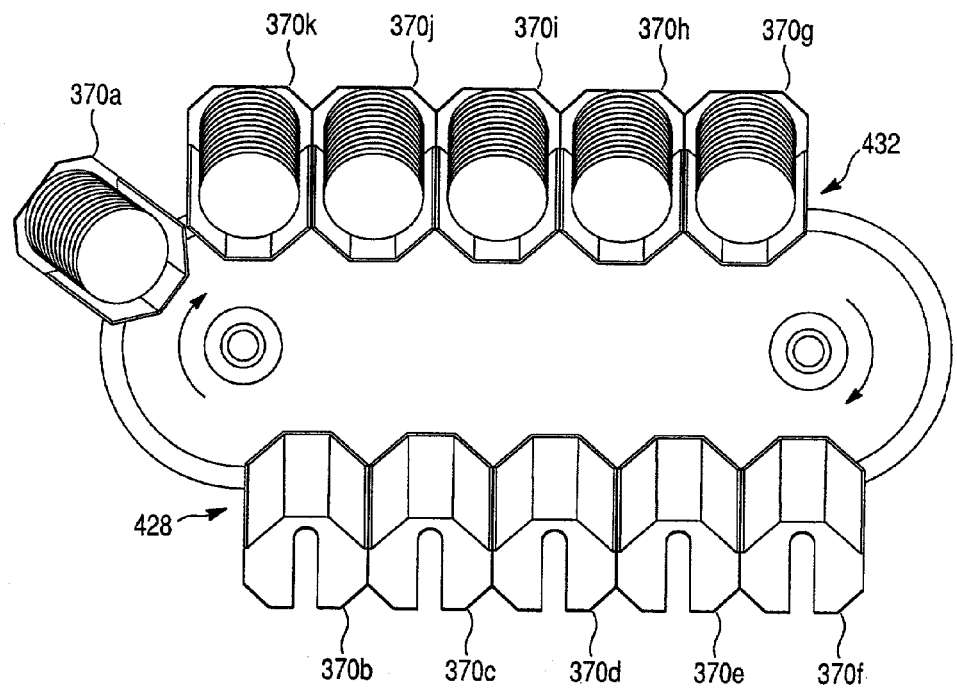
Figure 21G:
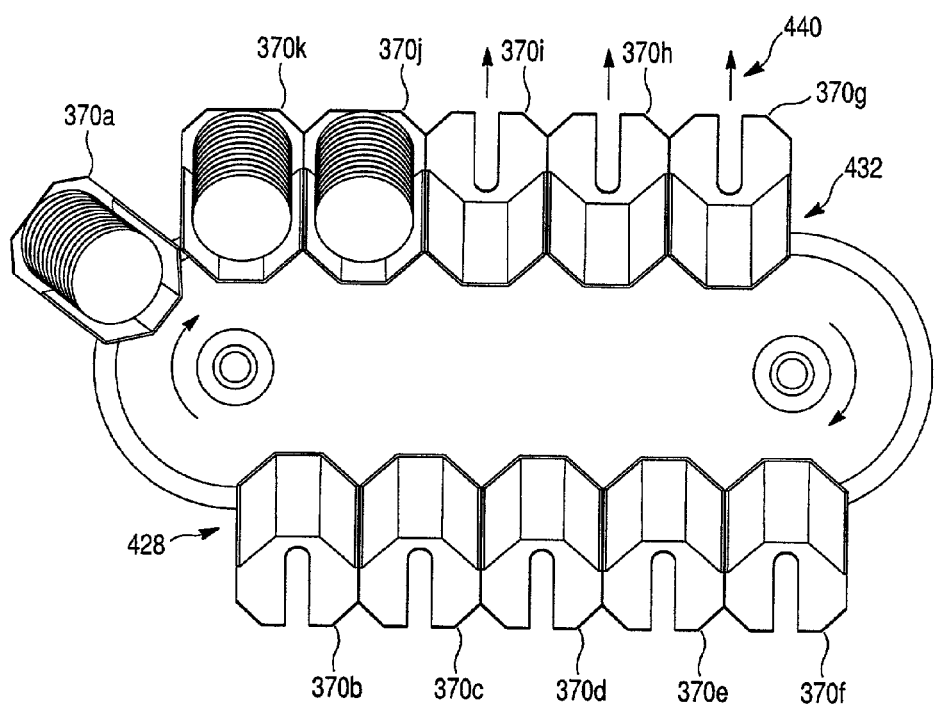
Figure 21H:
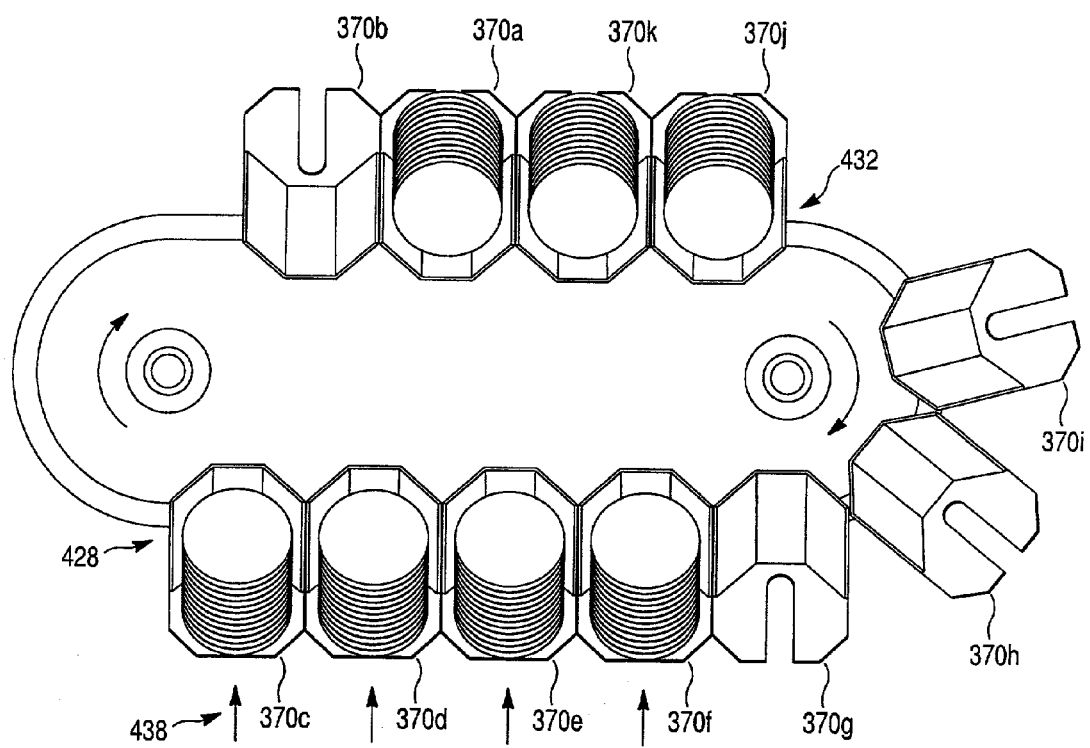

FIG. 21E shows that three stacks of patties have been removed from carriers 370d, 370e and 370f and that additional stacks of patties have been placed on carriers 370i, 370j, 370k and 370a. Four full carriers are released by stop 428 and three empty carriers are released by stop 432 as described above resulting in the arrangement of carriers shown in FIG. 21f. As shown in FIG. 21G, three additional stacks of patties are removed from trays 370g, 370h and 370i and these now-empty carriers are also released. Full carriers 370j, 370k and 370a remain stopped at stop 432. Three additional stacks of patties will be removed from carriers 370a, 370k and 370j as shown in FIG. 21H while an additional four stacks are added to trays 370c, 370d, 370e and 370f at the first side of the buffer 310, and from there the process continues repeatedly as described above.

Because of the stops 428 and 434, the buffer 310 is able to permit patties to be received in trays 392 in essentially any number from transfer device 24 and to be removed by transfer device 510 in groups of essentially any number.

Stack Transfer Device

Figure 22:
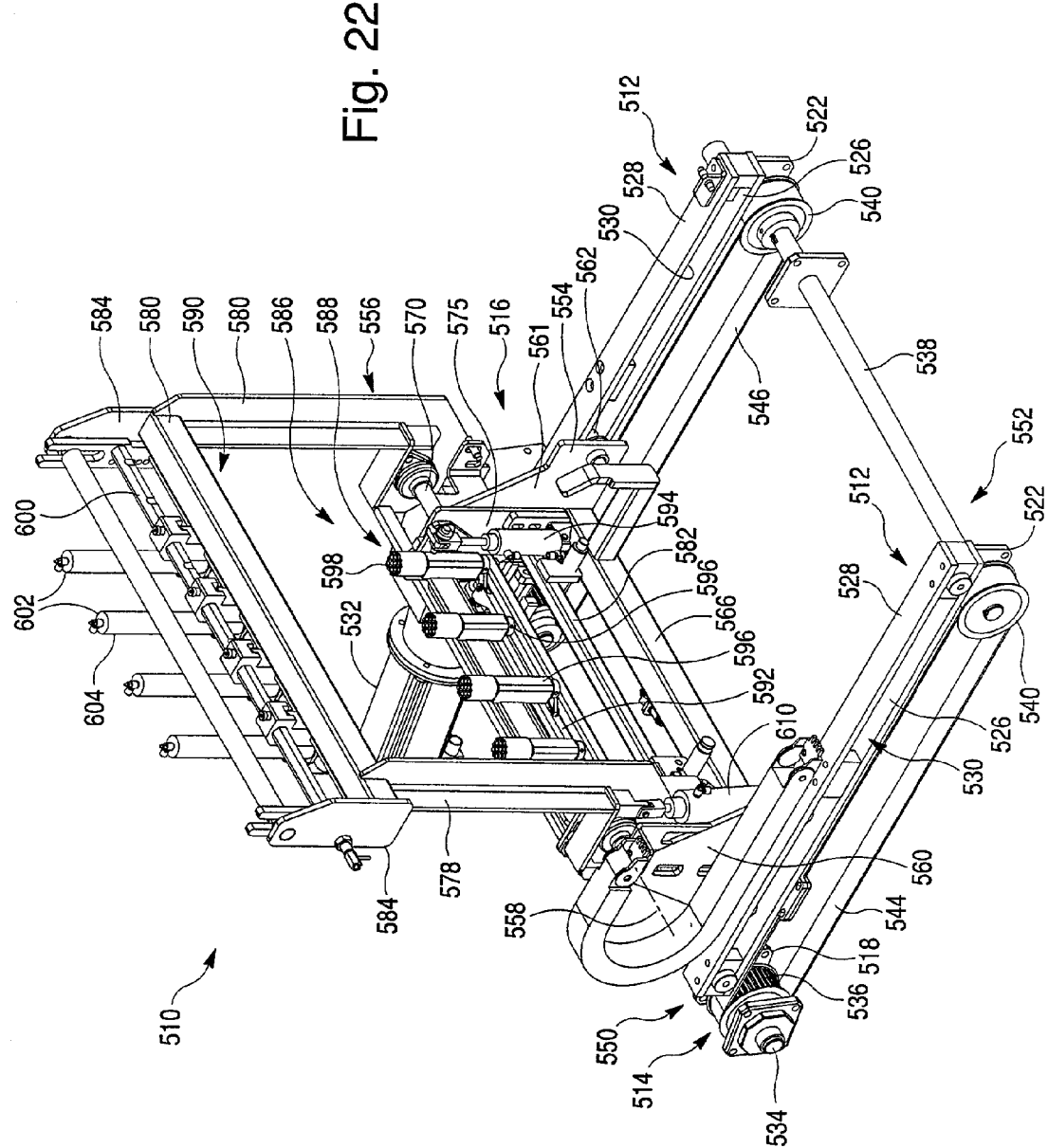
FIG. 22 is a perspective view of the stack transfer device of FIG. 1.

The stack transfer portion of the subject system is described in an application entitled "Stack Transfer Device" filed concurrently herewith and assigned to the assignee of this application. FIG. 22 shows transfer device 510 which includes guide tracks 512, a drive 514, and a carrier 516 which is moved linearly back and forth along the guide tracks 512 by the drive 514. Guide tracks 512 comprise a first pair of feet 518 having aligned openings 520, best seen in FIG. 25, and a second pair of feet 522 having aligned openings 524 best seen in FIG. 24. Two lower rail members 526 connect the first and second pairs of feet, and two upper rail members 528 are mounted above lower rail members 526 to define a guide channel 530 therebetween.

Figure 23:
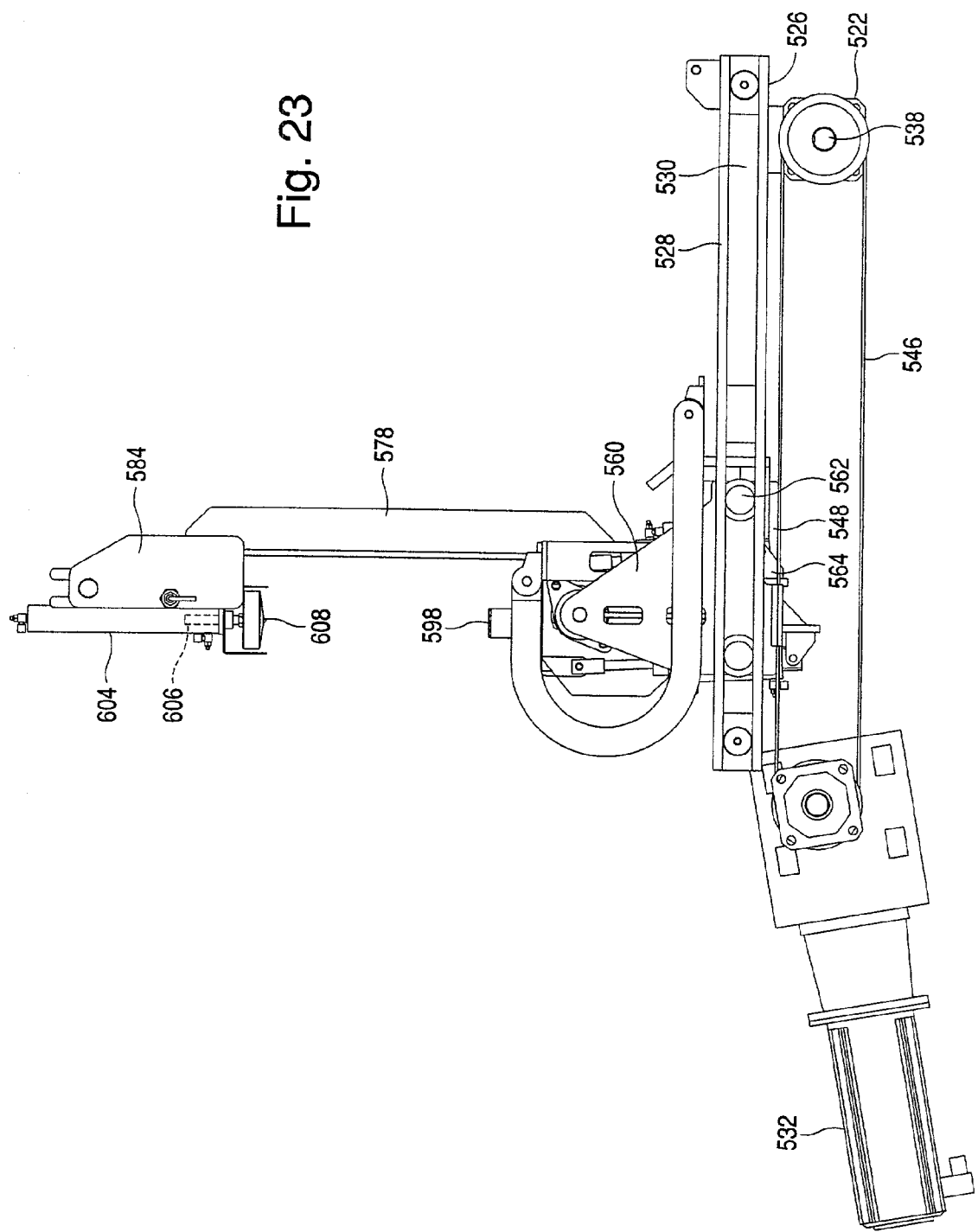
FIG. 23 is a side elevational view of the device of FIG. 22.

Drive 514 comprises a motor 532, a drive shaft 534 extending through aligned openings 520 in the first pair of feet, first and second geared wheels 536 coupled to the drive shaft 534, an axle 538 extending between aligned openings 524 in the second pair of feet, and first and second idler wheels 540 mounted at either end of axle 538. A first belt 544 extends between one of the geared wheels 536 and one of the idler wheels 540, and a second belt 546 extends between the other one of the geared wheels 536 and the other idler wheel 540. The portions of belts 544 and 546 facing the guide tracks 512 include an attachment plate 548 as best shown in FIG. 23. Motor 532 is reversible, and can be driven in a first direction to rotate the geared wheels to drive the belts 544 and 546 in a first direction, to move the attachment plate 548 from a first end 550 of the guide tracks 512 to a second end 552 of the guide tracks, and in a second direction to move the attachment plate 548 back to the first end 550. Carrier 516 is mounted on the guide tracks 512 and attached to attachment plate 548, so that it can be driven between first end 550 and second end 552 by motor 532.

Figure 24:
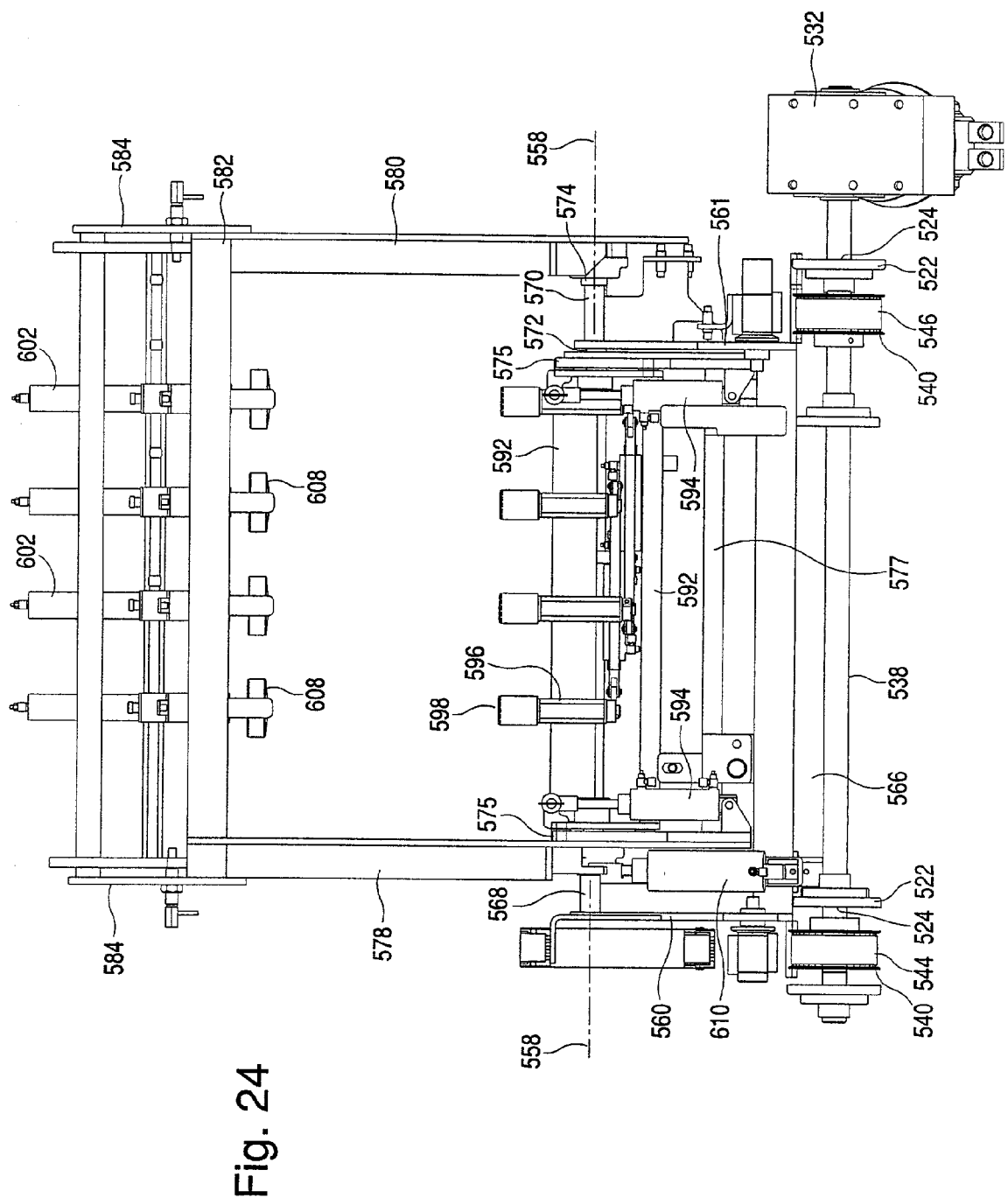
FIG. 24 is a front elevational view of the device of FIG. 22.
Figure 25:
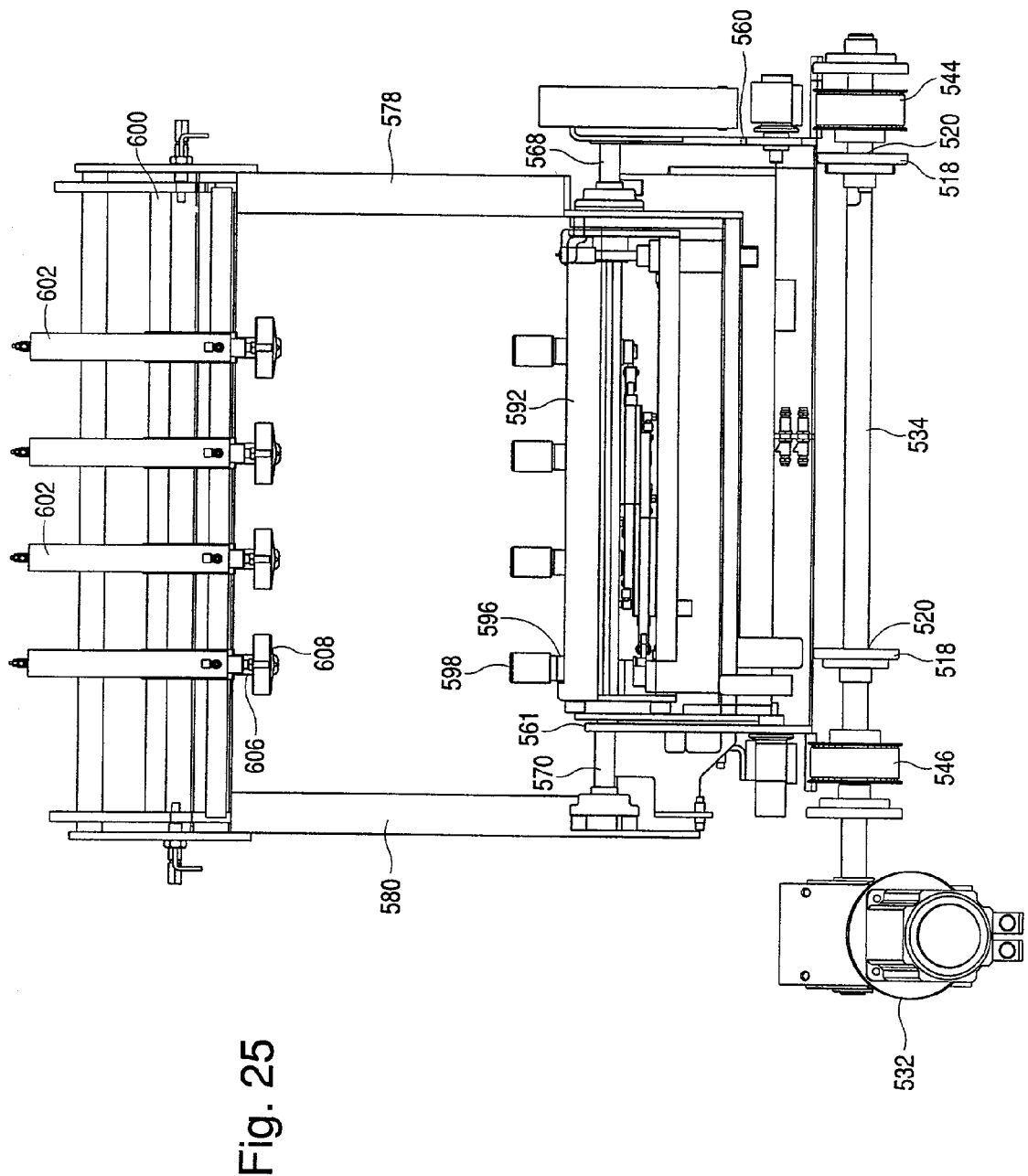
FIG. 25 is a rear elevational view of the device of FIG. 22.
Figure 26:
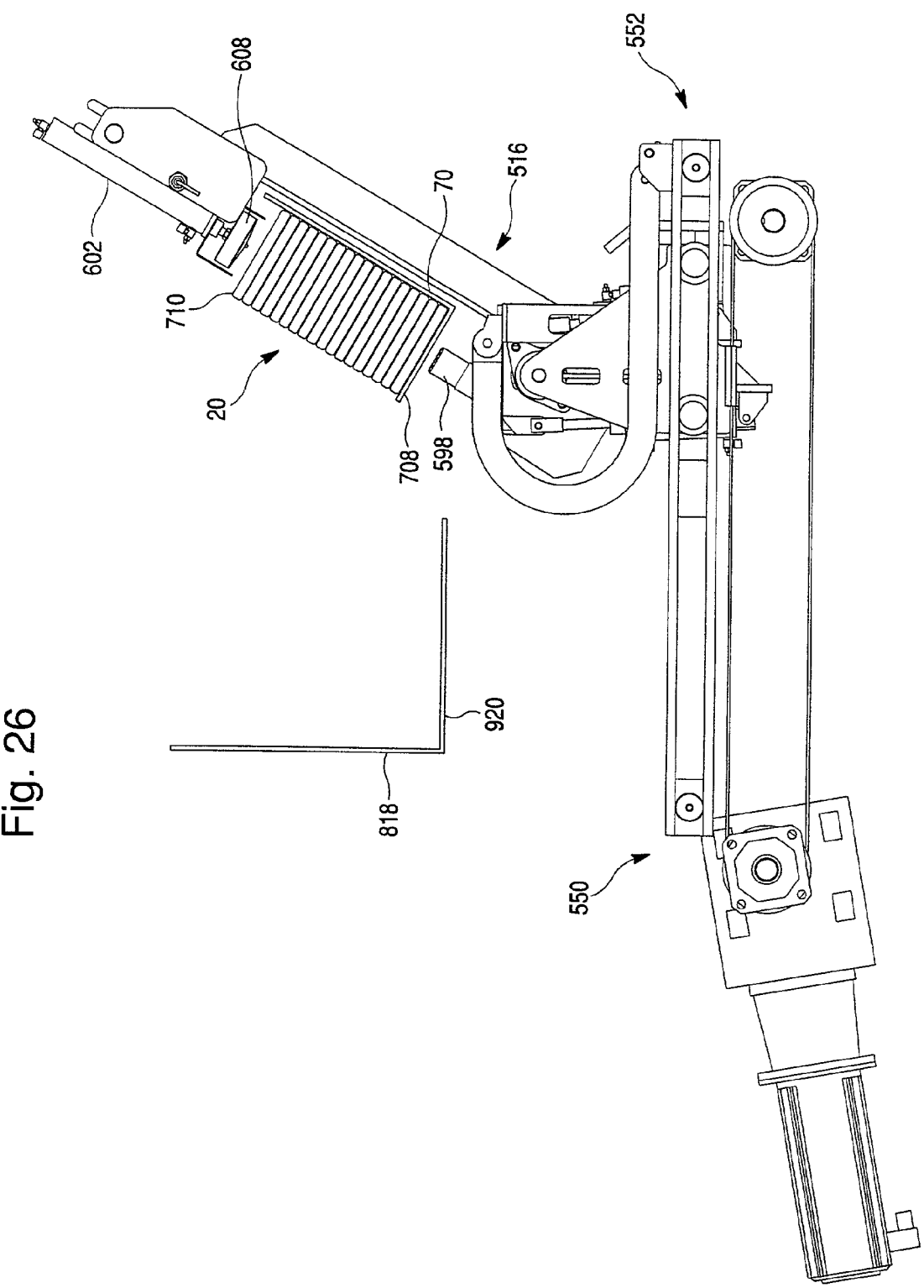
FIG. 26 is a side elevational view of the device of FIG. 22 positioned adjacent a plurality of stacks of hamburger patties on a buffer mechanism.

Carrier 516 comprises a support frame 554 and a pivot frame 556 that is pivotally connected to support frame 554 for pivoting motion about a pivot axis 558 between a first position, shown in FIG. 23, where the support frame is oriented at a right angle to the guide tracks 512 and generally vertically when support feet 518 and 522 rest on a horizontal floor or other support surface, and a second position, shown in FIG. 26, where the frame is tipped about 30 degrees from vertical. As best seen in FIG. 24, support frame 554 includes first and second spaced plate members 560, 561 and a pair of wheels 562 carrying the frame and rotatably attached to each attachment plate 548, which wheels are sized to fit in channel 530 between the upper and lower rail members of the guide tracks 512. A dog 564 depends from each of the attachment plate 548 which dogs 564 are securely fastened to each of the attachment plates 548 on the first and second belts 544 and 546. A lower strut 566 is connected between and carried by the first plate 560 and second plate 561. FIG. 24 shows a first axle 568 projecting inwardly from plate member 560 and a second axle 570 is supported by plate member 561, with an inner end 572 projecting toward first axle 568 and an outer end 574 projecting from the opposite side of the plate member 561. First axle 568 and second axle 570 are coaxially aligned with pivot axis 558.

Pivot frame 556 includes first and second side plate members 575 connected by a lower strut 577, and the side plate members 575 each include an upper portion to which the axles 568 and 570 are attached. First side support 578 projects upwardly from first plate 560 and is fixedly attached to plate 560. A second side support 580, parallel to the first side support, is fixed to outer end 574 of second axle 570. The upper ends of the first and second side supports are connected by a strut 582, and plate members 584 are attached to either end of the strut 582 which plate members form attachment points for elements described below.

A gripper mechanism 586 is carried by pivot frame 556 and comprises a lower gripper member 588 and an upper gripper member 590 as best seen in FIG. 22. In the preferred embodiment, the lower gripper member 588 includes a gripper frame 592 slidingly supported between plate members 560 and 561 of pivot frame 556, and first and second linear actuators 594, preferably pneumatic actuators, connected between the pivot frame 556 and the gripper frame 592 for moving the gripper frame 592 relative to the pivot frame 556. Four stack supports 596, as best shown in FIG. 24, are mounted on the gripper frame 592, each of which includes a stack-engaging top portion 598 adjustably connected thereto. As all of the stack supports 596 are connected to the gripper frame 592, they all move in unison when actuators 594 move the frame. However, it is within the scope of this invention to use individually controllable actuators as well.

Upper gripper member 590, as best seen in FIG. 22, comprises a strut 600 connected between plate members 584 at the top ends of the first and second side supports 578, 580 to which four independently controllable pneumatic actuators 602 are attached at various selectable positions along rod 600, which positions are selected so that the actuators 602 on the upper gripper member 590 are aligned with the stack supports 596 on the gripper frame 592. Each actuator 602 includes a tubular housing 604 within which a piston 606 is mounted for reciprocal motion with respect to the housing. At the end of each piston is mounted a stack-engaging plate member 608 as best shown in FIG. 24. The actuators 602 are connected to a suitable controller, not shown, which moves the pistons 606 to move the plate members 608 between first and second positions with respect to the housing 604. Preferably the same controller that controls the motion of the actuators 594 controls the lower gripper member so that the stack-engaging members 598 of the gripper frame 592 can be moved toward the stack-engaging plates 608 of the upper gripper 590 while the stack-engaging plates 608 of the upper gripper 590 are being moved toward the stack-engaging members 598 of the lower gripper 588 to grip a stack of objects, such as frozen hamburger patties, therebetween. The controller also controls the separation of the upper gripper 590 and the lower gripper 588. A tipper actuator 610 is connected between support frame 554 and pivot frame 556 to tip or pivot the pivot frame between the first and second positions.

The operation of transfer device 510 will now be described with reference to FIGS. 26–30 which figures show device 510 positioned between buffer device 310 and matrix former 818. The buffer device 310 includes a plurality of individual trays 70 for supporting a plurality of stacks 20 of frozen hamburger patties, which stacks each include a bottom 708 and a top 710. Only one of the trays and one stack of patties is visible in these figures; however two other holders holding two other stacks of patties are positioned therebehind. The lower portion of each tray 920 is angled with respect to the horizontal to help keep the stacks 20 of patties 16 in place while the trays 70 are moved around the buffer device 310, and the bottom of each tray includes a slot that is narrower than the diameter of the patties in each stack but wide enough to allow the stack-engaging tops 598 of the lower gripper member to pass through the slots and contact the bottoms 708 of the stacks. The matrix former 818 has a horizontal bottom wall 920 and upstanding sidewalls 924, 926 between which the stacks of patties are placed for further processing. The bottom wall 920 includes a plurality of slots narrower than the width of the patties but wider than the stack-engaging tops 598 to allow stacks of patties to be placed on the bottom wall 920 inwardly from the edge thereof. While the transfer device is well suited for use in this environment, it could be used to transfer stacks between other supports as well, one, both, or neither of which are inclined with respect to horizontal. Furthermore, the matrix former can be adjusted to accommodate different numbers of rows and/or rows having different numbers of stacks.

Figure 27:
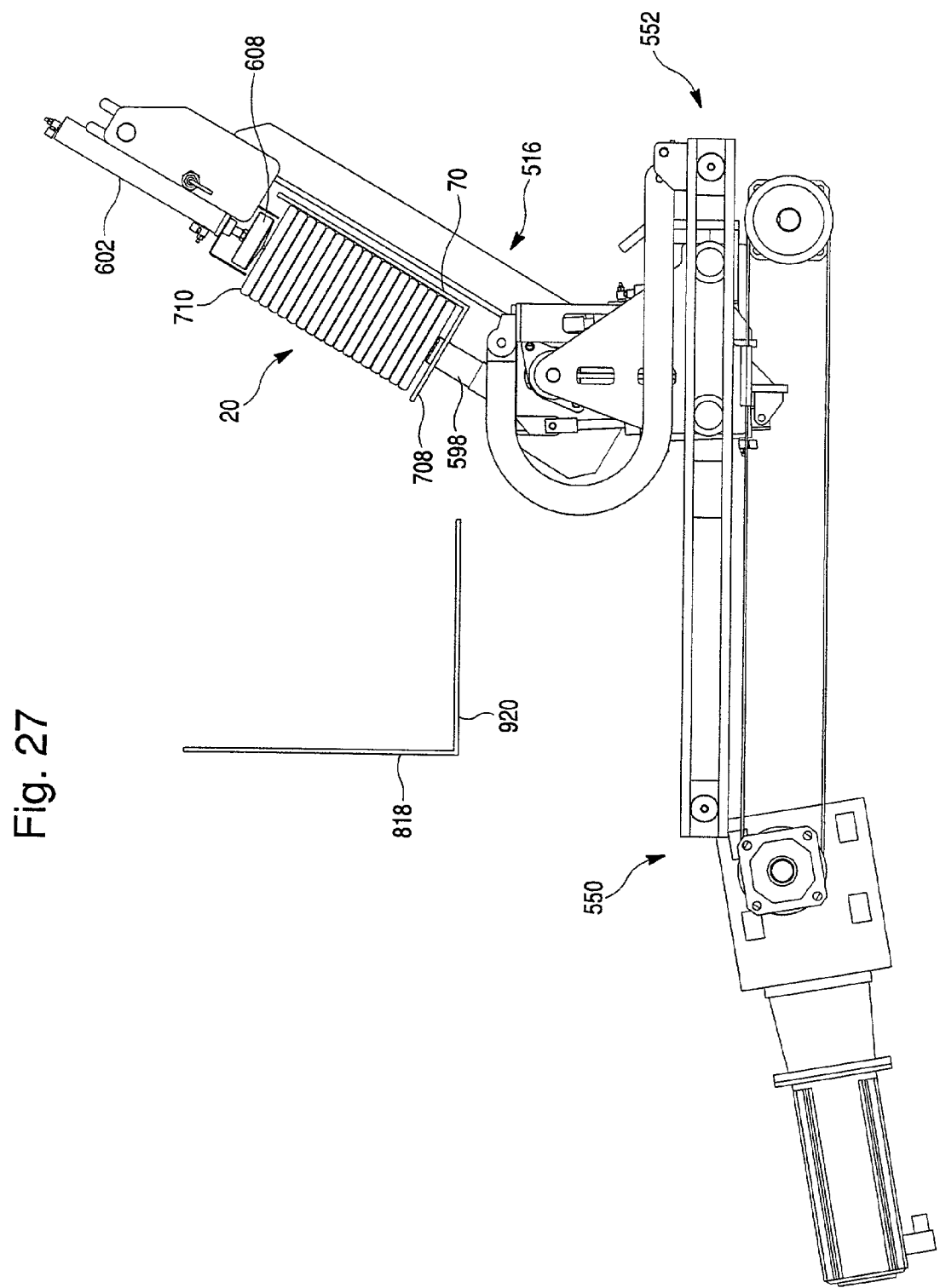
FIG. 27 is a side elevational view of the device of FIG. 22 gripping a plurality of stacks of hamburger patties on a buffer mechanism.

FIG. 26 shows a stack 16 of frozen hamburger patties supported on a tray 70 of a buffer device 310. Carrier 516 is positioned at the second end 552 of the guide track and tilted to the second position, wherein the plane of the stack-engaging surfaces of the lower gripper 588 and the upper gripper 590 are inclined at about a 30 degree angle from vertical and parallel to tray 704. Lower stack-engaging top member 598 is positioned directly under stack bottom 708, while upper stack-engaging plate 608 is positioned over stack top 710. FIG. 27 shows the configuration of device 510 after actuators 594 have raised the lower gripper 588 so that the stack-engaging tops 598 of the lower gripper 588 are in contact with stack bottoms 708, and after actuators 602 have lowered stack-engaging plates 608 into contact with top surfaces 710 of the stacks 20. The upper and lower grippers 590 and 588, respectively, are moved toward one another firmly enough to securely hold the stack 20 therebetween. The distance that the upper and lower grippers are moved toward one another can be a constant based upon the height of the stacks 706, or, alternatively, a pressure sensor can be provided which will stop the movement of the grippers 588 and 590 when a predetermined pressure is applied to the stacks 20. The pressure applied to the stacks 20 must be sufficient to keep the stacks 20 from falling apart when they are rotated from an inclined to a generally vertical orientation.

Figure 28:
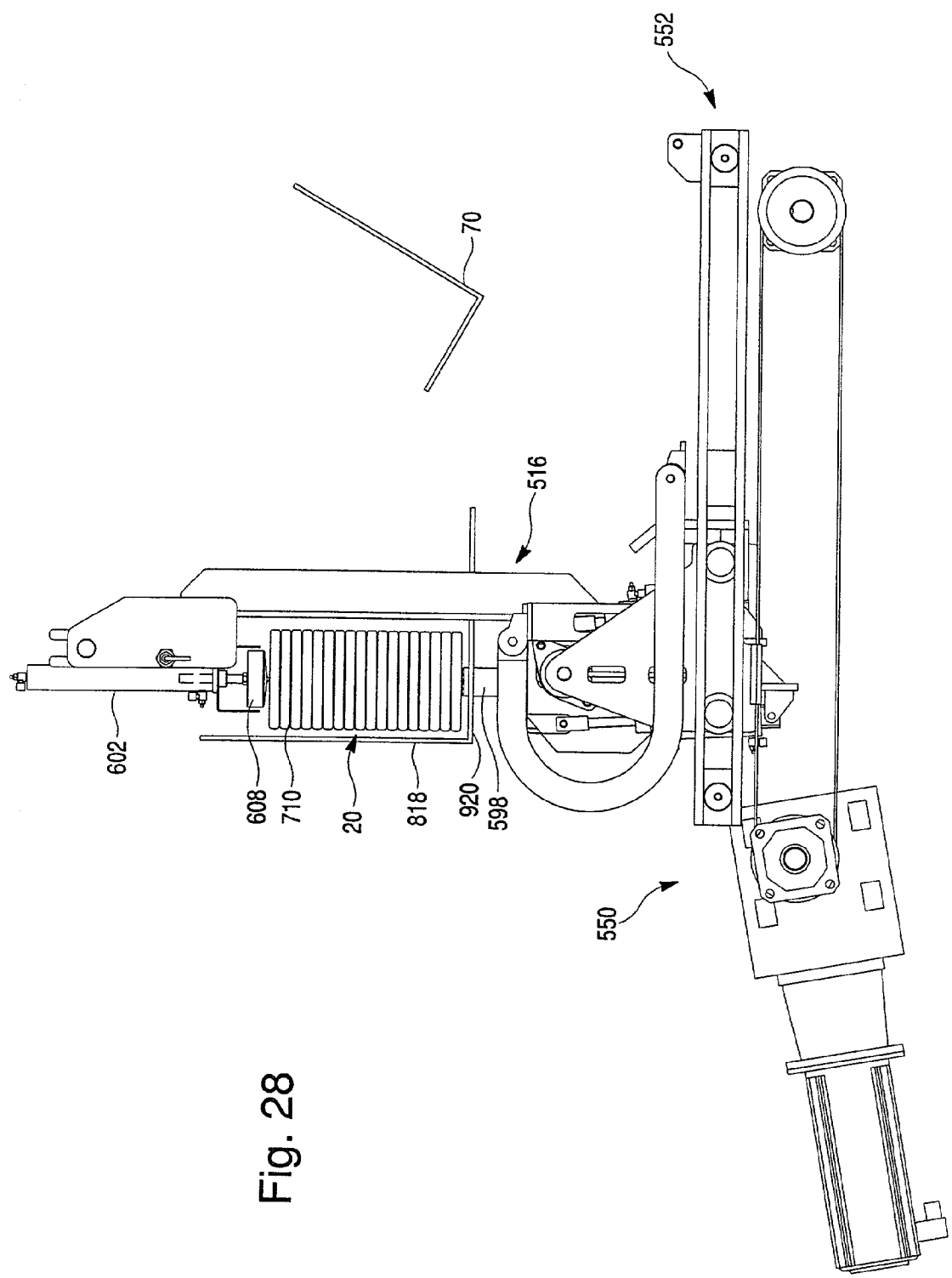
FIG. 28 is a side elevational view of the device of FIG. 22 holding a plurality of stacks of hamburger patties adjacent a horizontal support platform.

FIG. 28 shows carrier 516 after tipper 610 has pushed pivot frame 556 back to the first position and drive 514 has moved the carrier 516 to the first end 550 of the guide track 512 and positioned the bottom of stack 20 over the horizontal matrix former bottom wall 920.

Figure 29:
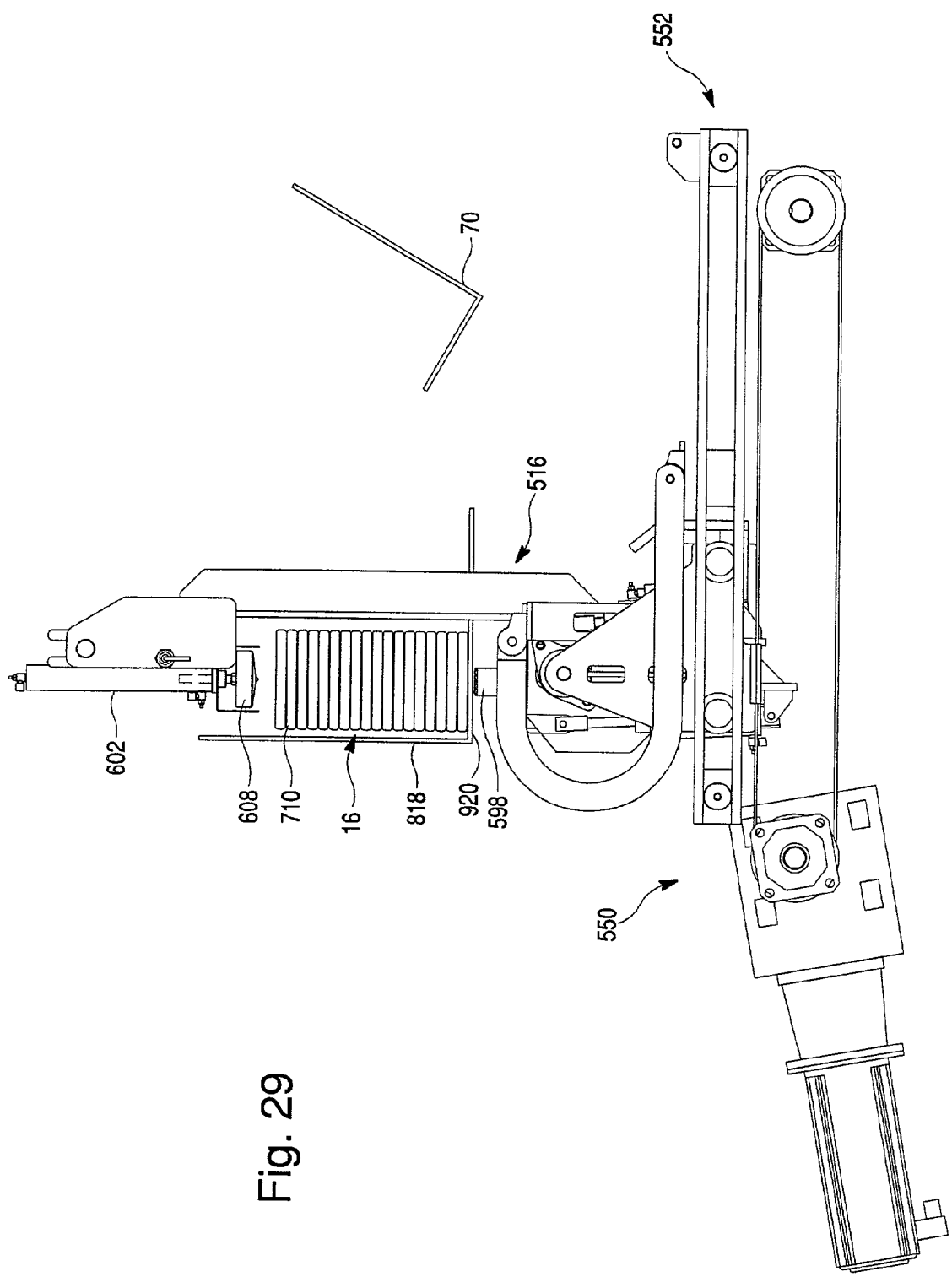
FIG. 29 is a side elevational view of the device of FIG. 22 releasing a first plurality of stacks of hamburger patties onto a horizontal support platform.
Figure 30:
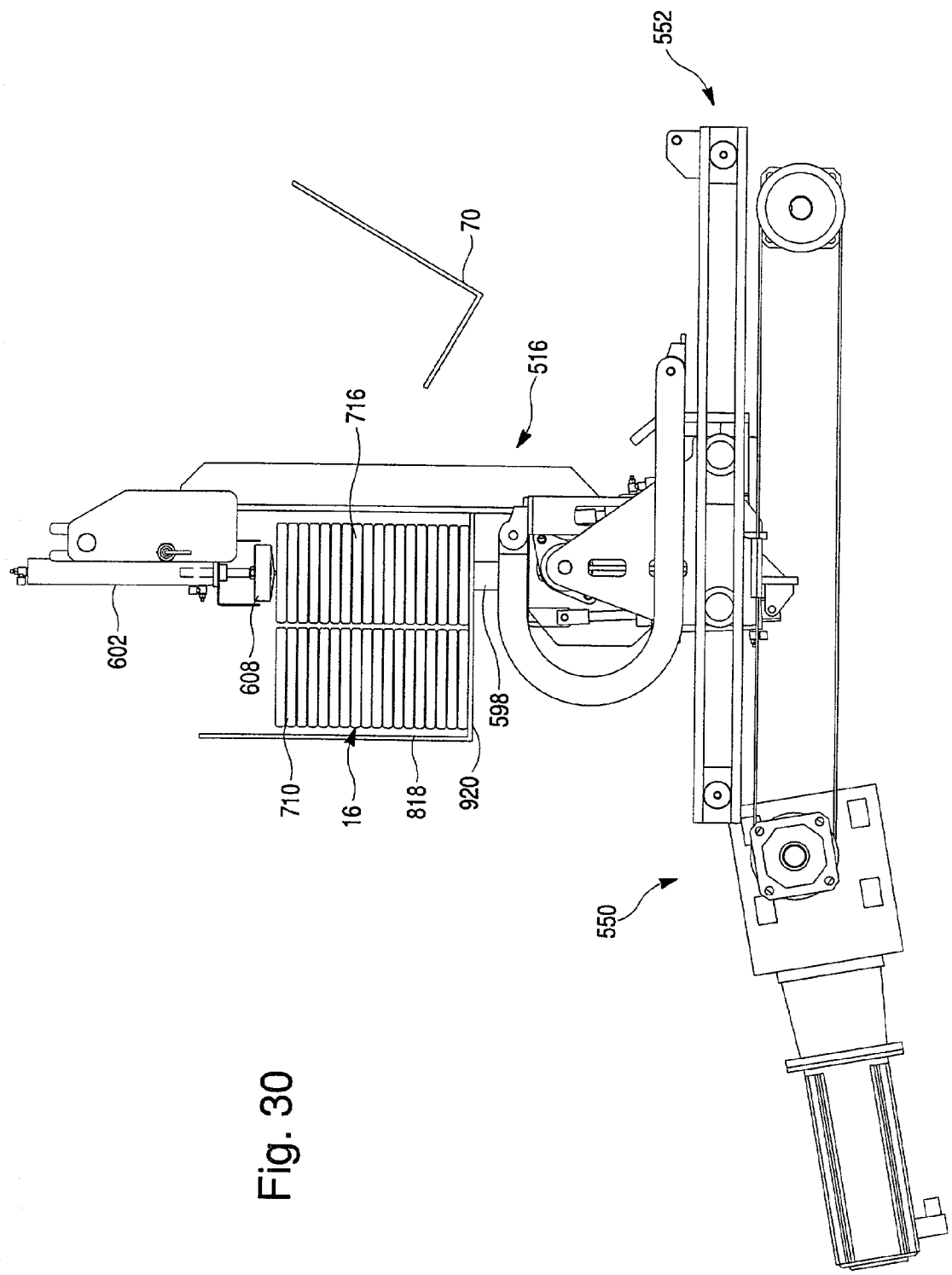
FIG. 30 is a side elevational view of the device of FIG. 22 releasing a second plurality of stacks of hamburger patties onto a horizontal support platform.

FIG. 29 shows the upper and lower grippers 590 and 588, respectively, after they have separated to release the stacks onto horizontal platform 920, while FIG. 30 shows a second stack 716 of patties about to be placed on the platform 920. The controller for the carrier can be programmed to leave additional rows of stacks at other locations if more than two rows of stacks are needed.

Packing Machine

Figure 31:
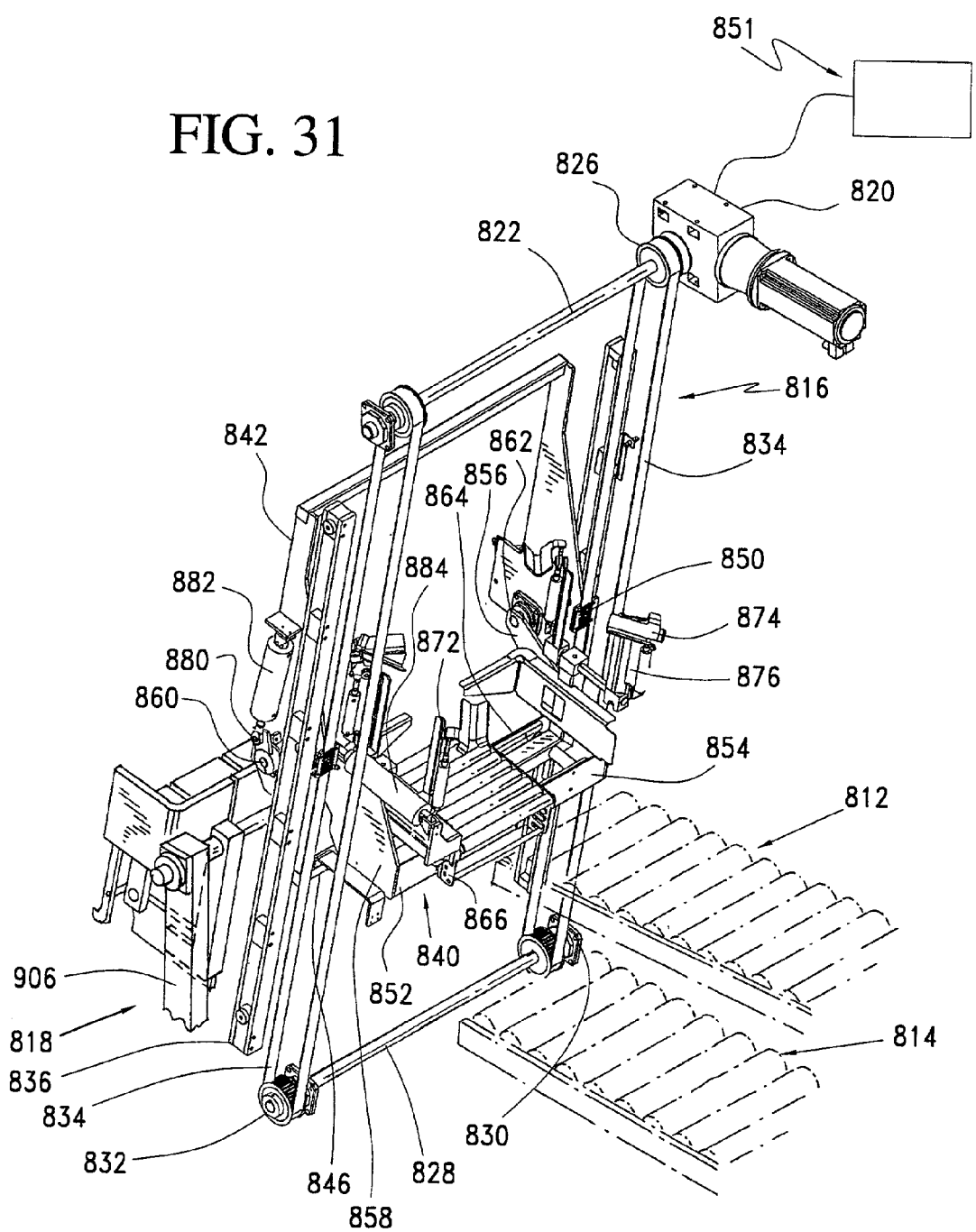
FIG. 31 is a fragmentary perspective view of the packing system of the FIG. 1 which system includes a feeding conveyor, a discharge conveyor, a lift apparatus and a matrix former.

The packing machine portion of the subject system is described in an application entitled "Method And Apparatus For Packing" filed concurrently herewith and assigned to the assignee of this application. FIG. 31 shows a packing apparatus designated generally by the numeral 810 which includes an empty-box feeding conveyor 812, a packed-box discharge conveyor 814, a lift mechanism 816, and a matrix former 818.

Figure 32:
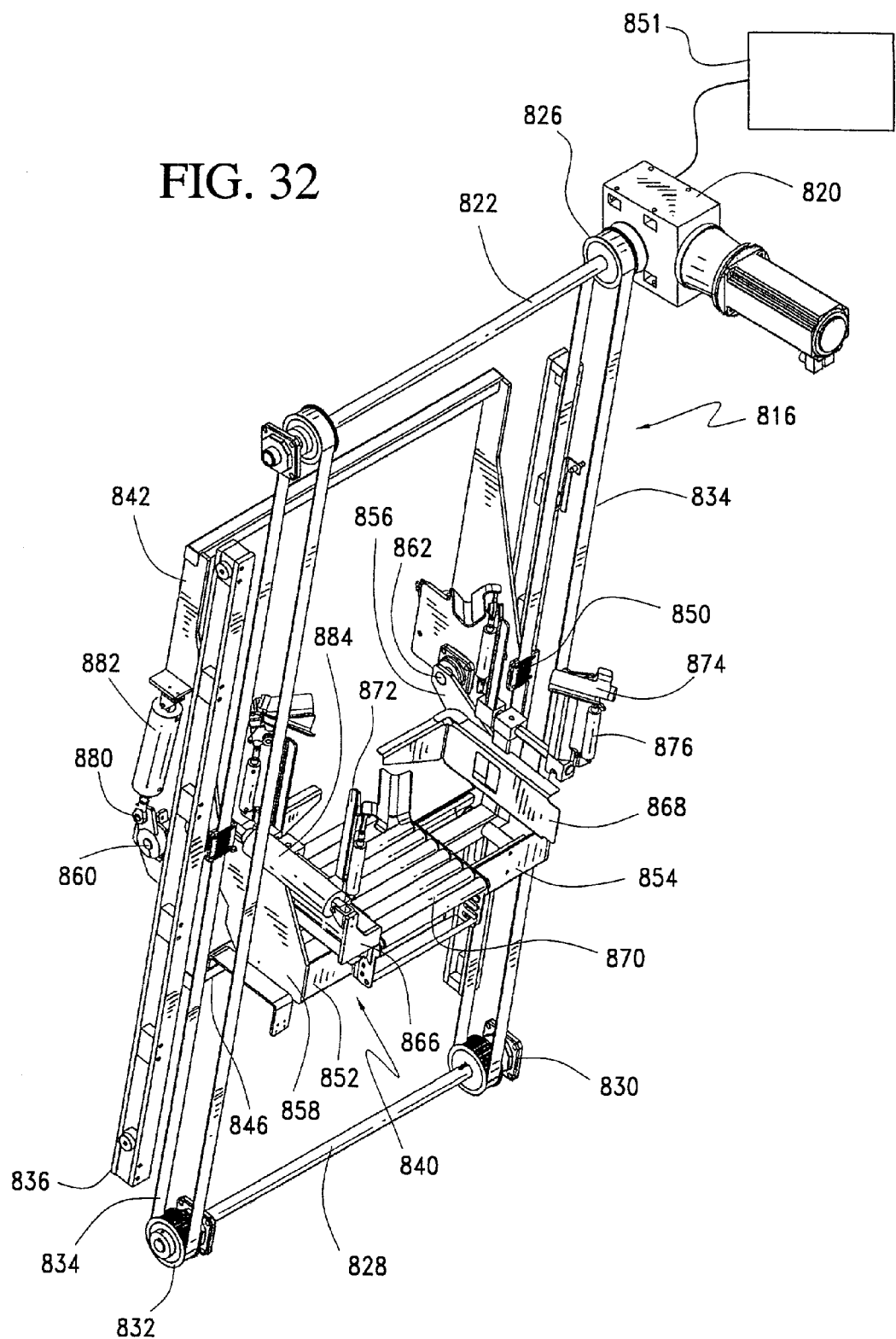
FIG. 32 is a perspective view of the lift apparatus of the packing system shown in FIG. 31.

Lift mechanism 816, as best shown in FIG. 32, includes a reversible motor 820 for turning a drive shaft 822 which is supported on one end by motor 820 and on the other by a bearing 824 mounted on a support (not shown). First and second flanged wheels 826 are mounted on shaft 822 for rotation therewith, and a second shaft 828 is rotatably supported by first and second bearing plates 830 mounted to supports (not shown) parallel to the drive shaft 822. First and second flanged wheels 832 are mounted on second shaft 828 and aligned with the flanged wheels 826 on the drive shaft 822. First and second belts 834 extend between aligned pairs of flanged wheels 826 and 832 on the shafts 822 and 828 such that shafts 822 and 828 are rotated simultaneously when motor 820 turns drive shaft 822. Parallel guide tracks 836 are mounted adjacent the belts 834, each track 836 defining a channel facing toward the channel of the other track 836.

Figure 37:
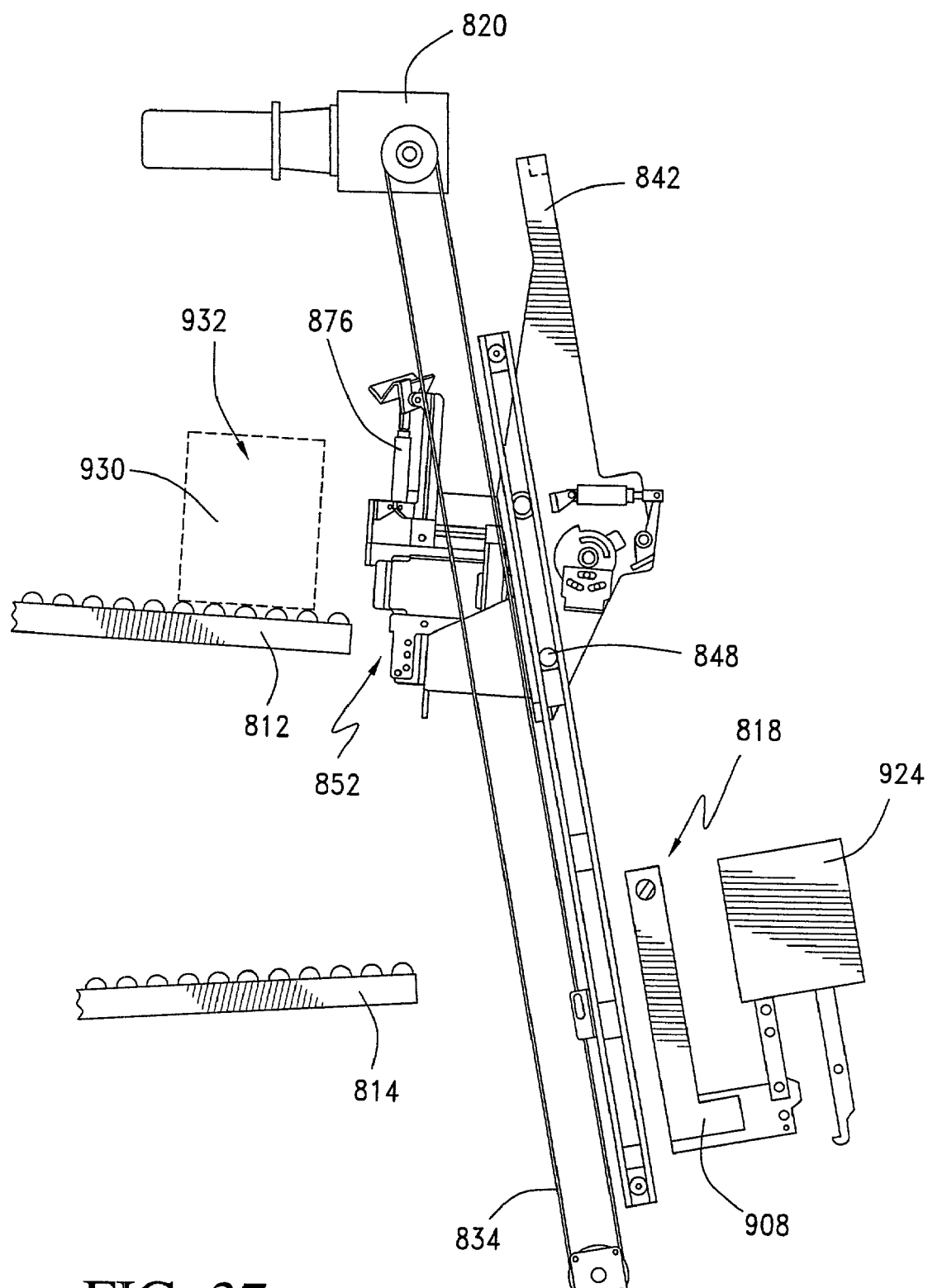
FIG. 37 is a side elevational view of the packing system of FIG. 31 in a first configuration with the lift positioned to receive an empty box from the feeding conveyor.
Figure 38:
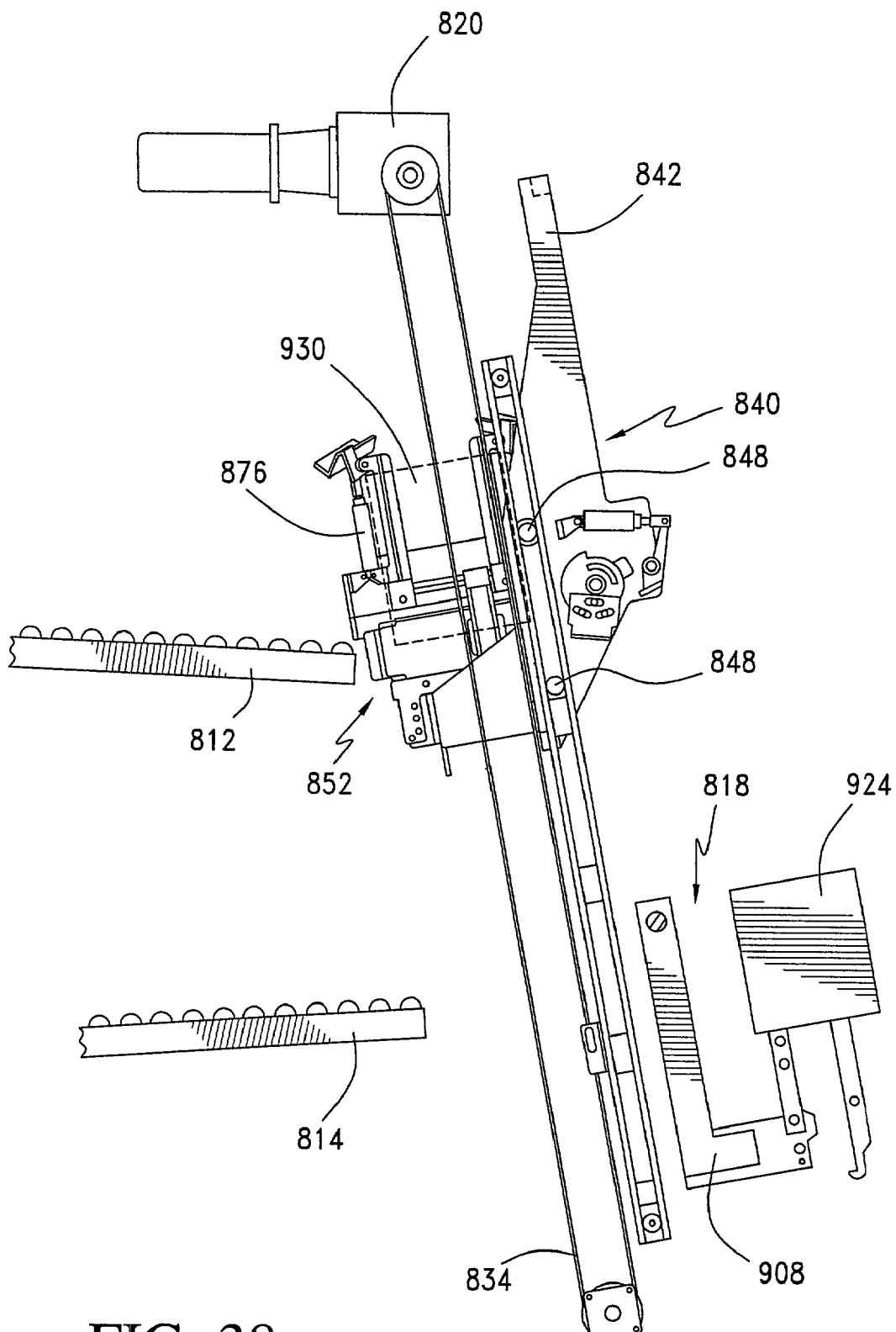
FIG. 38 is a side elevational view of the packing system of FIG. 31 in a second configuration with an empty box gripped on a platform of the lift apparatus.

Lift platform 840 includes a first sidewall 842, a second sidewall 843, a top support 844, and a bottom support 846 supported for rolling movement along the guide tracks 836 by wheels 848, as best shown in FIG. 37, and is clamped to belts 834 by clamps 850. Thus, motor 820 moves lift platform 840 between raised and lowered positions on guide tracks 836 by rotating shaft 822. Motor controller 851 controls the operation of motor 820, and thus the position of lift platform 840 with respect to the guide tracks 836 and the matrix former 818.

Lift platform 840, as best shown in FIG. 32, further includes a pivoting platform 852 mounted on lift platform 840 for pivoting movement with respect to platform 840. Platform 852 includes a base frame 854, including a projecting arm 856 and a sidewall 858. A first axle 860 extends from first sidewall 842 and connects to sidewall 858, while a second axle 862 extends from second sidewall 843 and connects to projecting arm 856. The axles 860 and 862 are coaxial. Under the influence of appropriate actuators, pivoting platform 852 may be pivoted between first and second positions with respect to lift platform 840.

Figure 35:
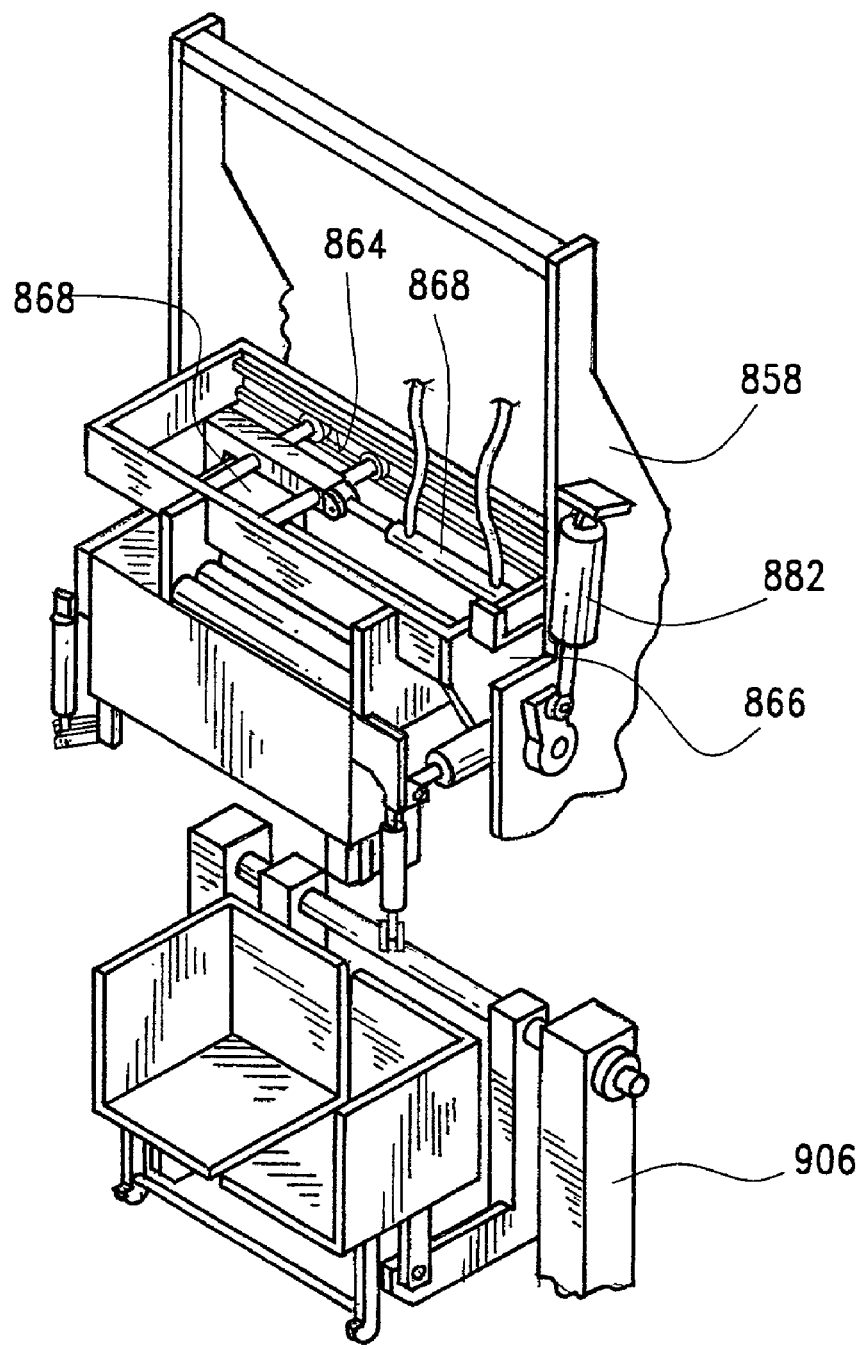
FIG. 35 is a perspective view of the box holding portion of the lift apparatus in an inverted position.

Pivot platform 852 further includes a guide track 864, as best shown in FIG. 35, connected between sidewall 858 and sidewall 843, a first fixed wall 865 adjacent track 864 and a second wall 866 slidingly connected to track 864. An actuator 868, shown in FIG. 35, is mounted adjacent track 864, for moving sliding wall 866 toward and away from fixed wall 865 to grip a box placed therebetween. A roller support 870, comprising a plurality of free-spinning rollers, is mounted on base frame 854 between sidewalls 843 and 858. Four posts 872 extend from walls 865 and 866 which posts are mutually parallel and arranged generally in a square. The top of each post 872 includes a finger 874 pivotally attached thereto, and an actuator 876 connects each finger 874 to the top of sidewall 865 or sliding wall 866, so that the fingers 874 can be pivoted between first and second positions with respect to the sliding walls by the actuators 876 and function as grippers for gripping the top edge of a box.

A crank arm 880, as best shown in FIG. 31, is attached to the end of axle 860, and a first cylinder and piston assembly 882 extends between crank arm 880 and sidewall 842 of lift platform 840. A second cylinder and piston assembly 884 extends between pivot platform 852 and sidewall 842. Operation of the first and second cylinder and piston assemblies 882 and 884 moves pivot platform 852 between first and second positions.

Figure 36:
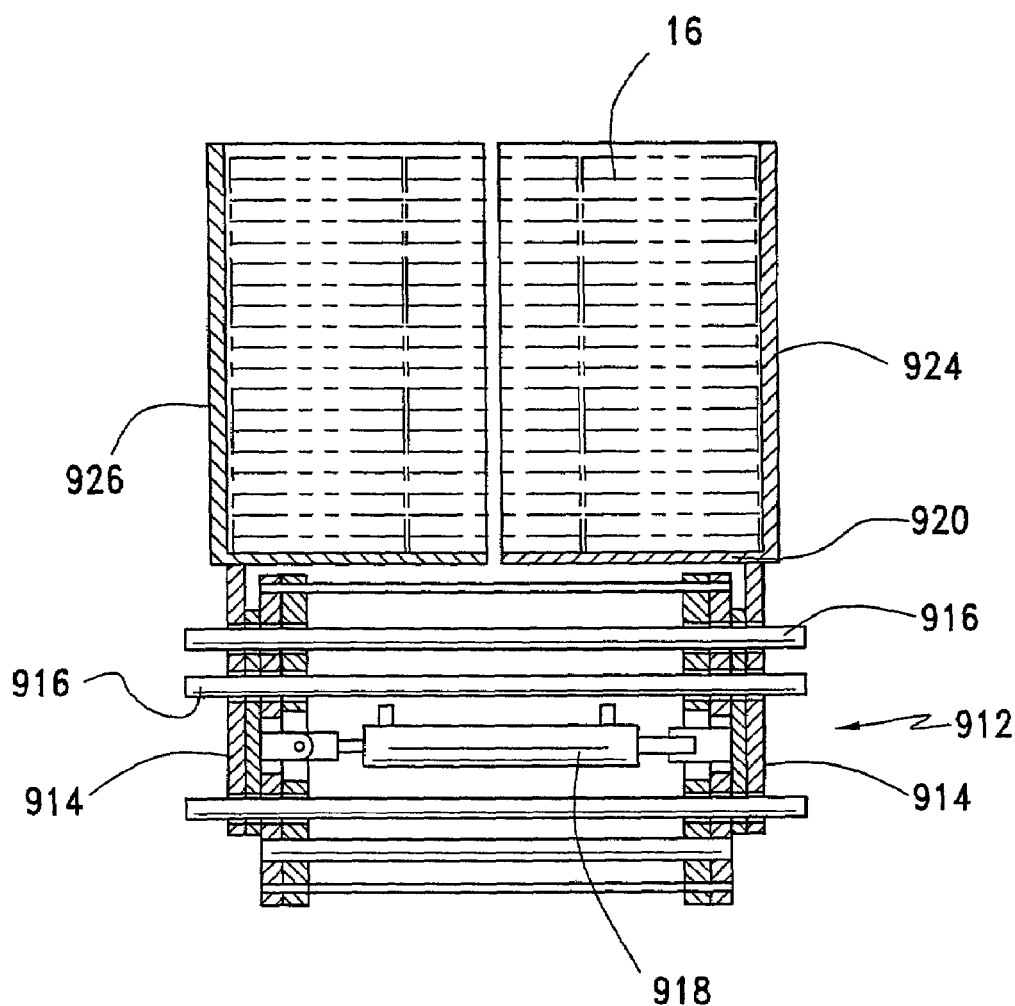
FIG. 36 is an elevational view, partially in section, of the matrix former of FIG. 31.

Referring now to FIGS. 33, 34 and 36, matrix former 818 can be seen to comprise a reversible motor 890 for rotating a drive shaft 892 approximately 180 degrees between first and second positions. Plate 894, having first and second ends 896, is supported on shaft 892, and first and second arms 898 are attached to the ends 896 of plate 894. Arms 898 are connected to a shaft 900 by a triangular plate member 902. One end of shaft 900 is connected to a first vertex of plate member 902, while arms 898 are connected to the other two vertices of the triangular plate member 902. Shaft 900 is securely supported by two bearing plates 904 fixedly mounted to a support structure 906, as best shown in FIG. 31. An L-shaped support 908 depends from shaft 900 and includes a projection 910 for supporting an actuating assembly 912. Actuating assembly 912 comprises side plates 914 connected by telescoping cylinders 916 and an actuator 918. The matrix former 818, as best shown in FIG. 33, further includes a patty-receiving platform 920 having three slots 922 therein, a first sidewall 924 connected to one of the side plate 914, and a second sidewall 926 connected to the other of the side plates 914. (The slots 922 are narrower than the width of the patties to be placed thereover.) The sidewalls 924 and 926 are movable toward and away from each other by operation of the actuating assembly 912 which is attached to the two side plates 914. FIG. 36 illustrates three stacks 16 of hamburger patties between the sidewalls 924, 926 of the matrix former 818 in a closely spaced relationship.

In operation, a first set of three stacks of hamburger patties is placed onto receiving platform 920, one stack over each of slots 922, by stack transfer device 510. A second set of three stacks is then placed on receiving platform 920 next to the first set of stacks by the stack transfer device. The stacks are formed with a spacing between them, and are thus transferred to the receiving platform 920 with a spacing. To remove or substantially decrease this spacing, controller 851 operates actuator 918 to move side plates 914, and thus first and second sidewalls 924 and 926 which are connected to side plates 914, toward each other to slide the patties toward one another and form a tighter matrix of patties.

FIGS. 37 through 45 illustrate the interaction of the lift mechanism 816 and the matrix former 818 during one patty boxing operation. In FIG. 37, system 810 can be seen with an empty box 930, having an opening 932, that has been released to slide down box feed roller conveyor 812 toward and onto roller support 870 of lift platform 840. At this stage, matrix former 818 already holds six stacks (two rows of three stacks each) of hamburger patties. Once box 930 is received on roller platform 870, sliding side wall 866 is moved towards wall 865 by actuator 868, until it engages the sidewalls of the box and holds box 930 securely on platform 870. Actuators 876 pivot fingers 874 and move them into the opening 932 of box 930, where they further secure the box to the roller platform 870 and help hold down any flaps that the box might have. Platform 870 is then pivoted to the position shown in FIG. 38, with its surface generally normal to guide tracks 836. First cylinder and piston assembly 882, with a first end connected to first sidewall 842, presses against crank arm 880 on first axle 860, which causes pivoting platform 852 to pivot about the axes of first axle 860 and second axle 862 from the position shown in FIG. 38 to the position shown in FIG. 39 so that roller platform 870 is positioned over matrix former 818 and with the opening 932 of box 930 facing the stacks of patties on the matrix former. Sliding sidewall 866 and fingers 874, held in place by actuators 876, keep box 930 secured with its bottom wall against roller platform 870.

Figure 40:
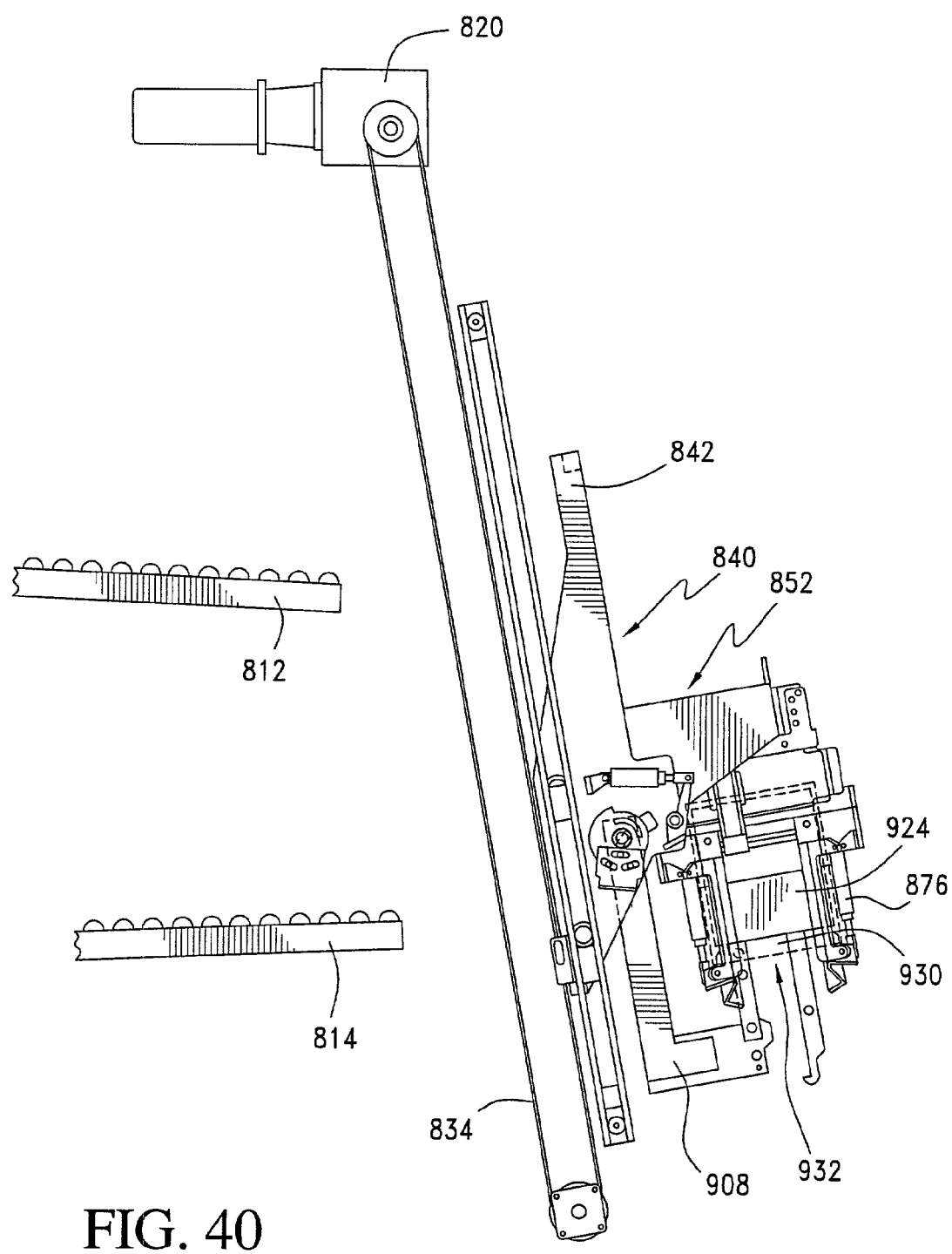
FIG. 40 is a side elevational view of the packing system of FIG. 31 in a fourth configuration with the platform held near the matrix former so that the matrix former is substantially covered by the box.
Figure 41:
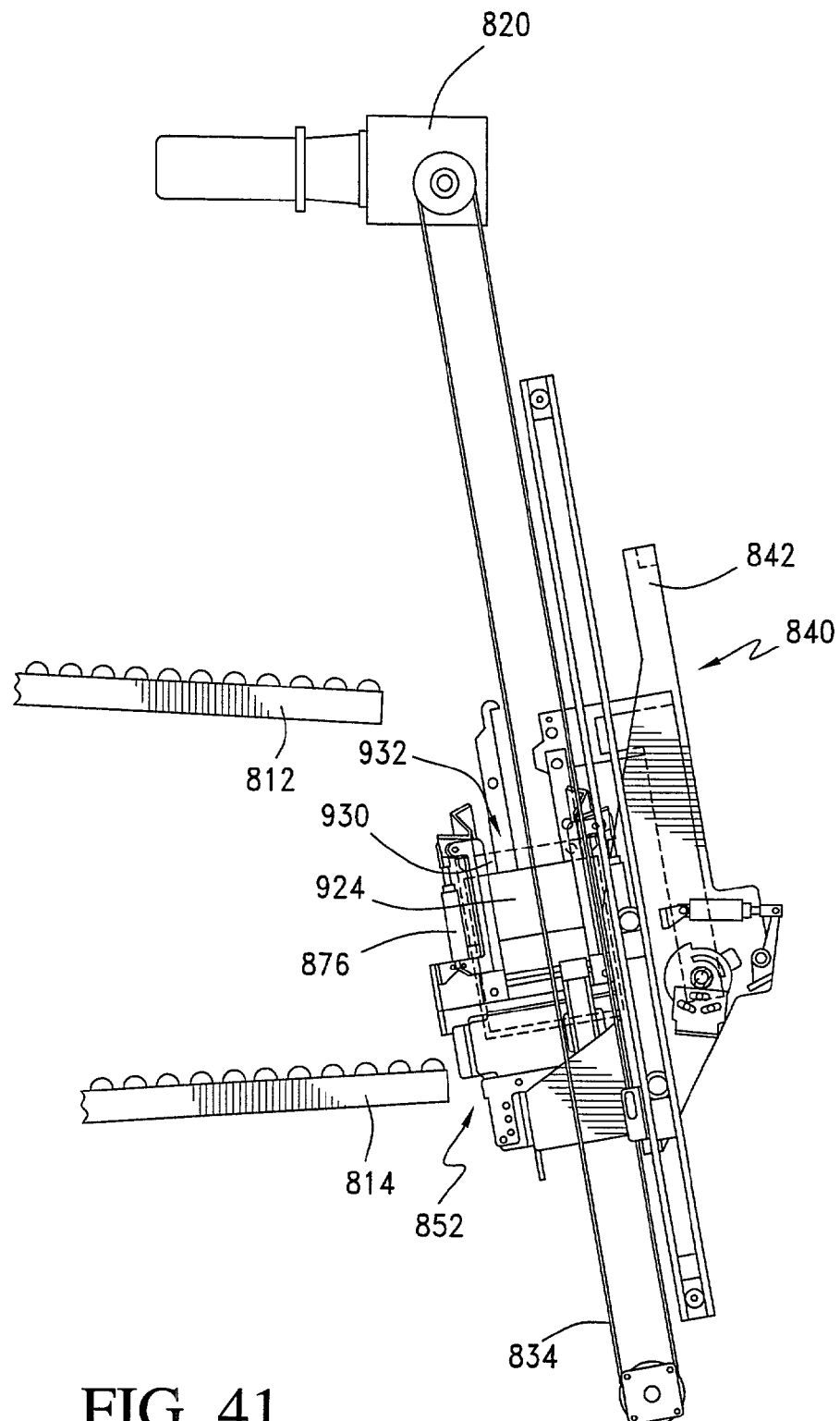
FIG. 41 is a side elevational view of the packing system of FIG. 31 in a fifth configuration with the platform and matrix former rotated 180 degrees from the position shown in FIG. 8.

Controller 851 next causes motor 820 to rotate shaft 822, in order to move belts 834 and thus platform 870 toward matrix former 818 until the sidewalls 924, 926 of the matrix former 818 and the patties on the matrix former surface 920 are inside box 930, as best shown in FIG. 40. In this position, shaft 900 of the matrix former is coaxially aligned with axles 860 and 862 of the lift platform.

Next, matrix former motor 890 actuates to rotate plate 894 and move one of the arms 898 toward shaft 900 and the other of arms 898 away from the shaft 900, thus rotating triangular plate 902 and shaft 900 connected thereto. This causes the receiving platform 920 to pivot about the axis of shaft 900. Simultaneously, first cylinder and piston assembly 882 and second cylinder and piston assembly 884 contract to pivot roller support platform 870 about axles 860 and 862, so that the box 930 on the roller support platform 870 and the patty support platform 920 of the matrix former remain essentially parallel as they rotate through 180 degrees to the position shown in FIG. 41. The patties, which had been supported by receiving platform 920 and covered by box 930, are in this new orientation supported by box 930 with the receiving platform 920 positioned thereover.

Figure 42:
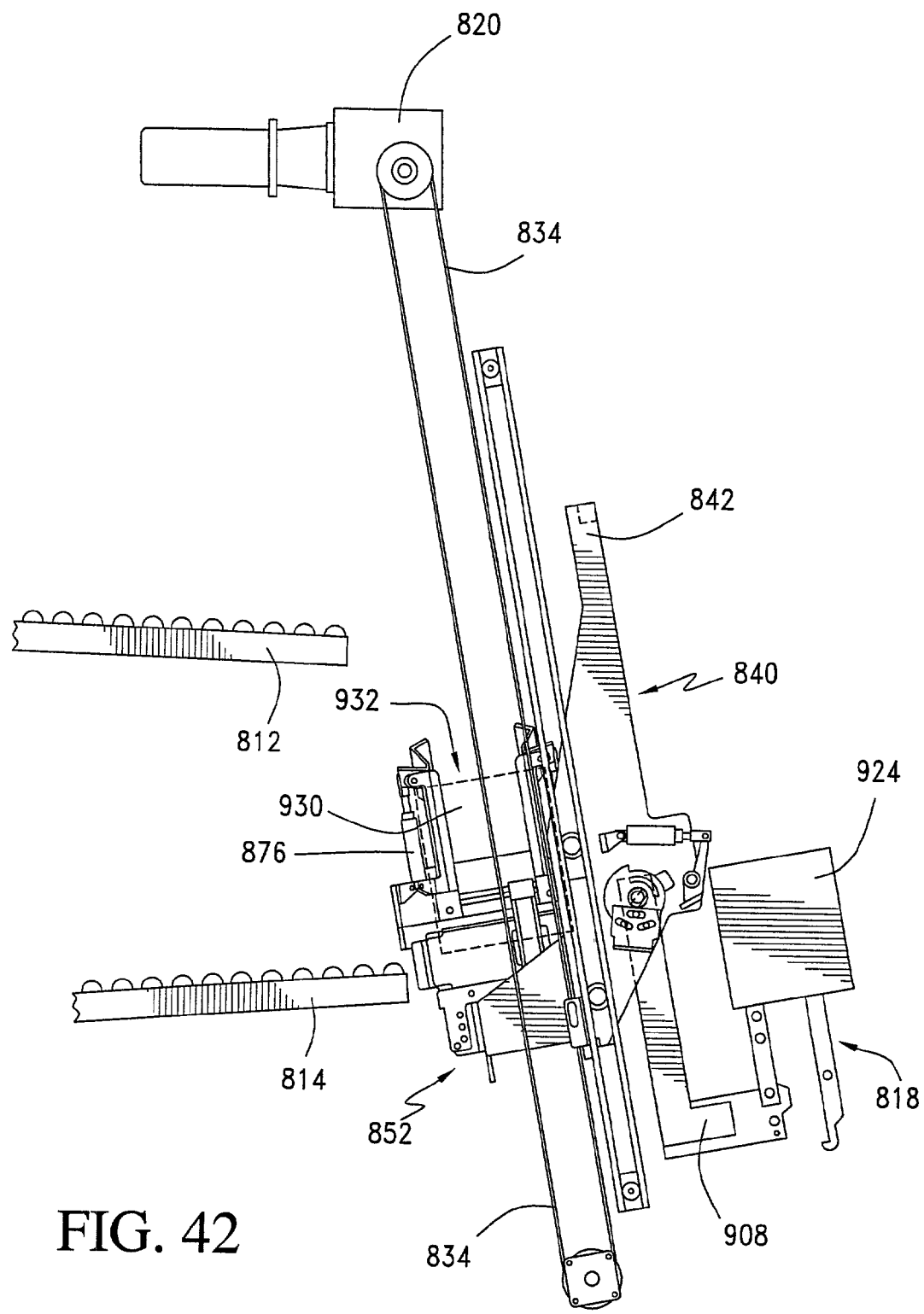
FIG. 42 is a side elevational view of the packing system of FIG. 31 in a sixth configuration with the platform moved away from the matrix former.
Figure 43:
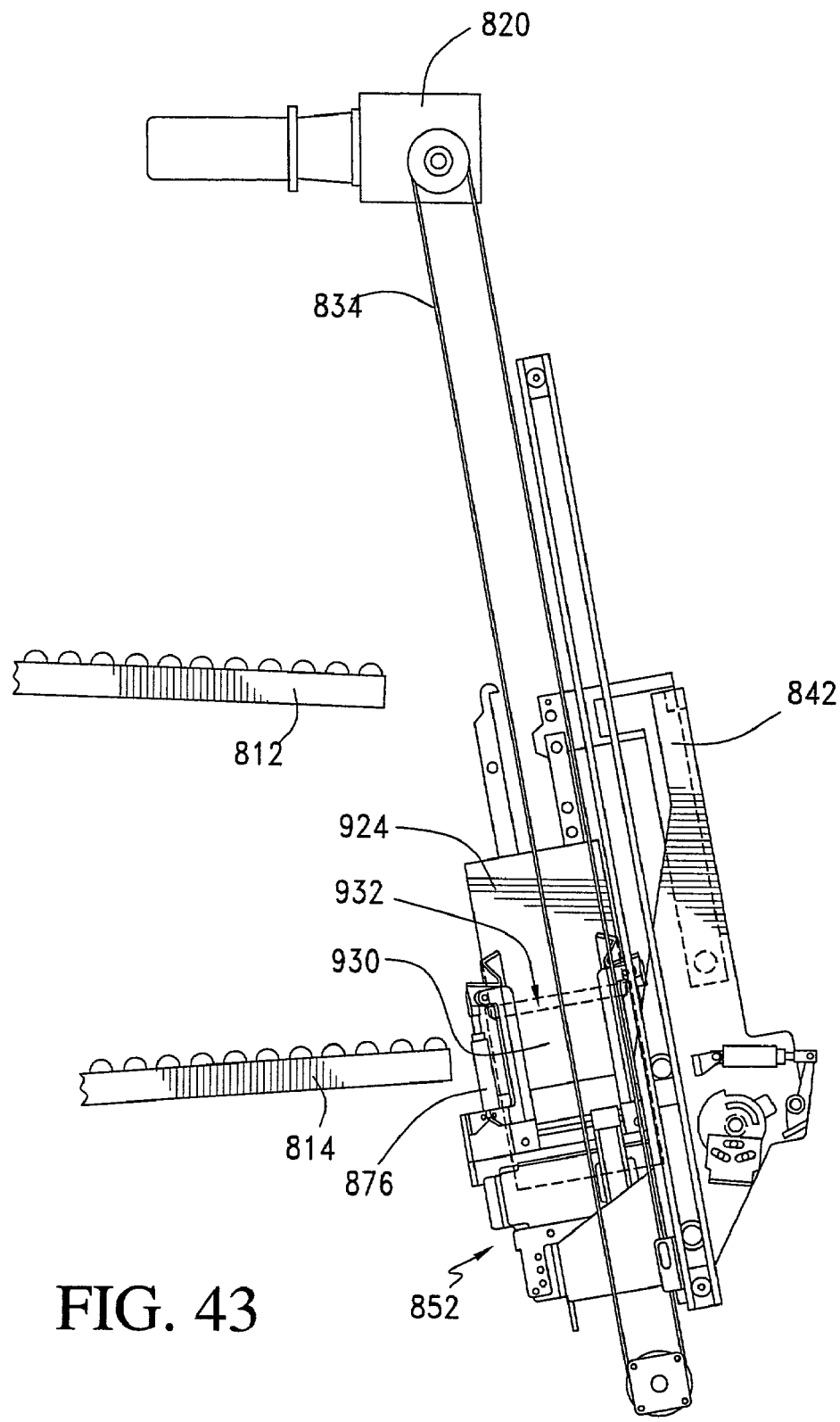
FIG. 43 is a side elevational view of the packing system of FIG. 31 in a seventh configuration showing the matrix former pivoted 180 degrees from the position shown in FIG. 42.
Figure 44:
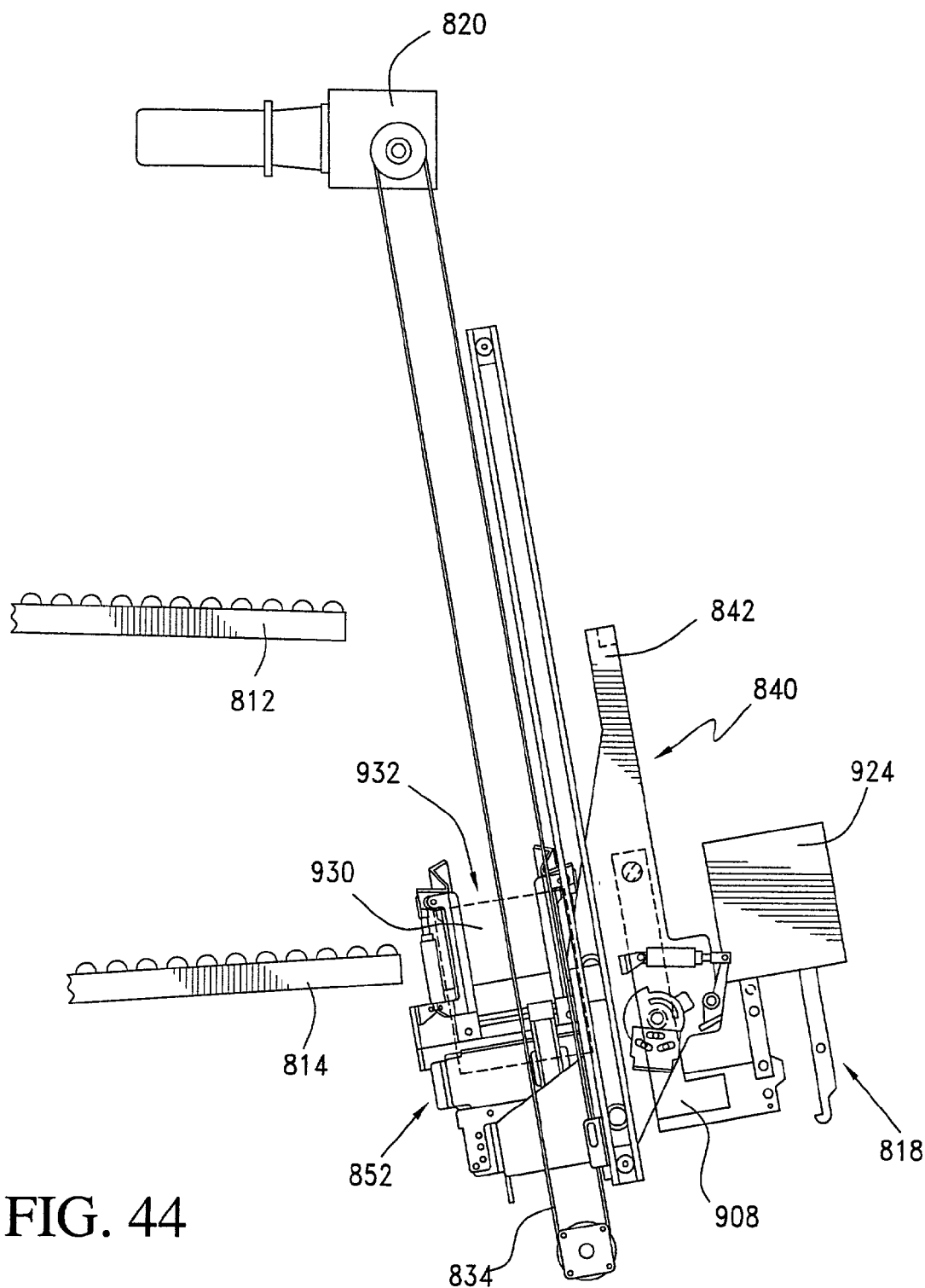
FIG. 44 is a side elevational view of the packing system of FIG. 31 in an eighth configuration with the platform and box raised to the level of the discharge conveyor.
Figure 45:
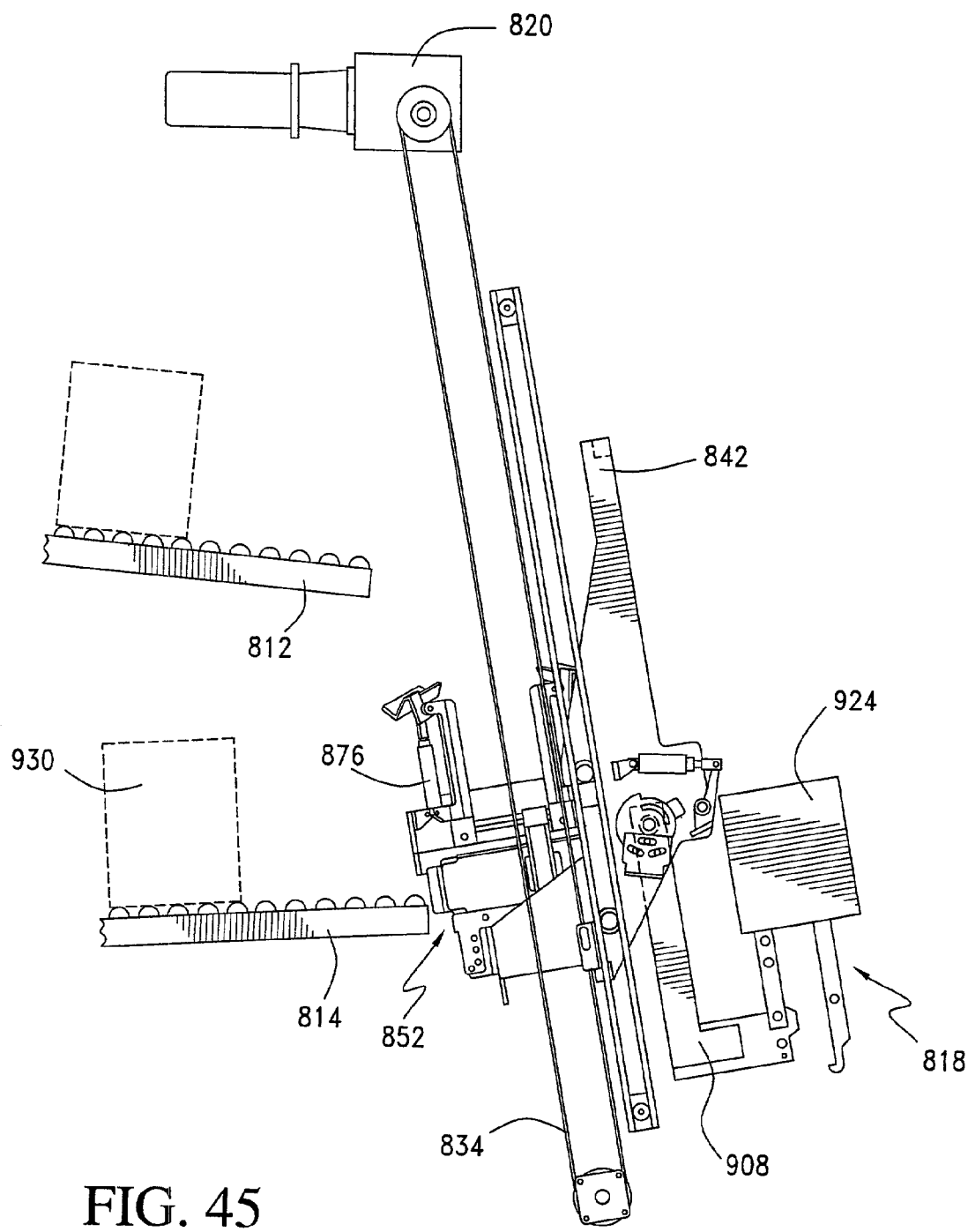
FIG. 45 is a side elevational view of the packing system of FIG. 31 in a ninth configuration showing a full box that has been released from the platform to the discharge conveyor and a new empty box in position on the feeding conveyor.

Motor 820 next rotates shaft 822 to move roller support platform 870 and box 930 thereon away from patty support platform 1920 and away from shaft 822 until the patty support platform 920 is clear of the box 930, as best shown in FIG. 42. Motor 890 rotates shaft 900 to return the patty support platform 920 to its starting orientation as best shown in FIG. 43. Roller support platform 870 is next raised to the position shown in FIG. 44, generally parallel to the surface of discharge conveyor 814. Actuators 876 pivot fingers 874 out of top opening 932 of the box 930 and sliding sidewall 866 moves away from box 930. The box 930 may then slide under the force of gravity off roller platform 870 and onto the adjacent discharge conveyor 814 as best shown in FIG. 45. The lift platform 840 is then raised back toward the feed conveyor 812 to receive another box and start the cycle again.

Figure 39:
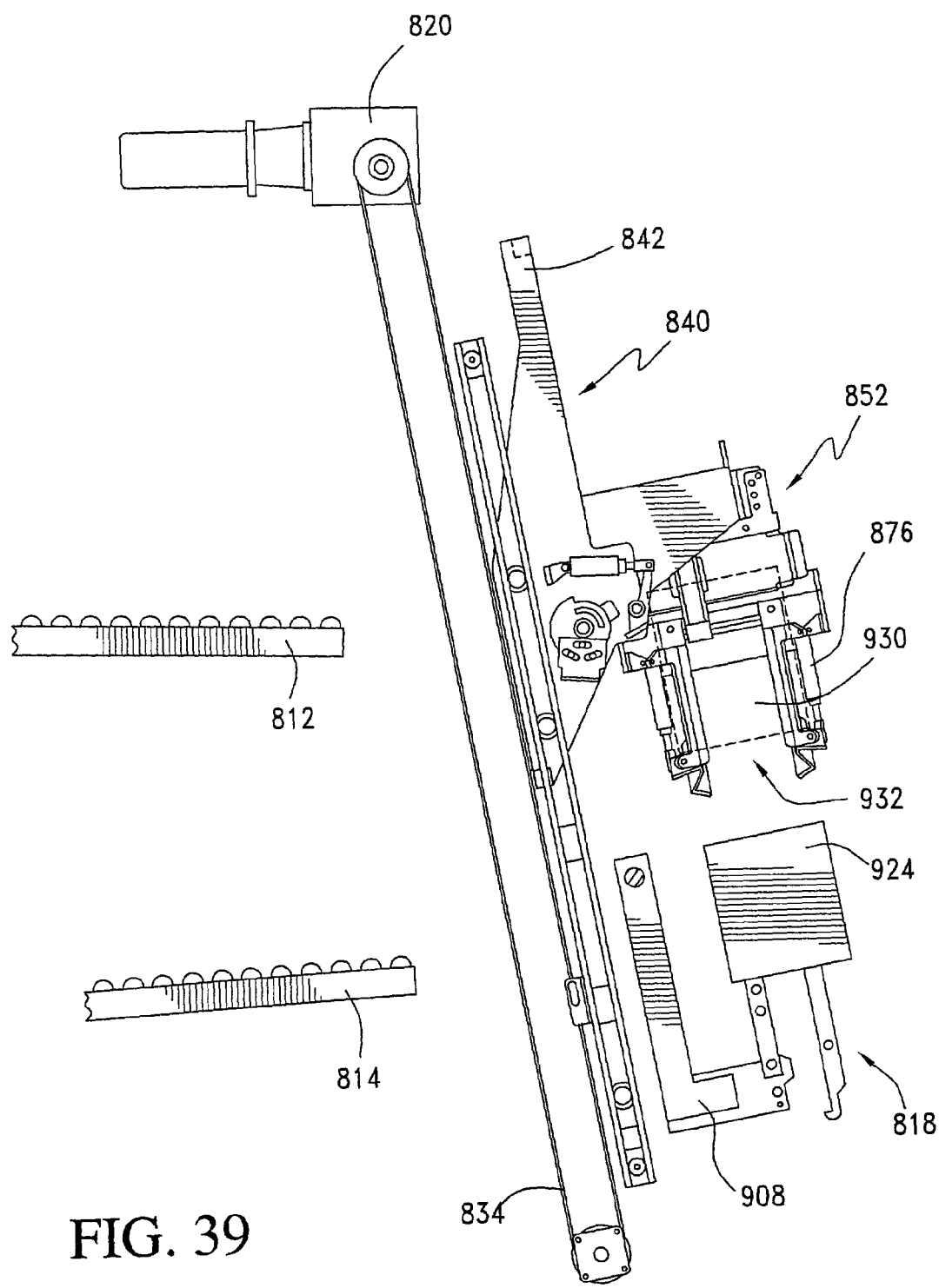
FIG. 39 is a side elevational view of the packing system of FIG. 31 in a third configuration with the platform and box positioned over the matrix former.
Figure 46:
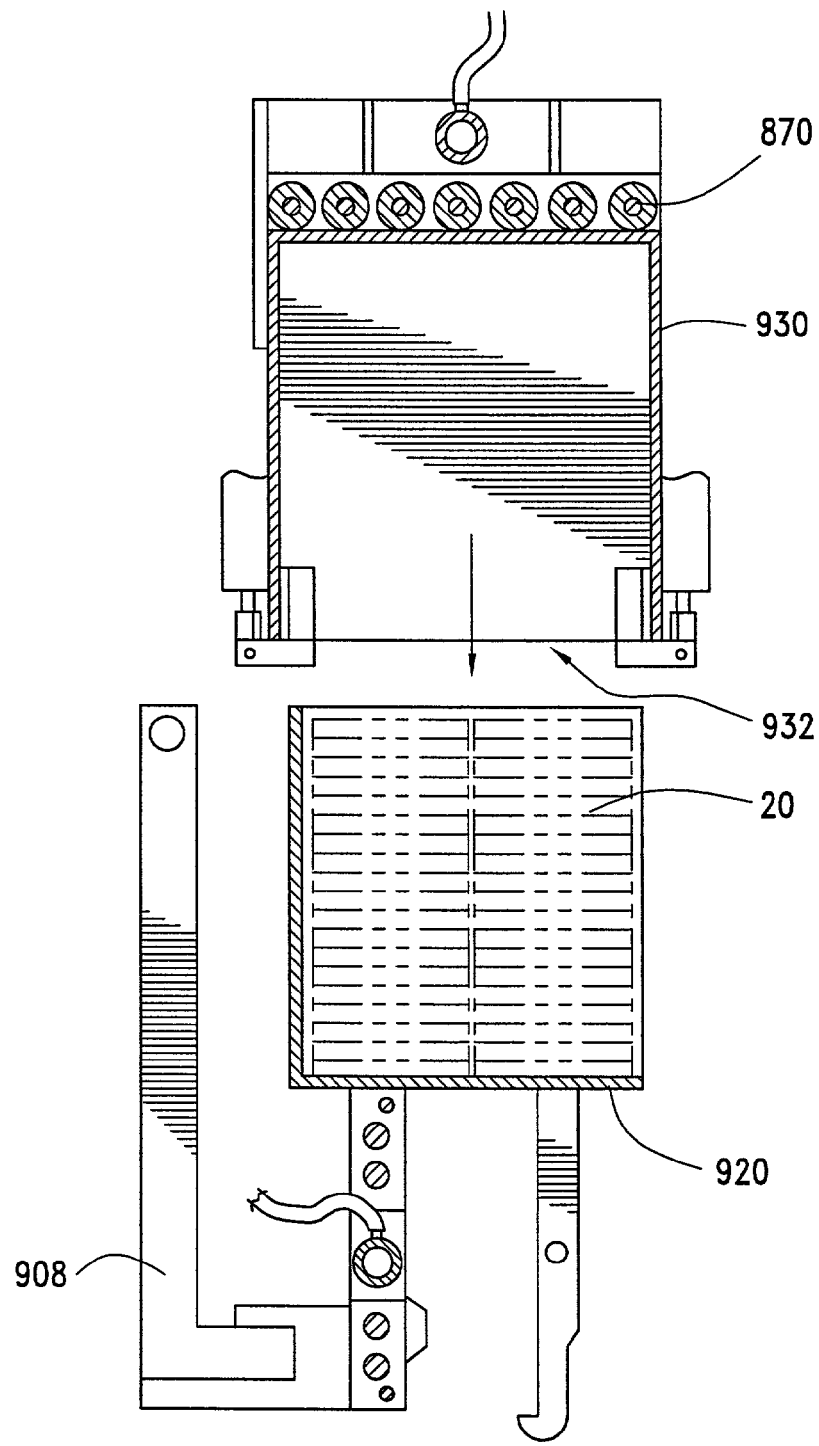
FIG. 46 is sectional side elevational view of the lift apparatus and the matrix former in a position similar to that shown in FIG. 38.
Figure 49:
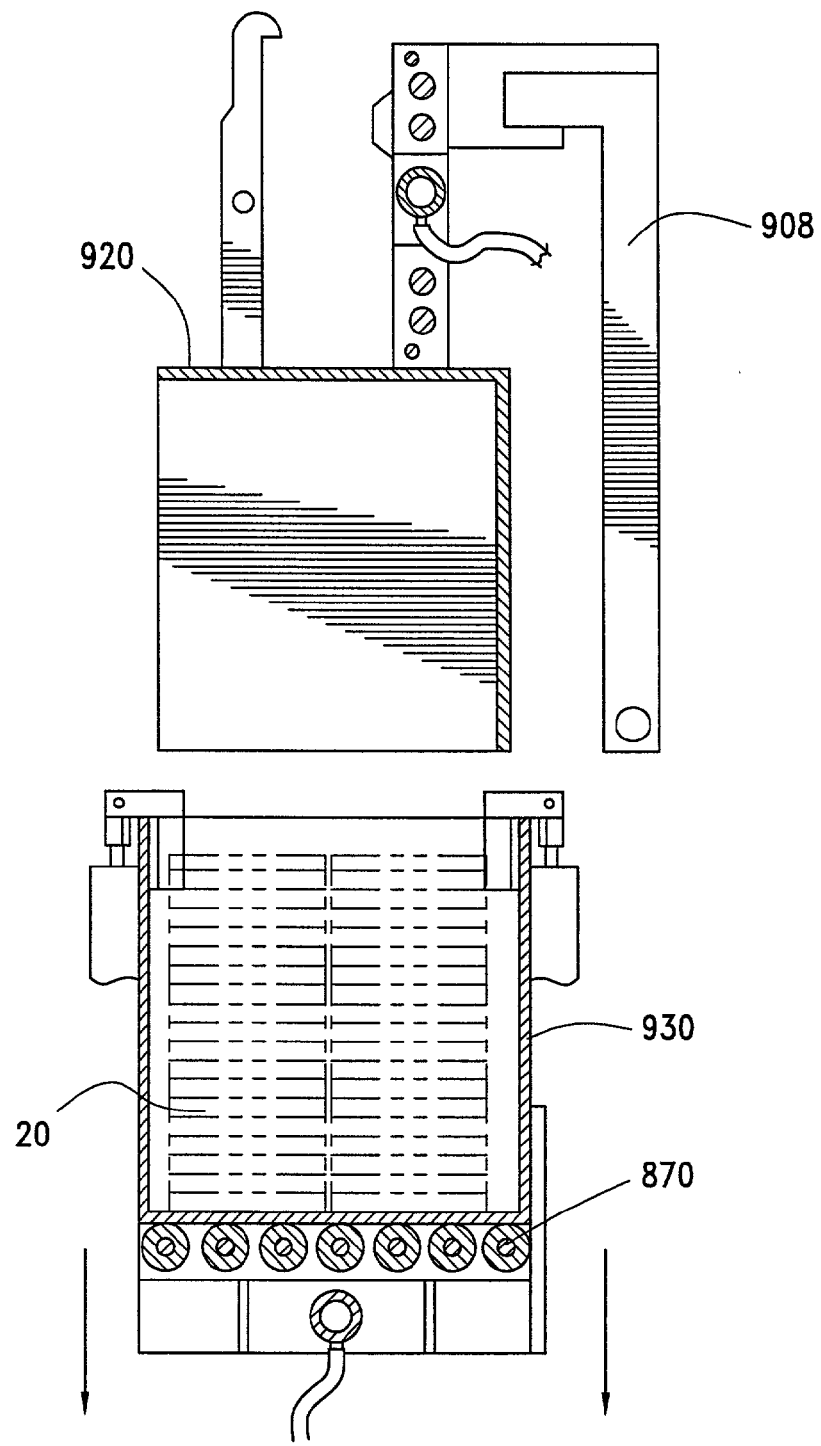
FIG. 49 is a sectional side elevational view of the lift apparatus and the matrix former in a position similar to that shown in FIG. 41.

FIGS. 46–49 show in more detail the transfer of the stacks 20 of patties 16 from the matrix former 818 to the box 930. FIG. 46 is a sectional view showing the inside of the box 930 and the matrix former 818 when the box 930 is held over the matrix former 818 as shown in FIG. 39. As can be seen in FIG. 47, the support platform 920 of the matrix former fits within the inside of box 930, with a small amount of clearance, and at about the level of opening 932. FIG. 48 shows the inside of box 930 when the matrix former 818 and lift platform 840 are positioned as in FIG. 41, so that the stacks 20 of patties are now resting on the bottom of box 930. FIG. 49 corresponds to the position of the matrix former 818 and lift platform 840 shown in FIG. 42.

The present invention has been described herein in terms of a preferred embodiment. However, numerous changes and additions to this embodiment will become apparent to those skilled in the relevant arts upon a reading and understanding of the foregoing description. It is intended that all such changes and additions be included within this invention to the extent that they are covered by scope of the several claims appended hereto.

What is claimed is:

1. An apparatus for forming stacks of disk-like objects and packing the stacks in a box comprising:
   a stacker for forming a plurality of stacks of the disk-like objects;
   a conveyor for conveying rows of the disk-like objects to said stacker;
   a carousel;
   a first transfer mechanism for transferring the plurality of stacks from said stacker to said carousel;
   a platform;
   a second transfer mechanism having at least one gripper for removing at least some of the stacks from said carousel, said second transfer mechanism comprising a frame having a top and a bottom, a plurality of stack supports on said frame bottom, a plurality of stack engaging members supported by said frame top, at least one first actuator for moving said plurality of stack engaging members toward and away from said stack supports, a second actuator for moving said frame between said carousel and said platform, and a controller for controlling said at least one first actuator and said second actuator, and said second transfer mechanism for transferring at least some of the stacks from said carousel to the platform; and
   a boxer for boxing the stacks of objects on the platform, said boxer comprising a box support having a box contact surface movable toward and away from said platform.

2. The apparatus of claim 1 wherein said stacker includes a first plurality of supports for catching the disk-like objects falling off an end edge of the conveyor.

3. The apparatus of claim 2 including a second plurality of supports for receiving stacks of disk-like objects from said first plurality of supports.

4. The apparatus of claim 3 wherein said second plurality of supports are shiftable between a first position for receiving stacks of disk-like objects from said first plurality of supports and a second position for depositing said plurality of stacks on said first transfer mechanism.

5. The apparatus of claim 4 wherein said first transfer mechanism is shiftable between a first position adjacent said stacker and a second position adjacent said carousel.

6. The apparatus of claim 5 wherein said first plurality of supports receives disk-like objects from said conveyor when said first transfer mechanism is adjacent said carousel.

7. The apparatus of claim 5 wherein said second plurality of supports comprises a plurality of movable supports and at least one fixed support associated with each of said movable supports.

8. The apparatus of claim 7 wherein said at least one fixed support comprises a portion of said first transfer mechanism.

9. The apparatus of claim 2 wherein said stacker comprises
   a frame having a top, a bottom and sides;
   a first support mounted on said frame near said end edge for receiving objects from said end edge and having an opening having a width smaller than the width of said objects;
   a first actuator operably connected to said first support for moving said first support between first and second positions relative to said end edge;
   a second actuator operably connected to said first support for moving said first support between upper and lower positions;
   a second support mounted on said frame beneath said first support having a width less than the width of the opening in said first support;
   a third actuator operatively connected to said second support for moving said second support between high and low positions, said second support high position being higher than said first support lower position;
   a third support mounted on said frame at a position higher than said second support low position and having an opening wider than the width of said second support;
   a fourth actuator operatively connected to said third support for moving said third support between a first position beneath said second support and a second position; and
   a sensor for detecting the completion of a stack of the discrete objects, said sensor being operatively coupled to said third actuator.

10. The system of claim 1 wherein said carousel comprises a plurality of receptacles shaped to receive individual stacks of disk-like objects.

11. The system of claim 10 wherein said carousel comprises a frame and a plurality of carriers mounted for movement about said frame wherein said receptacles are connected to said carriers.

12. The system of claim 11 including a controller for controlling the movement of the carriers about said frame.

13. The system of claim 12 wherein said carousel includes at least one stop operably connected to said controller, said at least one stop being shiftable between a first position to allow movement of said carriers and a second position to block movement of said carriers.

14. The system of claim 1 wherein said carousel comprises
a frame having a first position and having an exit end proximate said stacker and a second position having an exit end proximate said second transfer mechanism;
a drive;
a plurality of carriers supported by said frame and connected to said drive, said carrier having an octagonal base;
a first stop at said first position exit end and a second stop at said second position exit end; and
a controller for actuating said first stop to allow only filled carriers to pass said first location exit end and for actuating said second stop to allow only empty carriers to pass said second location exit end.

15. The system of claim 1 wherein said first transfer mechanism comprises a bottom stack support, a side stack support and a member positioned adjacent the top of said stack.

16. The system of claim 15 wherein said first transfer mechanism is invertible.

17. The system of claim 1 wherein said at least one gripper simultaneously removes a plurality of stacks from said carousel.

18. The system of claim 17 wherein said at least one gripper is shiftable between a first position adjacent said carousel and a second position adjacent said platform.

19. The system of claim 18 wherein said at least one gripper is pivotable about an axis normal to the axes of said stacks.

20. The system of claim 1 wherein said platform includes first and second side edges, a front edge and a rear edge, first and second sidewalls extending away from said first and second side edges and a rear wall extending away from said rear edge.

21. The system of claim 20 including an actuator for moving said first and second sidewalls toward and away from one another.

22. The system of claim 17 wherein said platform is mounted for rotation about an axis parallel to said platform and including an actuator for rotating said platform about said axis.

23. The system of claim 1 wherein said platform comprises a matrix former.

24. The system of claim 1 wherein said box contact surface is movable between first and second positions.

25. The system of claim 24 including a gripper for holding a box against said box contact surface.

26. The system of claim 25 wherein said box support is pivotable about an axis parallel to said box contact surface between a first position and a second position over said platform.

27. The system of claim 26 wherein said box support in said second position is movable toward and away from said platform.

28. The system of claim 1 wherein said boxer comprises
a first platform having a product contact surface and a peripheral edge;
an actuator for pivoting said first platform about an axis parallel to and spaced from said first platform between a first orientation wherein said product contact surface faces in a first direction and a second orientation wherein said product contact surface faces in a second direction, said box contact surface including
a second platform having a box contact side, a box holder for holding a box having a closed bottom and open top on said platform with the closed bottom of the box against said box contact side;
an actuator connected to said second platform for moving said second platform linearly between a first position and a second position and for pivoting said second platform about an axis parallel to and spaced from said box contact side between a first orientation wherein said box contact side faces in said first direction and a second orientation wherein said box contact side faces in said second direction and faces said first platform product contact surface; and
a controller for controlling the movement of said second platform and said box support to move said second platform over said first platform and then pivot said first platform and said second platform simultaneously while keeping said first support product contact surface and said box contact side in a spaced facing relationship.

29. The apparatus as described in claim 1, wherein said carousel includes a plurality of independently moveable trays moved by said carousel.

30. An apparatus for packing material in a box comprising:
a stacker for forming a plurality of stacks of objects;
a conveyor for conveying the objects to said stacker;
a carousel having trays attached thereto, said carousel translating said trays about a continuous path oriented on a horizontal plane;
a first transfer mechanism for transferring the plurality of stacks from said stacker to said carousel;
a platform;
a second transfer mechanism having at least one gripper for removing at least some of the stacks from said carousel, said second transfer mechanism comprising a frame having a top and a bottom, a plurality of stack supports on said frame bottom, a plurality of stack engaging members supported by said frame top, at least one first actuator for moving said plurality of stack engaging members toward and away from said stack supports, a second actuator for moving said frame between said carousel and said platform, and a controller for controlling said at least one first actuator and said second actuator, and said second transfer mechanism for transferring at least some of the stacks from said carousel to the platform; and
a boxer for boxing the stacks of objects on the platform, said boxer comprising a box support having a box contact surface movable toward and away from said platform.

31. The apparatus described in claim 30, wherein said path is essentially oval.

32. The apparatus described in claim 31, wherein a plate defines said path; said trays rotate about the periphery of said plate, and, said trays having an attached wheel that rides about said plate.

33. The apparatus as described in claim 32, wherein said oval path is defined by an endless flexible member rotatably connected to spaced first and second driving mechanisms, said flexible member is operably associated with said trays for driving said trays around said oval path.

34. The apparatus as described in claim 33, wherein said essentially endless flexible member is a belt.

35. The apparatus as described in claim 34, wherein said belt is comprised of urethane.

36. The apparatus as described in claim 32, wherein each of said trays has a base positioned to support said stacks.

37. The apparatus as described in claim 36, wherein each of said bases has a slot extending partially across each said base.

38. The apparatus as described in claim 37, wherein said base is angled such that a base first side closest said plate is lower, than an opposite second side away from said plate.

39. The apparatus as described in claim 38, wherein a stack supporting wall extends perpendicular to each said base.

40. The apparatus as described in claim 39, wherein said base has a multisided shape.

41. The apparatus as described in claim 40, wherein said stack supporting wall extends from three sides of said base.

42. The apparatus as described in claim 30, further comprising a plurality of sensors monitoring said trays, a controller in communication with said sensors, said sensors count said trays and monitor positions of said trays.

43. The apparatus as described in claim 42, wherein first and second solenoid-actuated stops are operably associated with said controller, said controller selectively actuating said stops and thereby controlling the position of said trays.

44. The apparatus described in claim 30, wherein said carousel has eleven trays.

45. The apparatus as described in claim 29, wherein said carousel includes a belt rotating on a horizontal plane, each of said trays operatively associated with said belt and moveable thereabout.

46. The apparatus as described in claim 45, wherein each of said trays includes a clamping mechanism, said clamping mechanism releasably clamping said tray to said belt, thereby allowing said belt to move relative to an associated tray.

47. The apparatus as described in claim 46, wherein each said tray includes a base extending angularly relative to horizontal, and a support wall extending perpendicular to said base.

* * * * *